(12) United States Patent
Hayashi

(10) Patent No.: US 11,451,724 B2
(45) Date of Patent: Sep. 20, 2022

(54) IMAGING DEVICE AND IMAGING SYSTEM

(71) Applicant: CANON KABUSHIKI KAISHA, Tokyo (JP)

(72) Inventor: Hidetoshi Hayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/095,921

(22) Filed: Nov. 12, 2020

(65) Prior Publication Data
US 2021/0152764 A1 May 20, 2021

(30) Foreign Application Priority Data

Nov. 19, 2019 (JP) .............................. JP2019-208571

(51) Int. Cl.
| | |
|---|---|
| H04N 5/225 | (2006.01) |
| H04N 5/353 | (2011.01) |
| H04N 5/235 | (2006.01) |
| H04N 5/14 | (2006.01) |
| G06N 3/08 | (2006.01) |
| H04N 5/369 | (2011.01) |

(52) U.S. Cl.
CPC ............. *H04N 5/3535* (2013.01); *G06N 3/08* (2013.01); *H04N 5/144* (2013.01); *H04N 5/2353* (2013.01); *H04N 5/379* (2018.08)

(58) Field of Classification Search
None
See application file for complete search history.

(56) References Cited

U.S. PATENT DOCUMENTS

| | | | |
|---|---|---|---|
| 8,040,400 B2 | 10/2011 | Hayashi | 348/241 |
| 8,345,108 B2 | 1/2013 | Kobayashi | 348/208.12 |
| 8,670,058 B2 | 3/2014 | Hayashi et al. | 348/296 |
| 8,687,069 B2 | 4/2014 | Kobayashi | 348/208.12 |
| 8,754,978 B2 | 6/2014 | Hayashi et al. | 348/350 |
| 9,185,304 B2 | 11/2015 | Kobayashi | H01L 27/14627 |
| 9,729,764 B2 | 8/2017 | Kobayashi | H04N 5/145 |
| 10,057,515 B2 | 8/2018 | Kobayashi | H01L 27/14627 |
| 10,567,747 B2 | 2/2020 | Hayashi et al. | H04N 5/3765 |

(Continued)

FOREIGN PATENT DOCUMENTS

| | | |
|---|---|---|
| JP | S63-294081 A | 11/1988 |
| JP | 2006-197192 A | 7/2006 |

*Primary Examiner* — Twyler L Haskins
*Assistant Examiner* — Dwight Alex C Tejano
(74) *Attorney, Agent, or Firm* — Venable LLP

(57) ABSTRACT

An imaging device includes pixels each including a photoelectric converter, and a control unit that controls an accumulation period for charge in the pixels. The pixels are divided into pixel blocks, the control unit is configured to control the accumulation period for each pixel block, the pixel blocks include first and second pixel blocks and a third pixel block arranged between the first and second pixel blocks, and the control unit includes a mode to commonly control the accumulation period in the first and third pixel blocks and control the accumulation period in the second pixel block independently of that of the first and third pixel blocks, and a mode to commonly control the accumulation period in the second and third pixel blocks and control the accumulation period in the first pixel block independently of that of the second and third pixel blocks.

28 Claims, 35 Drawing Sheets

(56) References Cited

U.S. PATENT DOCUMENTS

| | | | |
|---|---|---|---|
| 2009/0230288 A1* | 9/2009 | Blaesing | H04N 5/35554 250/208.1 |
| 2010/0007780 A1* | 1/2010 | Nishihara | H04N 5/3535 348/311 |
| 2013/0182154 A1* | 7/2013 | Kimura | H04N 5/37455 348/272 |
| 2013/0308044 A1* | 11/2013 | Mitsunaga | H04N 5/2353 348/362 |
| 2014/0307117 A1* | 10/2014 | Feng | H04N 5/2351 348/218.1 |
| 2015/0015760 A1* | 1/2015 | Tsunai | H04N 5/372 348/311 |
| 2015/0244916 A1* | 8/2015 | Kang | H04N 5/2355 348/222.1 |
| 2015/0256773 A1* | 9/2015 | Tanaka | H04N 5/2352 348/230.1 |
| 2015/0381910 A1* | 12/2015 | Kuriyama | H04N 5/35554 348/297 |
| 2016/0044258 A1* | 2/2016 | Kim | H04N 5/3572 348/296 |
| 2017/0078594 A1 | 3/2017 | Kawabata | |
| 2018/0227514 A1 | 8/2018 | Takahashi | |
| 2020/0068147 A1 | 2/2020 | Hayashi et al. | H04N 5/3535 |

* cited by examiner

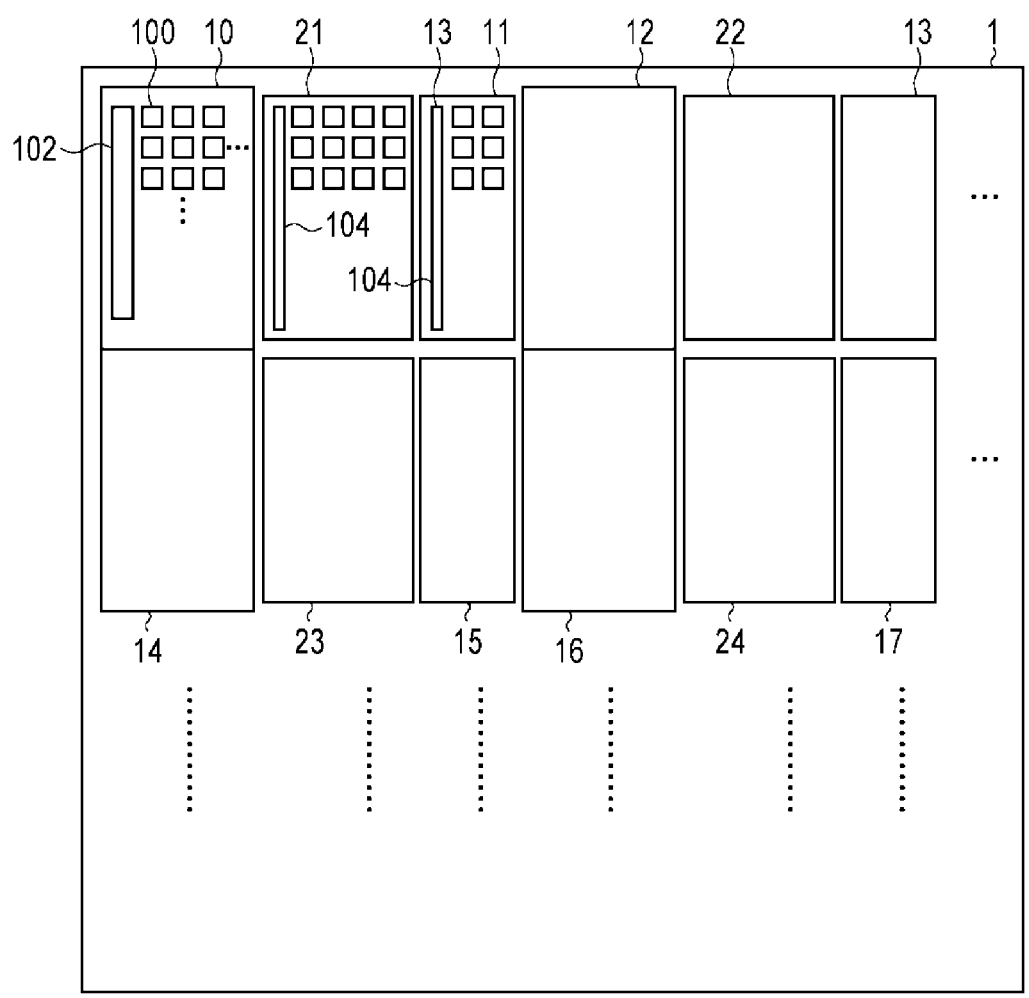

IMAGING DEVICE AND IMAGING SYSTEM

BACKGROUND OF THE INVENTION

Field of the Invention

The present disclosure relates to an imaging device and an imaging system.

Description of the Related Art

Japanese Patent Application Laid-Open No. 2006-197192 discloses an imaging device and a method of driving the imaging device in which a single screen is divided into a plurality of blocks and motion detection of an object is performed on a block basis to control the exposure period.

However, the imaging device disclosed in Japanese Patent Application Laid-Open No. 2006-197192 is configured to be able to set an exposure period for each pixel block having a predefined size, and flexibility in setting the exposure period is not necessarily high. Thus, it may be difficult to capture an image with a suitable exposure period in accordance with the situation of an object, and this may reduce image quality. Although the flexibility in setting an exposure period can be improved if the size of a pixel block is reduced, such a reduction of the size of each pixel block increases the number of pixel blocks and also increases the number of signal lines, which results in complicated control and causes a reduction in the opening ratio.

SUMMARY

The present disclosure intends to provide a technology that may improve image quality while suppressing an increase in complexity of the configuration and an increase in complicatedness of control in an imaging device that can control imaging conditions on a pixel block basis.

According to one aspect of the present disclosure, provided is an imaging device including a plurality of pixels arranged to form a plurality of pixel rows and a plurality of pixel columns, and each of the plurality of pixels includes a photoelectric converter, and a control unit that controls an accumulation period for accumulation of charge in the plurality of pixels. The plurality of pixels is divided into a plurality of pixel blocks that are parts different from each other of the plurality of pixels, and each of the plurality of pixel blocks includes a pixel group arranged over at least two pixel rows or at least two pixel columns, the control unit is configured to control the accumulation period for each of the plurality of pixel blocks, the plurality of pixel blocks include a first pixel block, a second pixel block, and a third pixel block arranged between the first pixel block and the second pixel block, and the control unit includes a first mode to control the accumulation period in the third pixel block commonly to the accumulation period in the first pixel block and, control the accumulation period in the second pixel block independently of the accumulation period in the first pixel block and the third pixel block, and a second mode to control the accumulation period in the third pixel block commonly to the accumulation period in the second pixel block and, control the accumulation period in the first pixel block independently of the accumulation period in the second pixel block and the third pixel block.

Further, according to another aspect of the present disclosure, provided is an imaging device including a plurality of pixels arranged to form a plurality of pixel rows and a plurality of pixel columns, and each of the plurality of pixels includes a photoelectric converter, and a control unit that controls an accumulation period for accumulation of charge in the plurality of pixels. The plurality of pixels is divided into a plurality of pixel blocks that are parts different from each other of the plurality of pixels, and each of the plurality of pixel blocks includes a pixel group arranged over at least two pixel rows or at least two pixel columns, the control unit is configured to control the accumulation period for each of the plurality of pixel blocks, the plurality of pixel blocks include a first pixel block, a second pixel block, and a third pixel block arranged between the first pixel block and the second pixel block, and the number of pixels included in the third pixel block is different from the number of pixels included in the first pixel block and the number of pixels included in the second pixel block.

Further, according to yet another aspect of the present disclosure, provided is an imaging device including a plurality of pixels arranged to form a plurality of rows and a plurality of columns, and each of the plurality of pixels includes a photoelectric converter, an amplifier unit that amplifies a signal based on charge generated by the photoelectric converter, and a control unit that controls a gain of the amplifier unit. The plurality of pixels is divided into a plurality of pixel blocks that are parts different from each other of the plurality of pixels, and each of the plurality of pixel blocks includes a pixel group arranged over at least two rows or at least two columns, the control unit is configured to control the gain for each of the plurality of pixel blocks, the plurality of pixel blocks include a first pixel block, a second pixel block, and a third pixel block arranged between the first pixel block and the second pixel block on the same pixel block row, and the control unit is configured to control the amplifier unit so that the gain to a signal based on charge generated by the photoelectric converter of a pixel arranged in the third pixel block is the same as one of the gain to a signal based on charge generated by the photoelectric converter of a pixel arranged in the first pixel block and the gain to a signal based on charge generated by the photoelectric converter of a pixel arranged in the second pixel block.

Further features of the present disclosure will become apparent from the following description of exemplary embodiments with reference to the attached drawings.

BRIEF DESCRIPTION OF THE DRAWINGS

FIG. 21 is a block diagram illustrating an example of a configuration of a pixel unit in an imaging device according to a fifth embodiment of the present disclosure.

DESCRIPTION OF THE EMBODIMENTS

Preferred embodiments of the present disclosure will now be described in detail in accordance with the accompanying drawings.

First Embodiment

Figure 1:
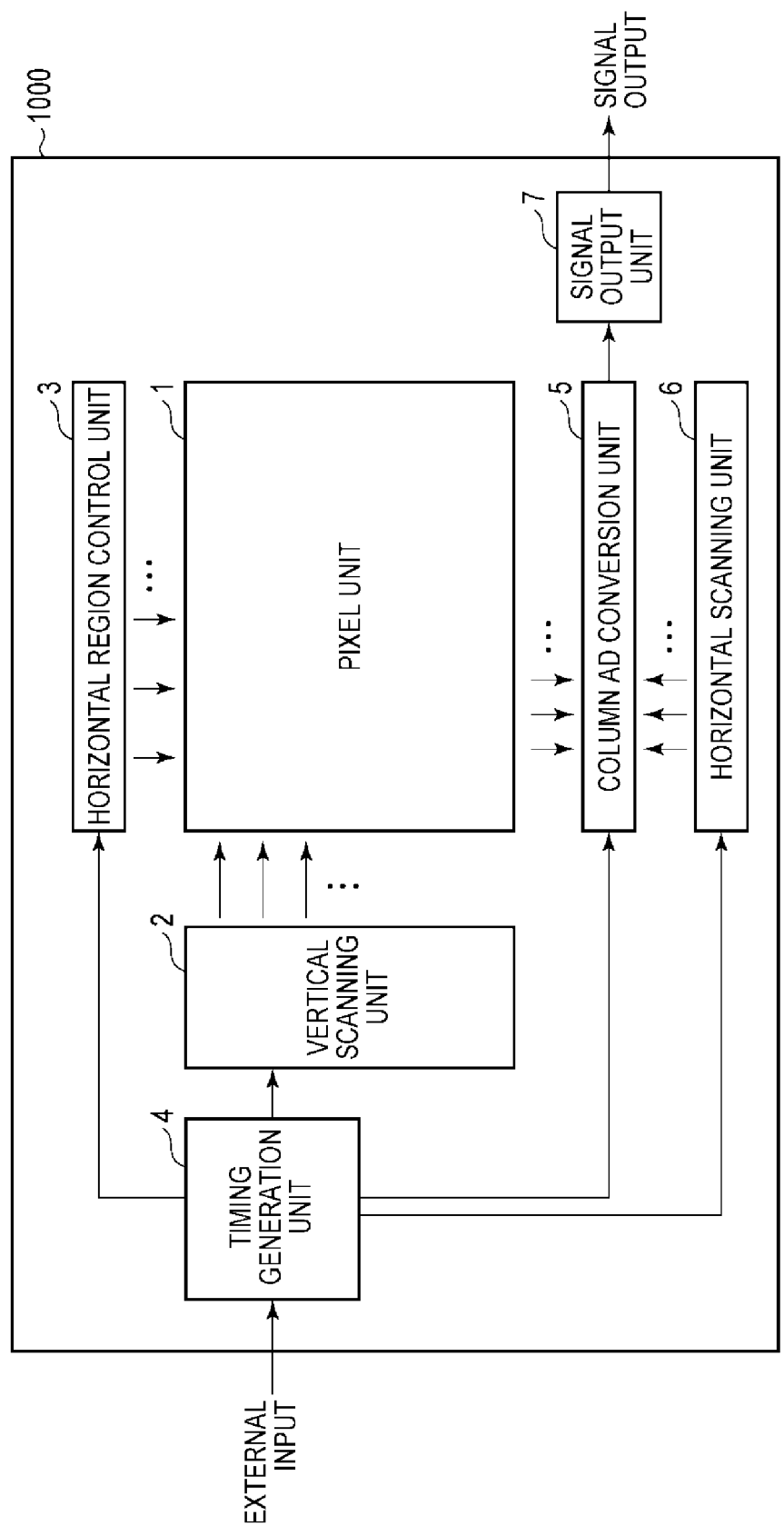
FIG. 1 is a block diagram illustrating a general configuration of an imaging device according to a first embodiment of the present disclosure.
Figure 2:
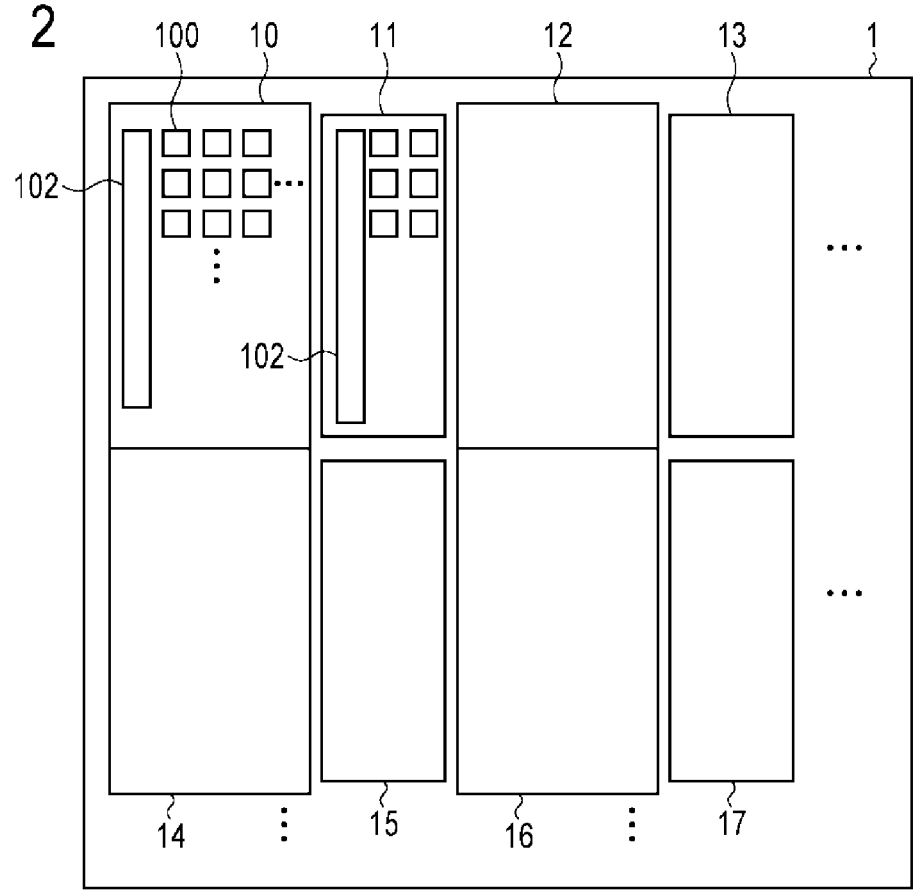
FIG. 2 is a block diagram illustrating an example of a configuration of a pixel unit in the imaging device according to the first embodiment of the present disclosure.
Figure 3:
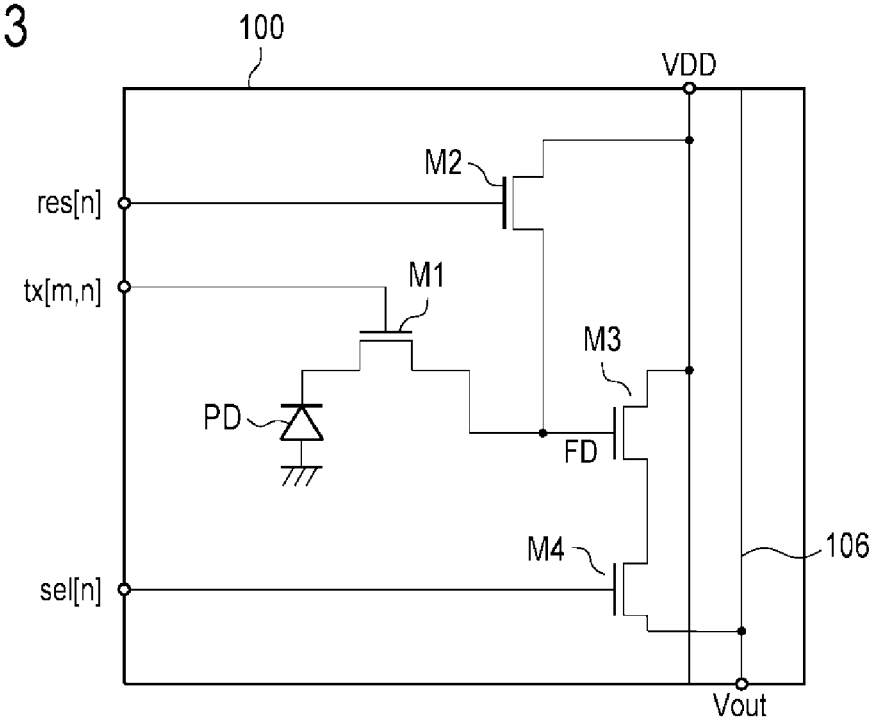
FIG. 3 is a circuit diagram illustrating an example of a configuration of a pixel in the imaging device according to the first embodiment of the present disclosure.
Figure 4:
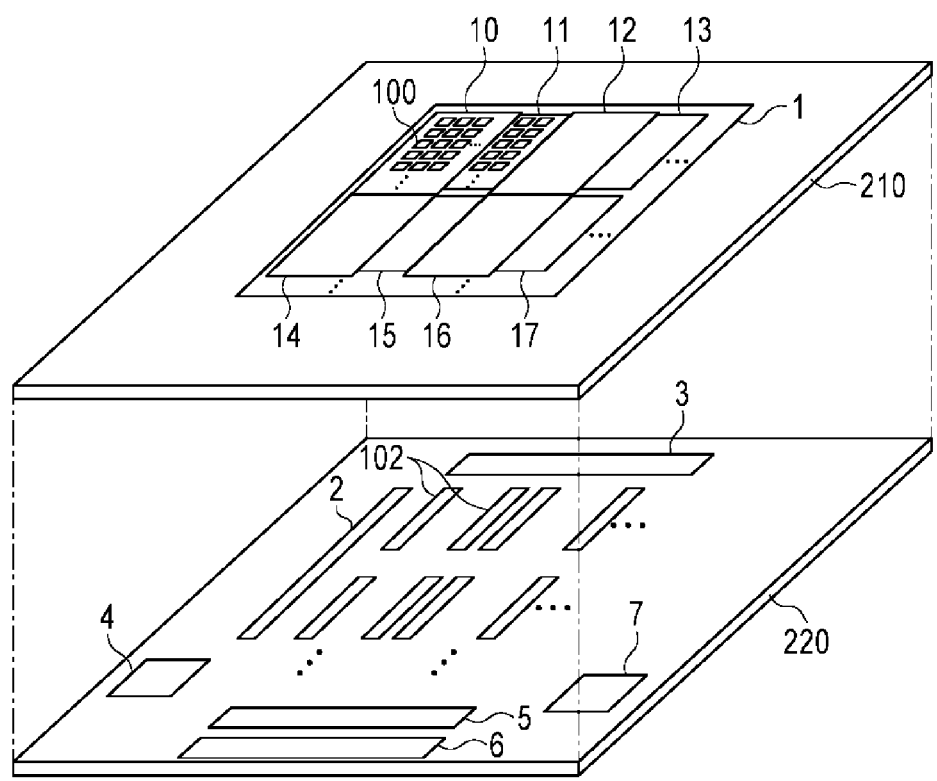
FIG. 4 is a schematic diagram illustrating an example of arrangement of each block in the imaging device according to the first embodiment of the present disclosure.
Figure 5A:
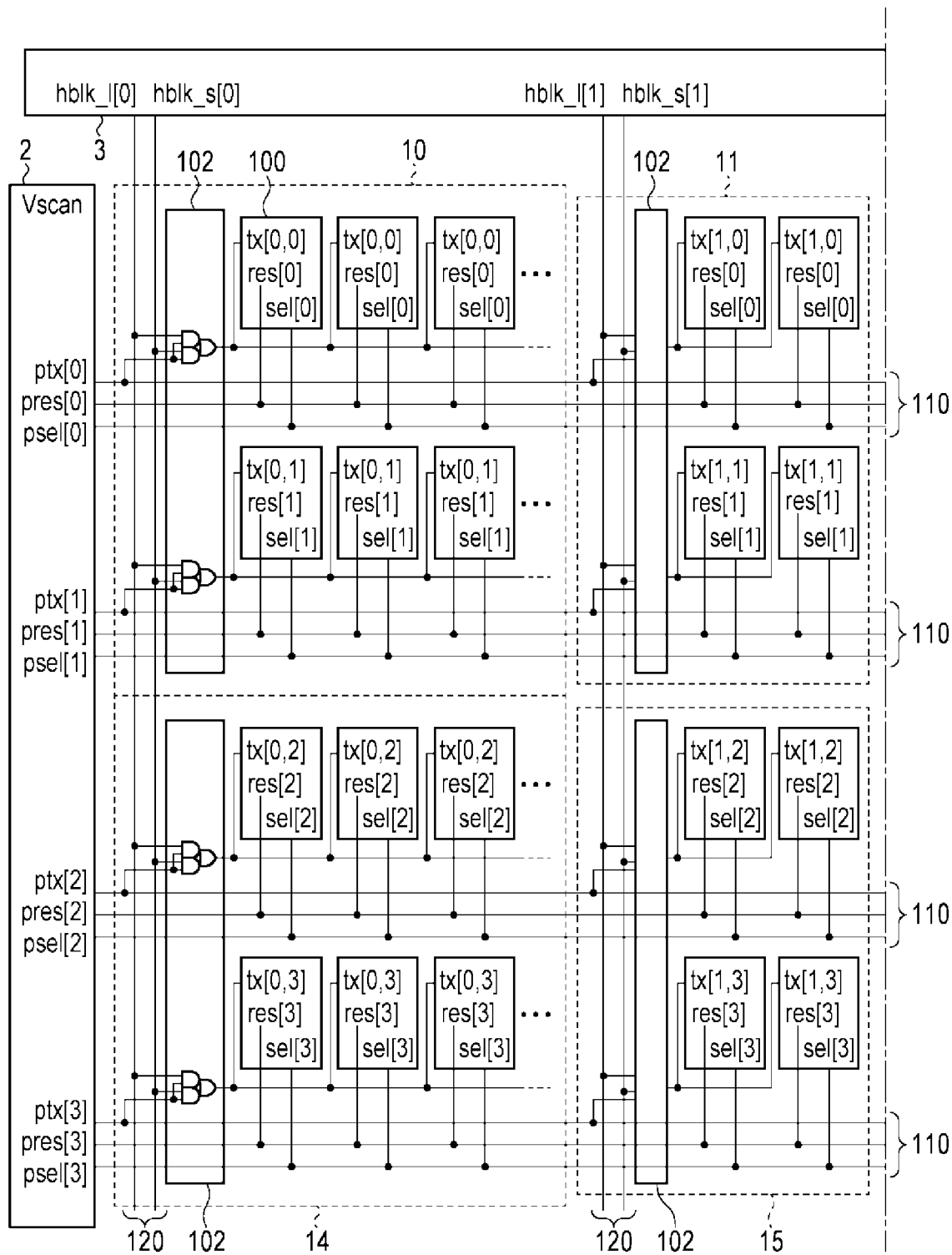
FIG. 5A and FIG. 5B are circuit diagrams illustrating an example of connection between pixel blocks and a vertical scanning unit and between the pixel blocks and a horizontal region control unit in the imaging device according to the first embodiment of the present disclosure.
Figure 5B:
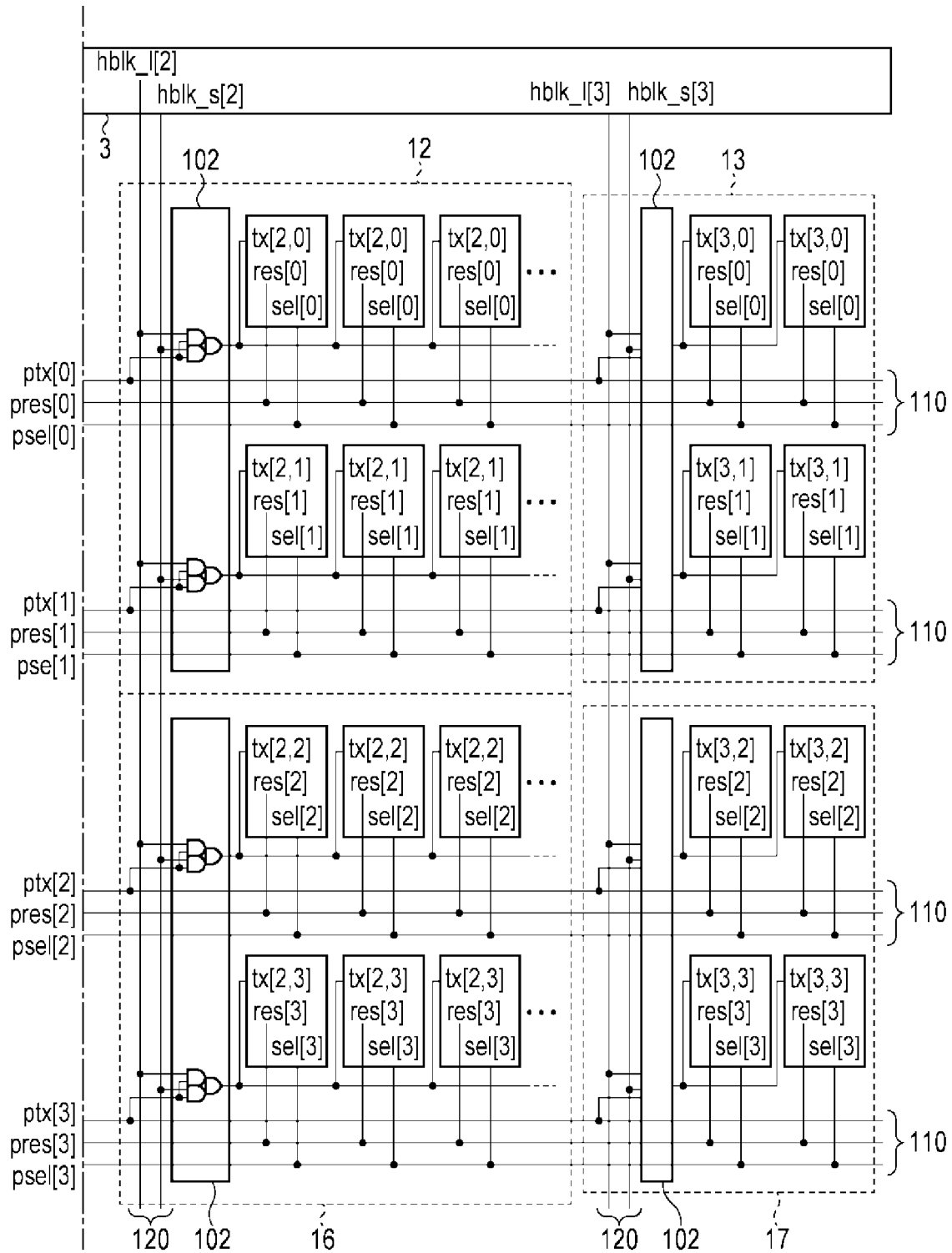

A general configuration of an imaging device according to a first embodiment of the present disclosure will be described with reference to FIG. 1 to FIG. 5B. FIG. 1 is a block diagram illustrating a general configuration of an imaging device according to the present embodiment. FIG. 2 is a block diagram illustrating an example of a configuration of a pixel unit in the imaging device according to the present embodiment. FIG. 3 is a circuit diagram illustrating an example of a configuration of a pixel in the imaging device according to the present embodiment. FIG. 4 is a schematic diagram illustrating an example of arrangement of each block in the imaging device according to the present embodiment. FIG. 5A and FIG. 5B are circuit diagrams illustrating an example of connection between pixel blocks and a vertical scanning unit and between the pixel blocks and a horizontal region control unit in the imaging device according to the present embodiment. Note that, in the present specification, description for any one of embodiments is common to all the remaining embodiments unless otherwise specified.

As illustrated in FIG. 1, an imaging device 1000 according to the present embodiment includes a pixel unit 1, a vertical scanning unit 2, a horizontal region control unit 3, a timing generation unit 4, a column AD conversion unit 5, a horizontal scanning unit 6, and a signal output unit 7.

In the pixel unit 1, a plurality of pixels each including a photoelectric converter is arranged two-dimensionally to from a plurality of rows and a plurality of columns. In the present specification, a direction in which each row extends (row direction) is defined as the horizontal direction, and a direction in which each column extends (column direction) is defined as the vertical direction. The vertical scanning unit 2, the horizontal region control unit 3, and the column AD conversion unit 5 are connected to the pixel unit 1.

The vertical scanning unit 2 is a control circuit that performs an operation to supply control signals sequentially on a row basis to a plurality of pixels arranged in the pixel unit 1, that is, vertical scanning and controls driving of the plurality of pixels on a row basis.

The horizontal region control unit 3 is a control circuit that supplies control signals indicating being enabled (enable signal) or control signals indicating being disabled (disable signal) to pixel blocks arranged in the horizontal direction out of a plurality of pixel blocks defined in the pixel unit 1. Note that the pixel block will be described later.

The column AD conversion unit 5 is a signal processing circuit that performs analog-to-digital conversion on pixel signals (analog pixel signals), which are output from respective columns of the pixel unit 1, in parallel with respect to columns. The column AD conversion unit 5 includes line memories (not illustrated) that temporarily store pixel signals (digital pixel signals) on respective columns on which analog-to-digital conversion has been performed. An amplifier unit may be provided in a pre-stage of the column AD conversion unit 5, and analog-to-digital conversion may be performed by the column AD conversion unit 5 on the amplified analog pixel signals. The horizontal scanning unit 6 and the signal output unit 7 are connected to the column AD conversion unit 5.

The horizontal scanning unit 6 is a control circuit that performs an operation to sequentially select digital pixel signals on respective columns held by the line memories of the column AD conversion unit 5 in accordance with control signals supplied to the column AD conversion unit 5 and transfer the selected digital pixel signals to the signal output unit 7, that is, performs a horizontal scan.

The signal output unit 7 is an output circuit that performs predetermined signal processing on digital pixel signals transferred from the line memories of the column AD conversion unit 5 and outputs the processed digital pixel signal as a signal conforming to a desired protocol to the outside of the imaging device 1000. The signal processing performed by the signal output unit 7 may be, for example, an amplification process, a digital correlation double sampling process, or the like.

The timing generation unit 4 is a control circuit that supplies, to the vertical scanning unit 2, the horizontal region control unit 3, the column AD conversion unit 5, and the horizontal scanning unit 6, control signals that control the operations thereof or the timings of the operations. The timing generation unit 4 receives information related to reference driving of the imaging device 1000 in response to external input and receives information related to various settings of the imaging device 1000 in accordance with external communication. The timing generation unit 4 generates and outputs control signals used for controlling the vertical scanning unit 2, the horizontal region control unit 3, the column AD conversion unit 5, and the horizontal scanning unit 6 based on the received information. Note that at least some of the control signals for the vertical scanning unit 2, the horizontal region control unit 3, the column AD conversion unit 5, and the horizontal scanning unit 6 may be directly supplied from the outside of the imaging device 1000 without being routed through the timing generation unit 4.

As illustrated in FIG. 2, the pixel unit 1 includes a plurality of pixel blocks 10, 11, 12, 13, 14, 15, 16, 17, . . . , and so on arranged two-dimensionally so as to form a plurality of rows and a plurality of columns. Each of the plurality of pixel blocks 10, 11, 12, 13, 14, 15, 16, 17, . . . , and so on includes some of the plurality of pixels 100 arranged in the pixel unit 1 and a signal generation unit 102.

The signal generation unit 102 is a control circuit that performs control of accumulation period (exposure period) for accumulation of signal charge or control of readout thereof on the pixels 100 in a pixel block to which the signal generation unit 102 belongs based on control signals from the vertical scanning unit 2 and the horizontal region control unit 3. That is, the signal generation unit 102 forms a control unit that controls the pixel unit 1 together with the vertical scanning unit 2 and the horizontal region control unit 3. The vertical scanning unit 2 supplies control signals on a pixel row basis to the plurality of pixels 100 forming the pixel unit 1. The horizontal region control unit 3 supplies control signals on a pixel block column basis to the plurality of pixel blocks forming the pixel unit 1. The signal generation unit 102 generates a control signal used for controlling an accumulation period in a corresponding pixel block based on the control signal supplied from the vertical scanning unit 2 and the control signal supplied from the horizontal region control unit 3.

In an example of a configuration of the pixel unit 1 illustrated in FIG. 2, the number of pixels 100 forming the pixel blocks 10, 12, 14, and 16 is larger than the number of pixels 100 forming the pixel blocks 11, 13, 15, and 17. The pixel blocks 10, 12, 14, and 16 including a larger number of pixels and the pixel blocks 11, 13, 15, and 17 including a smaller number of pixels are arranged alternately in the horizontal direction.

Note that, in the present specification, a row whose unit is the pixel 100 may be referred to as a pixel row, a column whose unit is the pixel 100 may be referred to as a pixel column, a row whose unit is a pixel block may be referred to as a pixel block row, and a column whose unit is a pixel block may be referred to as a pixel block column. For example, FIG. 2 illustrates a portion of the pixel blocks 10 to 17 arranged in a matrix of two pixel block rows by four pixel block columns out of the plurality of pixel blocks forming the pixel unit 1.

As illustrated in FIG. 3, each of the plurality of pixels 100 forming the pixel unit 1 includes a photoelectric converter PD, a transfer transistor M1, a reset transistor M2, an amplifier transistor M3, and a select transistor M4.

The photoelectric converter PD is a photodiode, for example. The photodiode forming the photoelectric converter PD has the anode connected to a reference voltage node and the cathode connected to the source of the transfer transistor M1. The drain of the transfer transistor M1 is connected to the source of the reset transistor M2 and the gate of the amplifier transistor M3. The connection node of the drain of the transfer transistor M1, the source of the reset transistor M2, and the gate of the amplifier transistor M3 is a so-called floating diffusion (FD) node. The capacitance component coupled to the FD node functions as a charge holding portion and forms a charge-voltage conversion unit made of this capacitance component. The drain of the reset transistor M2 and the drain of the amplifier transistor M3 are connected to a power supply voltage node (voltage VDD). The source of the amplifier transistor M3 is connected to the drain of the select transistor M4. The source of the select transistor M4 that is also an output node of the pixel 100 is connected to the vertical output line 106. A current source (not illustrated) is connected to the vertical output line 106.

A control signal tx [m, n] is supplied to the gate of the transfer transistor M1 from the signal generation unit 102 of a pixel block to which the pixel 100 of interest belongs. A control signal res [n] is supplied to the gate of the reset transistor M2 from the vertical scanning unit 2. A control signal sel [n] is supplied to the gate of the select transistor M4 from the vertical scanning unit 2. Herein, the number m denotes a pixel block column number (horizontal block address) of a pixel block to which the pixel 100 of interest belongs, and the number n denotes a pixel row number (vertical row address) of the pixel 100 of interest. When each transistor of the pixel 100 is formed of an n-channel transistor, a corresponding transistor is in an on-state when the control signal is at a High level, and a corresponding transistor is in an off-state when the control signal is at a Low level.

In response to an optical image of an object entering the pixel unit 1, the photoelectric converter PD of each pixel 100 converts (photoelectrically converts) the incident light into an amount of charge in accordance with the light amount thereof and accumulates generated charge. When turned on, the transfer transistor M1 transfers charge held in the photoelectric converter PD to the FD node. The voltage of the FD node becomes a voltage in accordance with the amount of charge transferred from the photoelectric converter PD due to charge-voltage conversion caused by the capacitance component of the FD node. The amplifier transistor M3 is configured such that the voltage VDD is supplied to the drain and bias current is supplied to the source from a current source (not illustrated) via the select transistor M4 and forms an amplifier unit (source follower circuit) whose gate is the input node. Thereby, the amplifier transistor M3 outputs a signal based on the voltage of the FD node to the vertical output line 106 via the select transistor M4. When turned on, the reset transistor M2 resets the FD node to a voltage in accordance with the voltage VDD.

As illustrated in FIG. 4, for example, the imaging device 1000 according to the present embodiment may be formed by dividing each block illustrated in FIG. 1 and FIG. 2 into two semiconductor substrates 210 and 220 and stacking these semiconductor substrate 210 and 220 on each other. The semiconductor substrate 210 and the semiconductor substrate 220 may be electrically connected to each other via a conductive member such as a bump electrode or a through electrode, for example.

FIG. 4 is an example of a configuration in which, out of the blocks illustrated in FIG. 1 and FIG. 2, only the pixels 100 of the pixel unit 1 are arranged on the upper semiconductor substrate 210, and the signal generation units 102 of the pixel unit 1 and the remaining blocks are arranged on the lower semiconductor substrate 220. With the pixels 100 and the signal generation units 102 being arranged on the separate semiconductor substrates 210 and 220, respectively, the plurality of pixels 100 included in a plurality of pixel blocks can be arranged inside the pixel unit 1 evenly and tightly without being affected by the arrangement of the signal generation units 102.

In the example of the configuration illustrated in FIG. 4, control signals from the vertical scanning unit 2 lying on the lower semiconductor substrate 220 and control signals from the horizontal region control unit 3 also lying on the lower semiconductor substrate 220 are directly transferred to the signal generation units 102 lying on the lower semiconductor substrate 220. Control signals decoded in the signal generation units 102 are transferred to the upper semiconductor substrate 210, and the pixels 100 of the pixel unit 1 lying on the upper semiconductor substrate 210 are driven. Output signals from the pixel unit 1 are transferred to the lower semiconductor substrate 220 and processed in the column AD conversion unit 5 lying on the lower semiconductor substrate 220. Digital signals on a column whose address is specified by the horizontal scanning unit 6 also lying on the lower semiconductor substrate 220 are then processed in the signal output unit 7 lying on the lower semiconductor substrate 220 and output to the outside of the imaging device 1000.

Note that the configuration illustrated in FIG. 4 is an example, and the arrangement of respective blocks illustrated in FIG. 1 and FIG. 2 is not limited thereto. For example, the pixels 100 and the signal generation units 102 may be arranged on the semiconductor substrate 210 side, and the remaining blocks may be arranged on the semiconductor substrate 220 side. In such a case, it is desirable that an optical waveguide be arranged so that light enters and passes through a micro lens (not illustrated) avoids the signal generation unit 102 and enters the photoelectric converter PD.

Next, an example of connection between the vertical scanning unit 2 and pixel blocks and between the horizontal region control unit 3 and the pixel blocks will be described with reference to FIG. 5A and FIG. 5B. For simplified illustration, FIG. 5A and FIG. 5B illustrate only the pixel blocks corresponding to the pixel blocks 10 to 17 illustrated in FIG. 2 out of a plurality of pixel blocks forming the pixel unit 1. Further, each of the pixel blocks 10 to 17 may be any pixel block that includes a pixel group arranged in at least two pixel rows or at least two pixel columns. Although FIG. 5A and FIG. 5B illustrate an example in which each of the pixel blocks 10 to 17 is formed of two pixel rows, the number of pixel rows forming each of the pixel blocks is not particularly limited. Further, the number of pixel columns forming each of the pixel blocks is not particularly limited. For example, each of the pixel blocks 11, 13, 15, and 17 may be formed to include only one pixel column.

The vertical scanning unit 2 decodes a vertical row address signal (not illustrated) provided from the timing generation unit 4 to generate control signals ptx [n], pres [n], and psel [n] for each row. Herein, the appended index [n] of each control signal denotes a value of the vertical row address described above. FIG. 5A and FIG. 5B illustrate control signals ptx [0] to ptx [3], pres [0] to pres [3], and psel [0] to psel [3] as control signals corresponding to the vertical row addresses [0] to [3].

The control signals ptx [n], pres [n], and psel [n] are supplied to pixel blocks including the pixels 100 arranged in a row corresponding to the vertical row address [n] via control lines 110 arranged for each vertical row address. Each of the control lines 110 is arranged extending in a first direction (the horizontal direction or the row direction) and forms a signal line common to the signal generation units 102 having a common vertical row address and the pixels 100 having a common vertical row address.

The control signal ptx [n] is provided to the signal generation units 102 of a pixel block arranged on a row corresponding to the vertical row address [n]. That is, the control signals ptx [0] and ptx [1] are provided to the signal generation units 102 of the pixel blocks 10, 11, 12, and 13 arranged on rows corresponding to the vertical row addresses [0] and [1]. The control signals ptx [2] and ptx [3] are provided to the signal generation units 102 of the pixel blocks 14, 15, 16, and 17 arranged on rows corresponding to the vertical row addresses [2] and [3].

The control signal pres [n] and control signal psel [n] are provided to the pixels 100 arranged on a row corresponding to the vertical row address [n]. That is, the control signal pres [0] and psel [0] are provided to the pixels 100 arranged on a row corresponding to the vertical row address [0] out of the pixels 100 belonging to the pixel blocks 10, 11, 12, and 13. The control signal pres [1] and psel [1] are provided to the pixels 100 arranged on a row corresponding to the vertical row address [1] out of the pixels 100 belonging to the pixel blocks 10, 11, 12, and 13. The control signal pres [2] and psel [2] are provided to the pixels 100 arranged on a row corresponding to the vertical row address [2] out of the pixels 100 belonging to the pixel blocks 14, 15, 16, and 17. The control signal pres [3] and psel [3] are provided to the pixels 100 arranged on a row corresponding to the vertical row address [3] out of the pixels 100 belonging to the pixel blocks 14, 15, 16, and 17.

The horizontal region control unit 3 generates control signals hblk_1 [m] and hblk_s [m] based on a signal (not illustrated) provided from the timing generation unit 4. Herein, the appended index [m] of each control signal denotes a value of the horizontal block address described above. FIG. 5A and FIG. 5B illustrate control signals hblk_1 [0] to hblk_1[3] and hblk_s [0] to hblk_s [3] as control signals corresponding to the horizontal block addresses [0] to [3]. Herein, the control signal hblk_1[m] is a control signal enabled during control of long-time exposure. Further, the control signal hblk_s [m] is a control signal enabled during control of short-time exposure.

Note that, in the present specification, "long-time exposure" refers to an operation to perform accumulation of signal charge during a relatively longer exposure period when an exposure period of the photoelectric converter PD of the pixel 100 is defined for each pixel block. Further, "short-time exposure" refers to an operation to perform accumulation of signal charge during a relatively shorter exposure period when an exposure period of the photoelectric converter PD of the pixel 100 is defined for each pixel block. Although a case where two types of exposure periods are employed is described for simplified illustration in the present embodiment, three or more types of exposure periods may be employed. In such a case, the number of control signals hblk for each horizontal block address is increased in accordance with the types of the length of an exposure period.

The control signals hblk_1 [m] and hblk_s [m] are supplied to pixel blocks belonging to a corresponding horizontal block address [m] via a control line 120 arranged for each horizontal block address. Each of the control lines 120 is arranged extending in a second direction (the vertical direction or the column direction) crossing the first direction and forms a signal line common to pixel blocks having a common horizontal block address.

The control signals hblk_1 [m] and hblk_s [m] are provided to the signal generation units 102 of pixel blocks belonging to a corresponding horizontal block address [m]. That is, the control signals hblk_1 [0] and hblk_s [0] are provided to the signal generation units 102 of the pixel blocks 10 and 14 belonging to the horizontal block address [0]. The control signals hblk_1 [1] and hblk_s [1] are provided to the signal generation units 102 of the pixel blocks 11 and 15 belonging to the horizontal block address [1]. The control signals hblk_1 [2] and hblk_s [2] are provided to the signal generation units 102 of the pixel blocks 12 and 16 belonging to the horizontal block address [2]. The control signals hblk_1 [3] and hblk_s [3] are provided to the signal generation units 102 of the pixel blocks 13 and 17 belonging to the horizontal block address [3].

The signal generation units 102 in the pixel blocks 10 to 17 generate control signals tx [m, n] based on the control signals ptx [n], hblk_1 [m], and hblk_s [m]. The control signal tx [m, n] is provided to the pixels 100 in a pixel block corresponding to the horizontal block address [m] and the vertical row address [n].

For example, the control signal tx [0, 0] is provided to the pixels 100 arranged on a row corresponding to the vertical row address [0] out of the pixels 100 of the pixel block 10. The control signal tx [0, 1] is provided to the pixels 100 arranged on a row corresponding to the vertical row address [1] out of the pixels 100 of the pixel block 10. The control signal tx [1, 2] is provided to the pixels 100 arranged on a row corresponding to the vertical row address [2] out of the pixels 100 of the pixel block 15. The control signal tx [1, 3] is provided to the pixels 100 arranged on a row corresponding to the vertical row address [3] out of the pixels 100 of the pixel block 15. The same applies to other pixel blocks.

The signal generation unit 102 receives the control signal ptx [n] and the control signals hblk_1 [m] and hblk_s [m] as input and outputs the control signal tx [m, n]. When the control signal ptx [n] transitions to the High level when the control signal hblk_1 [m] or the control signal hblk_s [m] is at the High level, the control signal tx [m, n] transitions to the High level.

A circuit that implements such operation in the signal generation unit 102 is not particularly limited and may be formed of a logic circuit illustrated in FIG. 5A and FIG. 5B, for example. The logic circuit illustrated in FIG. 5A and FIG. 5B includes an AND gate that performs logical product operation of the control signal ptx [n] and the control signal hblk_1 [m], an AND gate that performs logical product operation of the control signal ptx [n] and the control signal hblk_s [m], and an OR gate that performs logical sum operation of these output signals. The output of the OR gate is the control signal tx [m, n].

The imaging device disclosed by Japanese Patent Application Laid-Open No. 2006-197192 described above is configured to set an exposure period for each pixel block having a predefined region size. It is assumed here that the imaging device as disclosed in Japanese Patent Application Laid-Open No. 2006-197192 is embedded in a fixed camera that is unable to be panned or tilted, such as a surveillance camera, for example. In such a situation, when an object moving from a pixel block of a short-time exposure setting to a pixel block of a long-time exposure setting is captured, the object may be captured in the pixel block of the long-time exposure setting used for capturing a dark background when the object moves at a particular moving speed. As a result, the target object may blur, and image quality may decrease. Although the flexibility in setting an exposure period can be improved if the region size of a pixel block is reduced, such a reduction of the region size of each pixel block increases the number of pixel blocks and also increases the number of signal lines, which results in complicated control and causes a reduction in the opening ratio.

On the other hand, in the present embodiment, in the imaging device that can control the exposure period on a pixel block basis, two types of pixel blocks having different region sizes are set in the pixel unit 1, and these pixel blocks are arranged alternately in the horizontal direction. Specifically, the number of pixels included in the pixel blocks 11, 13, 15, and 17 is smaller than the number of pixels included in the pixel blocks 10, 12, 14, and 16. It is therefore possible to improve flexibility in the arrangement of regions for which an exposure period is set or the region size thereof compared to a case where pixel blocks having an even region size are set in the pixel unit 1. This facilitates suitable arrangement of exposure areas in accordance with an object, such as an exposure area suitable for a moving object or an exposure area suitable for a dark background, and it is possible to prevent a reduction in image quality. Further, since the number of pixel blocks per unit area can be smaller than that in a case where the region sizes of all the pixel blocks are evenly reduced, it is also possible to suppress an increase in complicatedness of control and an increase of signal lines.

Figure 6:
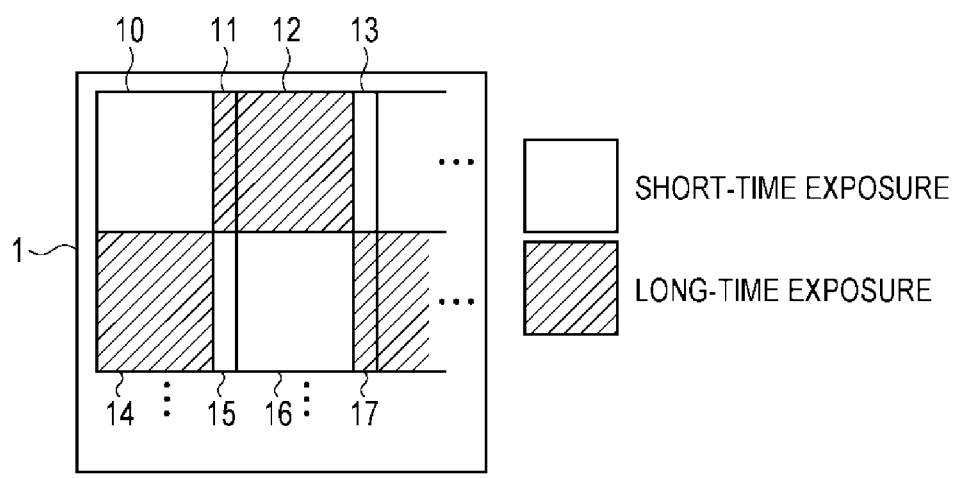
FIG. 6 is a diagram schematically illustrating exposure periods in each pixel block inside the pixel unit.
Figure 7:
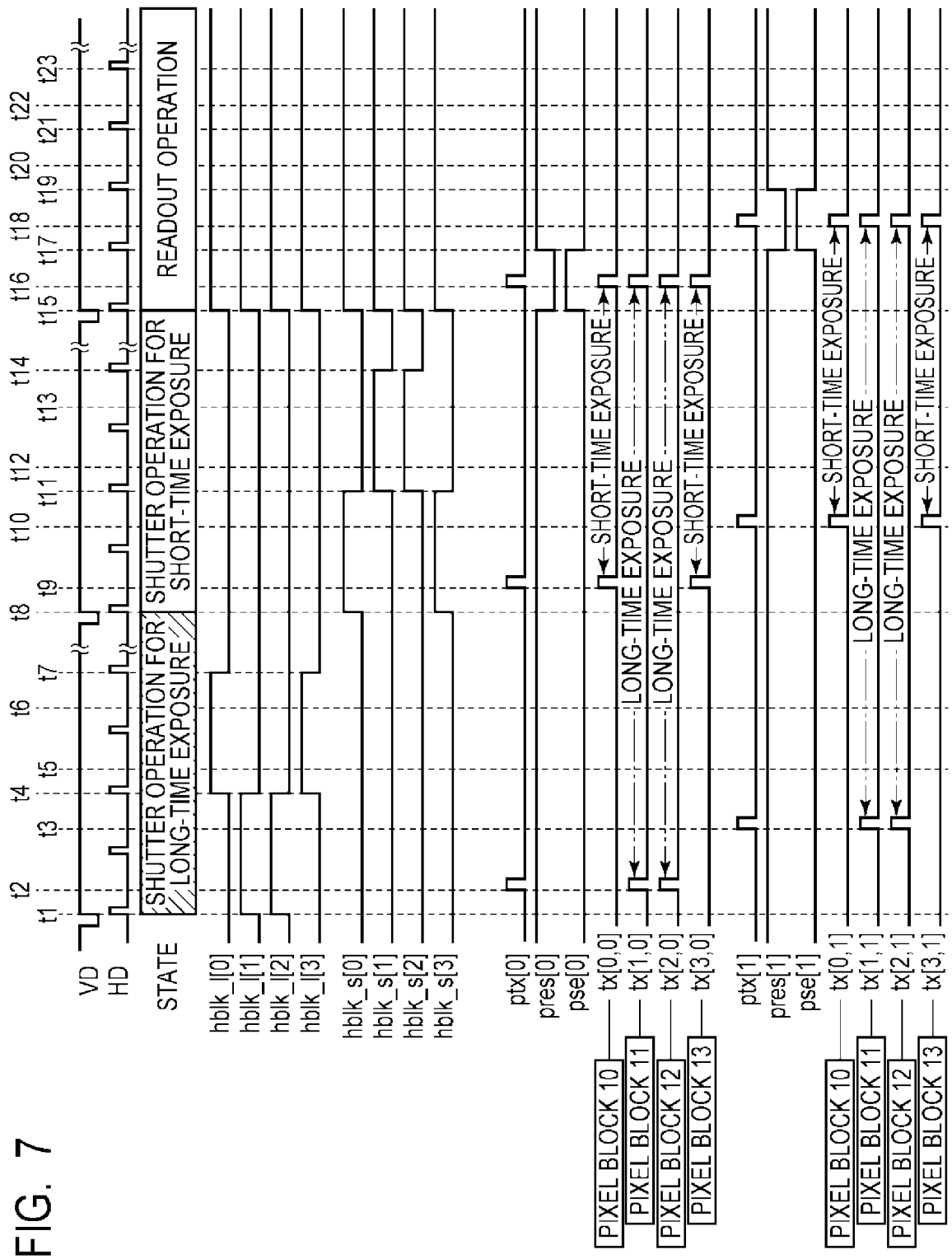
FIG. 7 and FIG. 8 are timing charts illustrating a method of driving the imaging device according to the first embodiment of the present disclosure.
Figure 8:
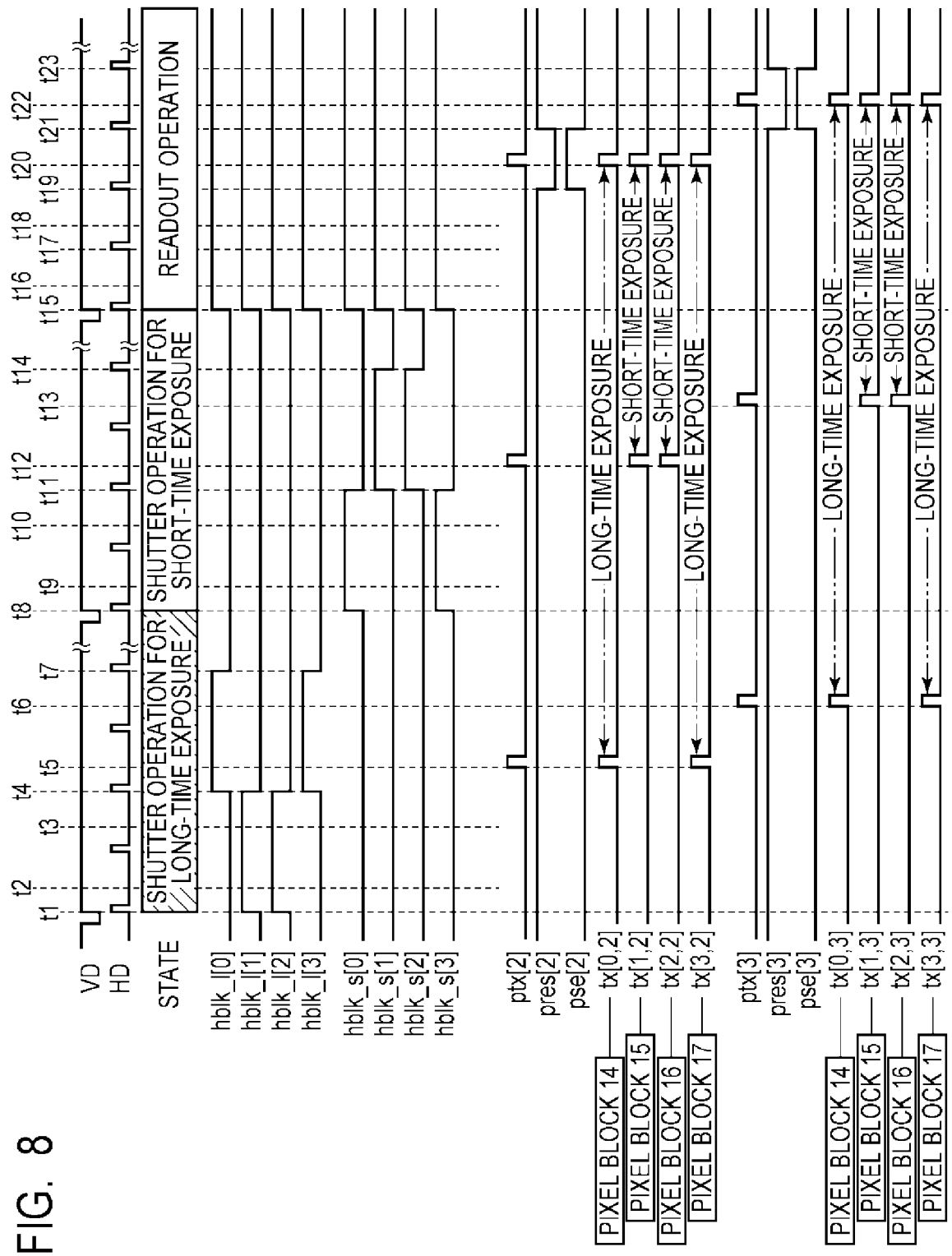

Next, a method of driving the imaging device according to the present embodiment will be described with reference to FIG. 6 to FIG. 8. FIG. 6 is a diagram schematically illustrating an exposure period in each pixel block in the pixel unit. FIG. 7 and FIG. 8 are timing charts illustrating the method of driving the imaging device according to the present embodiment.

An operation illustrated in FIG. 6 is assumed here as an example of controlling the exposure period for each pixel block of the pixel unit 1. That is, FIG. 6 illustrates that, out of the pixel unit 1, control of short-time exposure is performed on the pixel blocks 10, 13, 15, and 16 that are bright as a whole, and control of long-time exposure is performed on the pixel blocks 11, 12, 14, and 17 that are dark as a whole.

A specific example of driving of the imaging device 1000 for realizing the operation of FIG. 6 will be described with reference to FIG. 7 and FIG. 8. FIG. 7 is a timing diagram illustrating the operation of the pixel blocks 10, 11, 12, and 13, and FIG. 8 is a timing diagram illustrating the operation of the pixel blocks 14, 15, 16, and 17. FIG. 7 and FIG. 8 illustrate a horizontal synchronization signal HD and a vertical synchronization signal VD that are reference timing signals used for driving the imaging device 1000 in addition to the control signals that have been described so far. In the horizontal synchronization signal HD, the period between pulses adjacent to each other is a 1HD period. In this 1HD period, pixel driving for one row is performed, and an operation up to pixel output of the imaging device is performed. In the vertical synchronization signal VD, the period between pulses adjacent to each other is a 1VD period. The 1VD period corresponds to a period in which image output for one scan is performed.

FIG. 7 and FIG. 8 illustrate an operation for consecutive three scans. In these three scans, the first scan is a scan to perform a shutter operation for long-time exposure, the second scan is a scan to perform a shutter operation for short-time exposure, and the third scan is a scan to perform a readout operation for reading out pixel signals from the pixel unit 1. In this embodiment, one image is acquired by consecutive three scans.

First, the first scan, which is a scan to perform a shutter operation for long-time exposure, will be described. The first scan corresponds to the period of around time t1 to time t8 in FIG. 7 and FIG. 8.

At the period before time t1, the control signals pres [0], pres [1], pres [2], and pres [3] are at the High level, and the remaining control signals are at the Low level.

At time t1, the vertical synchronization signal VD and the horizontal synchronization signal HD externally supplied to the timing generation unit 4 are controlled to the High level, and the first HD period of the first scan starts. The first HD period is a period in which the pixels 100 on a row corresponding to the vertical row address [0] are driven.

The first scan is a period in which a shutter operation for long-time exposure is performed as described above. Therefore, in the first scan, the control signals hblk_1 [0], hblk_1 [1], hblk_1[2], and hblk_1[3] are controlled as appropriate. The control signals hblk_s [0], hblk_s [1], hblk_s [2], and hblk_s [3] are maintained at the Low level.

The pixel blocks to which the pixels 100 on the row corresponding to the vertical row address [0] belong are pixel blocks 10 and 13 on which short-time exposure is performed and pixel blocks 11 and 12 on which long-time exposure is performed, as illustrated in FIG. 7. Since the first scan corresponds to a period in which a shutter operation for long-time exposure is performed, the pixels 100 of the pixel blocks 10 and 13 on which short-time exposure is performed are not driven, and the pixels 100 of the pixel blocks 11 and 12 on which long-time exposure is performed are driven. That is, in response to the horizontal synchronization signal HD being controlled to the High level at time t1, the horizontal region control unit 3 controls the control signals hblk_1 [1] and hblk_1 [2] from the Low level to the High level in synchronization with the horizontal synchronization signal HD. Further, the horizontal region control unit 3 maintains the control signal hblk_1 [0] and the control signal hblk_1 [3] at the Low level.

Next, at time t2, the vertical scanning unit 2 controls the control signal ptx [0] on the row corresponding to the vertical row address [0] from the Low level to the High level. Thereby, the signal generation unit 102 of the pixel block 10 outputs the control signal tx [0, 0] at the Low level. Further, the signal generation unit 102 of the pixel block 11 outputs the control signal tx [1, 0] at the High level. Further, the signal generation unit 102 of the pixel block 12 outputs the control signal tx [2, 0] at the High level. Further, the signal generation unit 102 of the pixel block 13 outputs the control signal tx [3, 0] at the Low level.

Accordingly, while no operation is performed in the pixels 100 on the row corresponding to the vertical row address [0] in the pixel blocks 10 and 13, the transfer transistors M1 are turned on in the pixels 100 on the row corresponding to the vertical row address [0] in the pixel blocks 11 and 12. At this time, the control signal pres [0] is at the High level, the reset transistors M2 of the pixels 100 on the row corresponding to the vertical row address [0] are also in the on-state, and the FD nodes are in the reset state. Therefore, when the transfer transistors M1 are turned on, the photoelectric converters PD are reset to a potential in accordance with the voltage VDD via the reset transistors M2 and the transfer transistors M1.

The vertical scanning unit 2 controls the control signal ptx [0] from the High level to the Low level at a predetermined timing after the completion of reset of the photoelectric converters PD. Thereby, the control signals tx [1, 0] and tx [2, 0] output from the signal generation units 102 of the pixel blocks 11 and 12 also transition back to the Low level. The timing when the control signals tx [1, 0] and tx [2, 0] transition to the Low level is a timing when an exposure period of long-time exposure starts in the photoelectric converters PD of the pixels 100 on the row corresponding to the vertical row address [0] in the pixel blocks 11 and 12.

From time t2, the second HD period of the first scan starts at the next timing when the horizontal synchronization signal HD is controlled to the High level. The second HD period is a period in which the pixels 100 on a row corresponding to the vertical row address [1] are driven.

The first scan corresponds to a period in which a shutter operation for long-time exposure is performed, as described above. Therefore, also in the second HD period, the control signals hblk_1 [0], hblk_1 [1], hblk_1 [2], and hblk_1 [3] are controlled as appropriate. The control signals hblk_s [0], hblk_s [1], hblk_s [2], and hblk_s [3] are maintained at the Low level.

The pixel blocks to which the pixels 100 on the row corresponding to the vertical row address [1] belong are pixel blocks 10 and 13 on which short-time exposure is performed and pixel blocks 11 and 12 on which long-time exposure is performed, as illustrated in FIG. 7. That is, the rows corresponding to the vertical row address [0] and the vertical row address [1] belong to the same pixel blocks 10, 11, 12, and 13. Therefore, the operation performed on the row corresponding to the vertical row address [1] in the second HD period is the same as the operation performed on the row corresponding to the vertical row address [0] in the first HD period.

The horizontal region control unit 3 maintains the control signals hblk_1 [1] and hblk_1 [2] at the High level subsequently from the first HD period. Further, the horizontal region control unit 3 maintains the control signals hblk_1

[0], hblk_1[3], hblk_s [0], hblk_s [1], hblk_s [2], and hblk_s [3] at the Low level subsequently from the first HD period.

At time t3, the vertical scanning unit 2 controls the control signal ptx [1] on the row corresponding to the vertical row address [1] from the Low level to the High level. Thereby, the signal generation units 102 of the pixel blocks 10 and 13 output the control signals tx [0, 1] and tx [3, 1] at the Low level. Further, the signal generation units 102 of the pixel blocks 11 and 12 output the control signals tx [1, 1] and tx [2, 1] at the High level.

Accordingly, while no operation is performed in the pixels 100 on the row corresponding to the vertical row address [1] in the pixel blocks 10 and 13, the transfer transistors M1 are turned on in the pixels 100 on the row corresponding to the vertical row address [1] in the pixel blocks 11 and 12. At this time, the control signal pres [1] is at the High level, the reset transistors M2 of the pixels 100 on the row corresponding to the vertical row address [1] are also in the on-state, and the FD nodes are in the reset state. Therefore, when the transfer transistors M1 are turned on, the photoelectric converters PD are reset to a potential in accordance with the voltage VDD via the reset transistors M2 and the transfer transistors M1.

The vertical scanning unit 2 controls the control signal ptx [1] from the High level to the Low level at a predetermined timing after the completion of reset of the photoelectric converters PD. Thereby, the control signals tx [1, 1] and tx [2, 1] output from the signal generation units 102 of the pixel blocks 11 and 12 also transition back to the Low level. The timing when the control signals tx [1, 1] and tx [2, 1] transition to the Low level is a timing when an exposure period of long-time exposure starts in the photoelectric converters PD of the pixels 100 on the row corresponding to the vertical row address [1] in the pixel blocks 11 and 12.

At time t4, the horizontal synchronization signal HD is controlled to the High level, and the third HD period of the first scan starts. The third HD period is a period in which the pixels 100 on a row corresponding to the vertical row address [2] are driven.

The first scan corresponds to a period in which a shutter operation for long-time exposure is performed, as described above. Therefore, also in the third HD period, the control signals hblk_1 [0], hblk_1 [1], hblk_1 [2], and hblk_1 [3] are controlled as appropriate. The control signals hblk_s [0], hblk_s [1], hblk_s [2], and hblk_s [3] are maintained at the Low level.

The pixel blocks to which the pixels 100 on the row corresponding to the vertical row address [2] belong are pixel blocks 14 and 17 on which long-time exposure is performed and pixel blocks 15 and 16 on which short-time exposure is performed, as illustrated in FIG. 8. Since the first scan corresponds to a period in which a shutter operation for long-time exposure is performed, the pixels 100 of the pixel blocks 15 and 16 on which short-time exposure is performed are not driven, and the pixels 100 of the pixel blocks 14 and 17 on which long-time exposure is performed are driven.

That is, in response to the horizontal synchronization signal HD being controlled to the High level at time t4, the horizontal region control unit 3 controls the control signals hblk_1 [0] and hblk_1 [3] from the Low level to the High level in synchronization with the horizontal synchronization signal HD. Further, the horizontal region control unit 3 controls the control signals hblk_1 [1] and hblk_1 [2] from the High level to the Low level.

Next, at time t5, the vertical scanning unit 2 controls the control signal ptx [2] on the row corresponding to the vertical row address [2] from the Low level to the High level. Thereby, the signal generation units 102 of the pixel blocks 14 and 17 output the control signals tx [0, 2] and tx [3, 2] at the High level. Further, the signal generation units 102 of the pixel blocks 15 and 16 output the control signals tx [1, 2] and tx [2, 2] at the Low level.

Accordingly, while no operation is performed in the pixels 100 on the row corresponding to the vertical row address [2] in the pixel blocks 15 and 16, the transfer transistors M1 are turned on in the pixels 100 on the row corresponding to the vertical row address [2] in the pixel blocks 14 and 17. At this time, the control signal pres [2] is at the High level, the reset transistors M2 of the pixels 100 on the row corresponding to the vertical row address [2] are also in the on-state, and the FD nodes are in the reset state. Therefore, when the transfer transistors M1 are turned on, the photoelectric converters PD are reset to a potential in accordance with the voltage VDD via the reset transistors M2 and the transfer transistors M1.

The vertical scanning unit 2 controls the control signal ptx [2] from the High level to the Low level at a predetermined timing after the completion of reset of the photoelectric converters PD. Thereby, the control signals tx [0, 2] and tx [3, 2] output from the signal generation units 102 of the pixel blocks 14 and 17 also transition back to the Low level. The timing when the control signals tx [0, 2] and tx [3, 2] transition to the Low level is a timing when an exposure period of long-time exposure starts in the photoelectric converters PD of the pixels 100 on the row corresponding to the vertical row address [2] in the pixel blocks 14 and 17.

From time t5, the fourth HD period of the first scan starts at the next timing when the horizontal synchronization signal HD is controlled to the High level. The fourth HD period is a period in which the pixels 100 on a row corresponding to the vertical row address [3] are driven.

The first scan corresponds to a period in which a shutter operation for long-time exposure is performed, as described above. Therefore, also in the fourth HD period, the control signals hblk_1 [0], hblk_1 [1], hblk_1 [2], and hblk_1 [3] are controlled as appropriate. The control signals hblk_s [0], hblk_s [1], hblk_s [2], and hblk_s [3] are maintained at the Low level.

The pixel blocks to which the pixels 100 on the row corresponding to the vertical row address [3] belong are pixel blocks 14 and 17 on which long-time exposure is performed and pixel blocks 15 and 16 on which short-time exposure is performed, as illustrated in FIG. 8. That is, the rows corresponding to the vertical row address [2] and the vertical row address [3] belong to the same pixel blocks 14, 15, 16, and 17. Therefore, the operation performed on the row corresponding to the vertical row address [3] in the fourth HD period is the same as the operation performed on the row corresponding to the vertical row address [2] in the third HD period.

The horizontal region control unit 3 maintains the control signals hblk_1 [0] and hblk_1 [3] at the High level subsequently from the third HD period. Further, the horizontal region control unit 3 maintains the control signals hblk_1 [1], hblk_1[2], hblk_s [0], hblk_s [1], hblk_s [2], and hblk_s [3] at the Low level subsequently from the third HD period.

At time t6, the vertical scanning unit 2 controls the control signal ptx [3] on the row corresponding to the vertical row address [3] from the Low level to the High level. Thereby, the signal generation units 102 of the pixel blocks 14 and 17 output the control signals tx [0, 3] and tx [3, 3] at the High level. Further, the signal generation units 102 of the pixel blocks 15 and 16 output the control signals tx [1, 3] and tx [2, 3] at the Low level.

Accordingly, while no operation is performed in the pixels 100 on the row corresponding to the vertical row address [3] in the pixel blocks 15 and 16, the transfer transistors M1 are turned on in the pixels 100 on the row corresponding to the vertical row address [3] in the pixel blocks 14 and 17. At this time, the control signal pres [1] is at the High level, the reset transistors M2 of the pixels 100 on the row corresponding to the vertical row address [3] are also in the on-state, and the FD nodes are in the reset state. Therefore, when the transfer transistors M1 are turned on, the photoelectric converters PD are reset to a potential in accordance with the voltage VDD via the reset transistors M2 and the transfer transistors M1.

The vertical scanning unit 2 controls the control signal ptx [3] from the High level to the Low level at a predetermined timing after the completion of reset of the photoelectric converters PD. Thereby, the control signals tx [0, 3] and tx [3, 3] output from the signal generation units 102 of the pixel blocks 14 and 17 also transition back to the Low level. The timing when the control signals tx [0, 3] and tx [3, 3] transition to the Low level is a timing when an exposure period of long-time exposure starts in the photoelectric converters PD of the pixels 100 on the row corresponding to the vertical row address [3] in the pixel blocks 14 and 17.

At time t7, the horizontal synchronization signal HD is controlled to the High level, and the fourth HD period of the first scan ends. The horizontal region control unit 3 controls the control signals hblk_1 [0] and hblk_1 [3] from the High level to the Low level so that the control signal ptx [n] is not supplied to any of the pixel blocks.

In such a way, in the first scan, accumulation of signal charge is started in the pixels 100 of the pixel blocks 11, 12, 14, and 17, and no operation is performed on the pixels 100 of the pixel blocks 10, 13, 15, and 16.

Next, the second scan, which is a scan to perform a shutter operation for short-time exposure, will be described. The second scan corresponds to the period of around time t8 to time t15 in FIG. 7 and FIG. 8. In the second scan, accumulation of signal charge in the pixels 100 of the pixel blocks 10, 13, 15, and 16 is started without preventing the operation of accumulating signal charge in the pixels 100 of the pixel blocks 11, 12, 14, and 17.

At time t8, the vertical synchronization signal VD and the horizontal synchronization signal HD are controlled to the High level, and the first HD period of the second scan starts. The first HD period is a period in which the pixels 100 on the row corresponding to the vertical row address [0] are driven.

The second scan corresponds to a period in which a shutter operation for short-time exposure is performed, as described above. Therefore, in the second scan, the control signals hblk_s [0], hblk_s [1], hblk_s [2], and hblk_s [3] are controlled as appropriate. The control signals hblk_1 [0], hblk_1 [1], hblk_1 [2], and hblk_1 [3] are maintained at the Low level.

The pixel blocks to which the pixels 100 on the row corresponding to the vertical row address [0] belong are pixel blocks 10 and 13 on which short-time exposure is performed and pixel blocks 11 and 12 on which long-time exposure is performed, as illustrated in FIG. 7. Since the second scan corresponds to a period in which a shutter operation for short-time exposure is performed, the pixels 100 of the pixel blocks 11 and 12 on which long-time exposure is performed are not driven, and the pixels 100 of the pixel blocks 10 and 13 on which short-time exposure is performed are driven. That is, in response to the horizontal synchronization signal HD being controlled to the High level at time t8, the horizontal region control unit 3 controls the control signals hblk_s [0] and hblk_s [3] from the Low level to the High level in synchronization with the horizontal synchronization signal HD. Further, the horizontal region control unit 3 maintains the control signal hblk_s [1] and the control signal hblk_s [2] at the Low level.

Next, at time t9, the vertical scanning unit 2 controls the control signal ptx [0] on the row corresponding to the vertical row address [0] from the Low level to the High level. Thereby, the signal generation unit 102 of the pixel block 10 outputs the control signal tx [0, 0] at the High level. Further, the signal generation unit 102 of the pixel block 11 outputs the control signal tx [1, 0] at the Low level. Further, the signal generation unit 102 of the pixel block 12 outputs the control signal tx [2, 0] at the Low level. Further, the signal generation unit 102 of the pixel block 13 outputs the control signal tx [3, 0] at the High level.

Accordingly, while no operation is performed in the pixels 100 on the row corresponding to the vertical row address [0] in the pixel blocks 11 and 12, the transfer transistors M1 are turned on in the pixels 100 on the row corresponding to the vertical row address [0] in the pixel blocks 10 and 13. At this time, the control signal pres [0] is at the High level, the reset transistors M2 of the pixels 100 on the row corresponding to the vertical row address [0] are also in the on-state, and the FD nodes are in the reset state. Therefore, when the transfer transistors M1 are turned on, the photoelectric converters PD are reset to a potential in accordance with the voltage VDD via the reset transistors M2 and the transfer transistors M1.

The vertical scanning unit 2 controls the control signal ptx [0] from the High level to the Low level at a predetermined timing after the completion of reset of the photoelectric converters PD. Thereby, the control signals tx [0, 0] and tx [3, 0] output from the signal generation units 102 of the pixel blocks 10 and 13 also transition back to the Low level. The timing when the control signals tx [0, 0] and tx [3, 0] transition to the Low level is a timing when an exposure period of short-time exposure starts in the photoelectric converters PD of the pixels 100 on the row corresponding to the vertical row address [0] in the pixel blocks 10 and 13.

From time t9, the second HD period of the second scan starts at the next timing when the horizontal synchronization signal HD is controlled to the High level. The second HD period is a period in which the pixels 100 on the row corresponding to the vertical row address [1] are driven.

The second scan corresponds to a period in which a shutter operation for short-time exposure is performed, as described above. Therefore, also in the second HD period, the control signals hblk_s [0], hblk_s [1], hblk_s [2], and hblk_s [3] are controlled as appropriate. The control signals hblk_1 [0], hblk_1 [1], hblk_1 [2], and hblk_1 [3] are maintained at the Low level.

The pixel blocks to which the pixels 100 on the row corresponding to the vertical row address [1] belong are pixel blocks 10 and 13 on which short-time exposure is performed and pixel blocks 11 and 12 on which long-time exposure is performed, as illustrated in FIG. 7. That is, the rows corresponding to the vertical row address [0] and the vertical row address [1] belong to the same pixel blocks 10, 11, 12, and 13. Therefore, the operation performed on the row corresponding to the vertical row address [1] in the second HD period is the same as the operation performed on the row corresponding to the vertical row address [0] in the first HD period.

The horizontal region control unit 3 maintains the control signals hblk_s [0] and hblk_s [3] at the High level subsequently from the first HD period. Further, the horizontal region control unit 3 maintains the control signals hblk_1 [0], hblk_1 [1], hblk_1 [2], hblk_1 [3], hblk_s [1], and hblk_s [2] at the Low level subsequently from the first HD period.

At time t10, the vertical scanning unit 2 controls the control signal ptx [1] on the row corresponding to the vertical row address [1] from the Low level to the High level. Thereby, the signal generation units 102 of the pixel blocks 10 and 13 output the control signals tx [0, 1] and tx [3, 1] at the High level. Further, the signal generation units 102 of the pixel blocks 11 and 12 output the control signals tx [1, 1] and tx [2, 1] at the Low level.

Accordingly, while no operation is performed in the pixels 100 on the row corresponding to the vertical row address [1] in the pixel blocks 11 and 12, the transfer transistors M1 are turned on in the pixels 100 on the row corresponding to the vertical row address [1] in the pixel blocks 10 and 13. At this time, the control signal pres [1] is at the High level, the reset transistors M2 of the pixels 100 on the row corresponding to the vertical row address [1] are also in the on-state, and the FD nodes are in the reset state. Therefore, when the transfer transistors M1 are turned on, the photoelectric converters PD are reset to a potential in accordance with the voltage VDD via the reset transistors M2 and the transfer transistors M1.

The vertical scanning unit 2 controls the control signal ptx [1] from the High level to the Low level at a predetermined timing after the completion of reset of the photoelectric converters PD. Thereby, the control signals tx [0, 1] and tx [3, 1] output from the signal generation units 102 of the pixel blocks 10 and 13 also transition back to the Low level. The timing when the control signals tx [0, 1] and tx [3, 1] transition to the Low level is a timing when an exposure period of short-time exposure starts in the photoelectric converters PD of the pixels 100 on the row corresponding to the vertical row address [1] in the pixel blocks 10 and 13.

At time t11, the horizontal synchronization signal HD is controlled to the High level, and the third HD period of the second scan starts. The third HD period is a period in which the pixels 100 on the row corresponding to the vertical row address [2] are driven.

The second scan corresponds to a period in which a shutter operation for short-time exposure is performed, as described above. Therefore, also in the third HD period, the control signals hblk_s [0], hblk_s [1], hblk_s [2], and hblk_s [3] are controlled as appropriate. The control signals hblk_1 [0], hblk_1 [1], hblk_1 [2], and hblk_1 [3] are maintained at the Low level.

The pixel blocks to which the pixels 100 on the row corresponding to the vertical row address [2] belong are pixel blocks 14 and 17 on which long-time exposure is performed and pixel blocks 15 and 16 on which short-time exposure is performed, as illustrated in FIG. 8. Since the second scan corresponds to a period in which a shutter operation for short-time exposure is performed, the pixels 100 of the pixel blocks 14 and 17 on which long-time exposure is performed are not driven, and the pixels 100 of the pixel blocks 15 and 16 on which short-time exposure is performed are driven. That is, in response to the horizontal synchronization signal HD being controlled to the High level at time t11, the horizontal region control unit 3 controls the control signals hblk_s [1] and hblk_s [2] from the Low level to the High level in synchronization with the horizontal synchronization signal HD. Further, the horizontal region control unit 3 controls the control signals hblk_s [0] and hblk_s [3] from the High level to the Low level.

Next, at time t12, the vertical scanning unit 2 controls the control signal ptx [2] on the row corresponding to the vertical row address [2] from the Low level to the High level. Thereby, the signal generation units 102 of the pixel blocks 15 and 16 output the control signals tx [1, 2] and tx [2, 2] at the High level. Further, the signal generation units 102 of the pixel blocks 14 and 17 output the control signals tx [0, 2] and tx [3, 2] at the Low level.

Accordingly, while no operation is performed in the pixels 100 on the row corresponding to the vertical row address [2] in the pixel blocks 14 and 17, the transfer transistors M1 are turned on in the pixels 100 on the row corresponding to the vertical row address [2] in the pixel blocks 15 and 16. At this time, the control signal pres [2] is at the High level, the reset transistors M2 of the pixels 100 on the row corresponding to the vertical row address [2] are also in the on-state, and the FD nodes are in the reset state. Therefore, when the transfer transistors M1 are turned on, the photoelectric converters PD are reset to a potential in accordance with the voltage VDD via the reset transistors M2 and the transfer transistors M1.

The vertical scanning unit 2 controls the control signal ptx [2] from the High level to the Low level at a predetermined timing after the completion of reset of the photoelectric converters PD. Thereby, the control signals tx [1, 2] and tx [2, 2] output from the signal generation units 102 of the pixel blocks 15 and 16 also transition back to the Low level. The timing when the control signals tx [1, 2] and tx [2, 2] transition to the Low level is a timing when an exposure period of short-time exposure starts in the photoelectric converters PD of the pixels 100 on the row corresponding to the vertical row address [2] in the pixel blocks 15 and 16.

From time t12, the fourth HD period of the second scan starts at the next timing when the horizontal synchronization signal HD is controlled to the High level. The fourth HD period is a period in which the pixels 100 on the row corresponding to the vertical row address [3] are driven.

The second scan corresponds to a period in which a shutter operation for short-time exposure is performed, as described above. Therefore, also in the fourth HD period, the control signals hblk_s [0], hblk_s [1], hblk_s [2], and hblk_s [3] are controlled as appropriate. The control signals hblk_1 [0], hblk_1 [1], hblk_1 [2], and hblk_1 [3] are maintained at the Low level.

The pixel blocks to which the pixels 100 on the row corresponding to the vertical row address [3] belong are pixel blocks 14 and 17 on which long-time exposure is performed and pixel blocks 15 and 16 on which short-time exposure is performed, as illustrated in FIG. 8. That is, the rows corresponding to the vertical row address [2] and the vertical row address [3] belong to the same pixel blocks 14, 15, 16, and 17. Therefore, the operation performed on the row corresponding to the vertical row address [3] in the fourth HD period is the same as the operation performed on the row corresponding to the vertical row address [2] in the third HD period.

The horizontal region control unit 3 maintains the control signals hblk_s [1] and hblk_s [2] at the High level subsequently from the third HD period. Further, the horizontal region control unit 3 maintains the control signals hblk_1 [0], hblk_1 [1], hblk_1 [2], hblk_1 [3], hblk_s [0], and hblk_s [3] at the Low level subsequently from the third HD period.

At time t13, the vertical scanning unit 2 controls the control signal ptx [3] on the row corresponding to the vertical row address [3] from the Low level to the High level. Thereby, the signal generation units 102 of the pixel blocks 15 and 16 output the control signals tx [1, 3] and tx [2, 3] at the High level. Further, the signal generation units 102 of the pixel blocks 14 and 17 output the control signals tx [0, 3] and tx [3, 3] at the Low level.

Accordingly, while no operation is performed in the pixels 100 on the row corresponding to the vertical row address [3] in the pixel blocks 14 and 17, the transfer transistors M1 are turned on in the pixels 100 on the row corresponding to the vertical row address [3] in the pixel blocks 15 and 16. At this time, the control signal pres [1] is at the High level, the reset transistors M2 of the pixels 100 on the row corresponding to the vertical row address [3] are also in the on-state, and the FD nodes are in the reset state. Therefore, when the transfer transistors M1 are turned on, the photoelectric converters PD are reset to a potential in accordance with the voltage VDD via the reset transistors M2 and the transfer transistors M1.

The vertical scanning unit 2 controls the control signal ptx [3] from the High level to the Low level at a predetermined timing after the completion of reset of the photoelectric converters PD. Thereby, the control signals tx [1, 3] and tx [2, 3] output from the signal generation units 102 of the pixel blocks 15 and 16 also transition back to the Low level. The timing when the control signals tx [1, 3] and tx [2, 3] transition to the Low level is a timing when an exposure period of short-time exposure starts in the photoelectric converters PD of the pixels 100 on the row corresponding to the vertical row address [3] in the pixel blocks 15 and 16.

At time t14, the horizontal synchronization signal HD is controlled to the High level, and the fourth HD period of the second scan ends. The horizontal region control unit 3 controls the control signals hblk_s [1] and hblk_s [2] from the High level to the Low level so that the control signal ptx [n] is not supplied to any of the pixel blocks.

In such a way, in the second scan, accumulation of signal charge is newly started in the pixels 100 of the pixel blocks 10, 13, 15, and 16, and no operation is performed on the pixels 100 of the pixel blocks 11, 12, 14, and 17. In the pixels 100 of the pixel blocks 11, 12, 14, and 17, accumulation of signal charge that started in the first scan is continued.

Next, the third scan that is a scan of a readout operation for reading out pixel signals from the pixel unit 1 will be described. The third scan starts from around time t15 in FIG. 7 and FIG. 8. Herein, as the operation performed in the third scan, the operation up to an operation to output an output signal Vout based on the amount of signal charge accumulated in the photoelectric converter PD of the pixel 100 to the vertical output line 106 will be described.

At time t15, the vertical synchronization signal VD and the horizontal synchronization signal HD are controlled to the High level, and the first HD period of the third scan starts.

In the third scan, readout of signals from the pixels 100 belonging to all the pixel blocks is performed. Accordingly, the horizontal region control unit 3 maintains the control signals hblk_1 [0] to hblk_1 [3] and hblk_s [0] to hblk_s [3] at the High level over the entire period of the third scan. Thereby, the control signal ptx [n] will be input to the signal generation units 102 of all the pixel blocks located on a row corresponding to the vertical row address [n].

In the first HD period, readout of signals from the pixels 100 belonging to the row corresponding to the vertical row address [0] is performed. In response to the horizontal synchronization signal HD being controlled to the High level at time t15, the vertical scanning unit 2 controls the control signal pres [0] from the High level to the Low level in synchronization with the horizontal synchronization signal HD and controls the control signal psel [0] from the Low level to the High level. Accordingly, the reset transistors M2 of the pixels 100 belonging to the row corresponding to the vertical row address [0] are turned off, and the reset state of the FD nodes is released. Further, the select transistors M4 of the pixels 100 belonging to the row corresponding to the vertical row address [0] are turned on, and signals of the pixels 100 are ready to be output to the vertical output lines 106.

At time t16, the vertical scanning unit 2 controls the control signal ptx [0] on the row corresponding to the vertical row address [0] from the Low level to the High level. As described above, since the control signals hblk_1 [0] and hblk_s [0] are at the High level, the control signal tx [0, 0] at the High level is input to the pixels 100 belonging to the row corresponding to the vertical row address [0] of the pixel block 10. Further, since the control signals hblk_1 [1] and hblk_s [1] are at the High level, the control signal tx [1, 0] at the High level is input to the pixels 100 belonging to the row corresponding to the vertical row address [1] of the pixel block 11. Further, since the control signals hblk_1 [2] and hblk_s [2] are at the High level, the control signal tx [2, 0] at the High level is input to the pixels 100 belonging to the row corresponding to the vertical row address [2] of the pixel block 12. Further, since the control signals hblk_1 [3] and hblk_s [3] are at the High level, the control signal tx [3, 0] at the High level is input to the pixels 100 belonging to the row corresponding to the vertical row address [3] of the pixel block 13. Thereby, in all the pixels 100 belonging to the row corresponding to the vertical row address [0], the transfer transistors M1 are turned on, and signal charges accumulated in the photoelectric converters PD are transferred to the FD nodes.

Then, the control signal ptx [0] on the row corresponding to the vertical row address [0] is controlled from the High level to the Low level by the vertical scanning unit 2, and the transfer transistors M1 are turned off in all the pixels 100 belonging to the row corresponding to the vertical row address [0]. Thereby, the potentials of the FD nodes are fixed, and signals (Vout) in accordance with the amount of signal charge transferred to the FD nodes are output to the vertical output lines 106 via the amplifier transistors M3 and the select transistors M4. The timing when the transfer transistors M1 are controlled to be turned off, that is, the timing when the control signal ptx [0] transitions from the High level to the Low level is a timing when the exposure period of long-time exposure and short-time exposure on the row corresponding to the vertical row address [0] ends.

At time t17, the horizontal synchronization signal HD is controlled to the High level, the first HD period of the third scan ends, and the second HD period of the third scan starts.

At time t17, the vertical scanning unit 2 controls the control signal pres [0] from the Low level to the High level in synchronization with the horizontal synchronization signal HD and controls the control signal psel [0] from the High level to the Low level. Thereby, the reset transistors M2 of the pixels 100 belonging to the row corresponding to the vertical row address [0] are turned on, and the FD nodes again enter the reset state. Further, the select transistors M4 of the pixels 100 belonging to the row corresponding to the vertical row address [0] are turned off, and the pixels 100 are disconnected from the vertical output lines 106. Accordingly, a series of processes of the first HD period ends.

At the same time t17, the vertical scanning unit 2 controls the control signal pres [1] from the High level to the Low level in synchronization with the horizontal synchronization signal HD and controls the control signal psel [1] from the Low level to the High level. Accordingly, the reset transistors M2 of the pixels 100 belonging to the row corresponding to the vertical row address [1] are turned off, and the reset state of the FD nodes is released. Further, the select transistors M4 of the pixels 100 belonging to the row corresponding to the vertical row address [1] are turned on, and signals of the pixels 100 are ready to be output to the vertical output lines 106.

At time t18, the vertical scanning unit 2 controls the control signal ptx [1] on the row corresponding to the vertical row address [1] from the Low level to the High level. As described above, since the control signals hblk_1 [1] and hblk_s [1] are at the High level, the control signal tx [0, 1] at the High level is input to the pixels 100 belonging to the row corresponding to the vertical row address [1] of the pixel block 10. Further, since the control signals hblk_1 [1] and hblk_s [1] are at the High level, the control signal tx [1, 1] at the High level is input to the pixels 100 belonging to the row corresponding to the vertical row address [1] of the pixel block 11. Further, since the control signals hblk_1 [2] and hblk_s [2] are at the High level, the control signal tx [2, 1] at the High level is input to the pixels 100 belonging to the row corresponding to the vertical row address [2] of the pixel block 10. Further, since the control signals hblk_1 [3] and hblk_s [3] are at the High level, the control signal tx [3, 1] at the High level is input to the pixels 100 belonging to the row corresponding to the vertical row address [3] of the pixel block 11. Thereby, in all the pixels 100 belonging to the row corresponding to the vertical row address [1], the transfer transistors M1 are turned on, and signal charges accumulated in the photoelectric converters PD are transferred to the FD nodes.

Then, the control signal ptx [1] on the row corresponding to the vertical row address [1] is controlled from the High level to the Low level by the vertical scanning unit 2, and the transfer transistors M1 are turned off in all the pixels 100 belonging to the row corresponding to the vertical row address [1]. Thereby, the potentials of the FD nodes are fixed, and signals (Vout) in accordance with the amount of signal charge transferred to the FD nodes are output to the vertical output lines 106 via the amplifier transistors M3 and the select transistors M4. The timing when the transfer transistors M1 are controlled to be turned off, that is, the timing when the control signal ptx [1] transitions from the High level to the Low level is a timing when the exposure period of long-time exposure and short-time exposure on the row corresponding to the vertical row address [1] ends.

At time t19, the horizontal synchronization signal HD is controlled to the High level, the second HD period of the third scan ends, and the third HD period of the third scan starts.

At time t19, the vertical scanning unit 2 controls the control signal pres [1] from the Low level to the High level in synchronization with the horizontal synchronization signal HD and controls the control signal psel [1] from the High level to the Low level. Thereby, the reset transistors M2 of the pixels 100 belonging to the row corresponding to the vertical row address [1] are turned on, and the FD nodes again enter the reset state. Further, the select transistors M4 of the pixels 100 belonging to the row corresponding to the vertical row address [1] are turned off, and the pixels 100 are disconnected from the vertical output lines 106. Accordingly, a series of processes of the second HD period ends.

At the same time t19, the vertical scanning unit 2 controls the control signal pres [2] from the High level to the Low level in synchronization with the horizontal synchronization signal HD and controls the control signal psel [2] from the Low level to the High level. Accordingly, the reset transistors M2 of the pixels 100 belonging to the row corresponding to the vertical row address [2] are turned off, and the reset state of the FD nodes is released. Further, the select transistors M4 of the pixels 100 belonging to the row corresponding to the vertical row address [2] are turned on, and signals of the pixels 100 are ready to be output to the vertical output lines 106.

At time t20, the vertical scanning unit 2 controls the control signal ptx [2] on the row corresponding to the vertical row address [2] from the Low level to the High level. As described above, since the control signals hblk_1 [2] and hblk_s [2] are at the High level, the control signal tx [0, 2] at the High level is input to the pixels 100 belonging to the row corresponding to the vertical row address [2] of the pixel block 14. Further, since the control signals hblk_1 [1] and hblk_s [1] are at the High level, the control signal tx [1, 2] at the High level is input to the pixels 100 belonging to the row corresponding to the vertical row address [2] of the pixel block 15. Further, since the control signals hblk_1 [2] and hblk_s [2] are at the High level, the control signal tx [2, 2] at the High level is input to the pixels 100 belonging to the row corresponding to the vertical row address [2] of the pixel block 16. Further, since the control signals hblk_1 [3] and hblk_s [3] are at the High level, the control signal tx [3, 2] at the High level is input to the pixels 100 belonging to the row corresponding to the vertical row address [2] of the pixel block 17. Thereby, in all the pixels 100 belonging to the row corresponding to the vertical row address [2], the transfer transistors M1 are turned on, and signal charges accumulated in the photoelectric converters PD are transferred to the FD nodes.

Then, the control signal ptx [2] on the row corresponding to the vertical row address [2] is controlled from the High level to the Low level by the vertical scanning unit 2, and the transfer transistors M1 are turned off in all the pixels 100 belonging to the row corresponding to the vertical row address [2]. Thereby, the potentials of the FD nodes are fixed, and signals (Vout) in accordance with the amount of signal charge transferred to the FD nodes are output to the vertical output lines 106 via the amplifier transistors M3 and the select transistors M4. The timing when the transfer transistors M1 are controlled to be turned off, that is, the timing when the control signal ptx [2] transitions from the High level to the Low level is a timing when the exposure period of long-time exposure and short-time exposure on the row corresponding to the vertical row address [2] ends.

At time t21, the horizontal synchronization signal HD is controlled to the High level, the third HD period of the third scan ends, and the fourth HD period of the third scan starts.

At time t21, the vertical scanning unit 2 controls the control signal pres [2] from the Low level to the High level in synchronization with the horizontal synchronization signal HD and controls the control signal psel [2] from the High level to the Low level. Thereby, the reset transistors M2 of the pixels 100 belonging to the row corresponding to the vertical row address [2] are turned on, and the FD nodes again enter the reset state. Further, the select transistors M4 of the pixels 100 belonging to the row corresponding to the vertical row address [2] are turned off, and the pixels 100 are disconnected from the vertical output lines 106. Accordingly, a series of processes of the third HD period ends.

At the same time t21, the vertical scanning unit 2 controls the control signal pres [3] from the High level to the Low level in synchronization with the horizontal synchronization signal HD and controls the control signal psel [3] from the Low level to the High level. Accordingly, the reset transistors M2 of the pixels 100 belonging to the row corresponding to the vertical row address [3] are turned off, and the reset state of the FD nodes is released. Further, the select transistors M4 of the pixels 100 belonging to the row corresponding to the vertical row address [3] are turned on, and signals of the pixels 100 are ready to be output to the vertical output lines 106.

At time t22, the vertical scanning unit 2 controls the control signal ptx [3] on the row corresponding to the vertical row address [3] from the Low level to the High level. As described above, since the control signals hblk_1 [3] and hblk_s [3] are at the High level, the control signal tx [0, 3] at the High level is input to the pixels 100 belonging to the row corresponding to the vertical row address [3] of the pixel block 14. Further, since the control signals hblk_1 [1] and hblk_s [1] are at the High level, the control signal tx [1, 3] at the High level is input to the pixels 100 belonging to the row corresponding to the vertical row address [3] of the pixel block 15. Further, since the control signals hblk_1 [2] and hblk_s [2] are at the High level, the control signal tx [2, 3] at the High level is input to the pixels 100 belonging to the row corresponding to the vertical row address [3] of the pixel block 16. Further, since the control signals hblk_1 [3] and hblk_s [3] are at the High level, the control signal tx [3, 3] at the High level is input to the pixels 100 belonging to the row corresponding to the vertical row address [3] of the pixel block 17. Thereby, in all the pixels 100 belonging to the row corresponding to the vertical row address [3], the transfer transistors M1 are turned on, and signal charges accumulated in the photoelectric converters PD are transferred to the FD nodes.

Then, the control signal ptx [3] on the row corresponding to the vertical row address [3] is controlled from the High level to the Low level by the vertical scanning unit 2, and the transfer transistors M1 are turned off in all the pixels 100 belonging to the row corresponding to the vertical row address [3]. Thereby, the potentials of the FD nodes are fixed, and signals (Vout) in accordance with the amount of signal charge transferred to the FD nodes are output to the vertical output lines 106 via the amplifier transistors M3 and the select transistors M4. The timing when the transfer transistors M1 are turned off, that is, the timing when the control signal ptx [3] transitions from the High level to the Low level is a timing when the exposure period of long-time exposure and short-time exposure on the row corresponding to the vertical row address [3] ends.

At time t23, the vertical scanning unit 2 controls the control signal pres [3] from the Low level to the High level in synchronization with the horizontal synchronization signal HD and controls the control signal psel [3] from the High level to the Low level. Thereby, the reset transistors M2 of the pixels 100 belonging to the row corresponding to the vertical row address [3] are turned on, and the FD nodes again enter the reset state. Further, the select transistors M4 of the pixels 100 belonging to the row corresponding to the vertical row address [3] are turned off, and the pixels 100 are disconnected from the vertical output lines 106. Accordingly, a series of processes of the fourth HD period ends.

As described above, in the present embodiment, in the imaging device that can control the exposure period on a pixel block basis, two types of pixel blocks having different sizes are set in the pixel unit 1, and these pixel blocks are arranged alternately in the horizontal direction. With such a configuration of the imaging device, flexibility in the arrangement or the size of a plurality of regions having different exposure periods can be improved compared to a case where pixel blocks having an even size are set in the pixel unit 1.

Therefore, the present embodiment facilitates suitable arrangement of exposure areas in accordance with an object, such as an exposure area suitable for a moving object or an exposure area suitable for a dark background, and it is possible to prevent a reduction in image quality. Further, since the number of pixel blocks per unit area, that is, the number of signal lines can be smaller than that in a case where the sizes of all the pixel blocks are evenly reduced, it is possible to suppress an increase in complicatedness of control and a reduction in the opening ratio.

Although pixel blocks including the larger number of pixel columns and pixel blocks including the smaller number of pixel columns are arranged alternately in FIG. 5A and FIG. 5B, the embodiment is not limited to such a configuration. For example, when the number of pixel columns is the same among all the pixel blocks, pixel blocks including a larger number of pixel rows and pixel blocks including a smaller number of pixel rows may be arranged alternately. Further, the number of pixel columns or the number of pixel rows of some of the pixel blocks may be greater than or less than the number of pixel columns or the number of pixel rows of another pixel block.

Alternatively, as long as all the pixels are included in any of the pixel blocks, the number of pixels of each pixel block may be set at random. For example, in a surveillance camera that monitors a predetermined target or the like, the number of pixels in a pixel block of a region of interest may be less, that is, more pixel blocks may be arranged for the region of interest. On the other hand, the number of pixels in a pixel block in another region may be greater, that is, fewer pixel blocks may be arranged for another region.

Second Embodiment

An imaging device and a method of driving the same according to a second embodiment of the present disclosure will be described with reference to FIG. 9 to FIG. 13. The same components as those of the imaging device according to the first embodiment are labeled with the same references, and the description thereof will be omitted or simplified.

Figure 9:
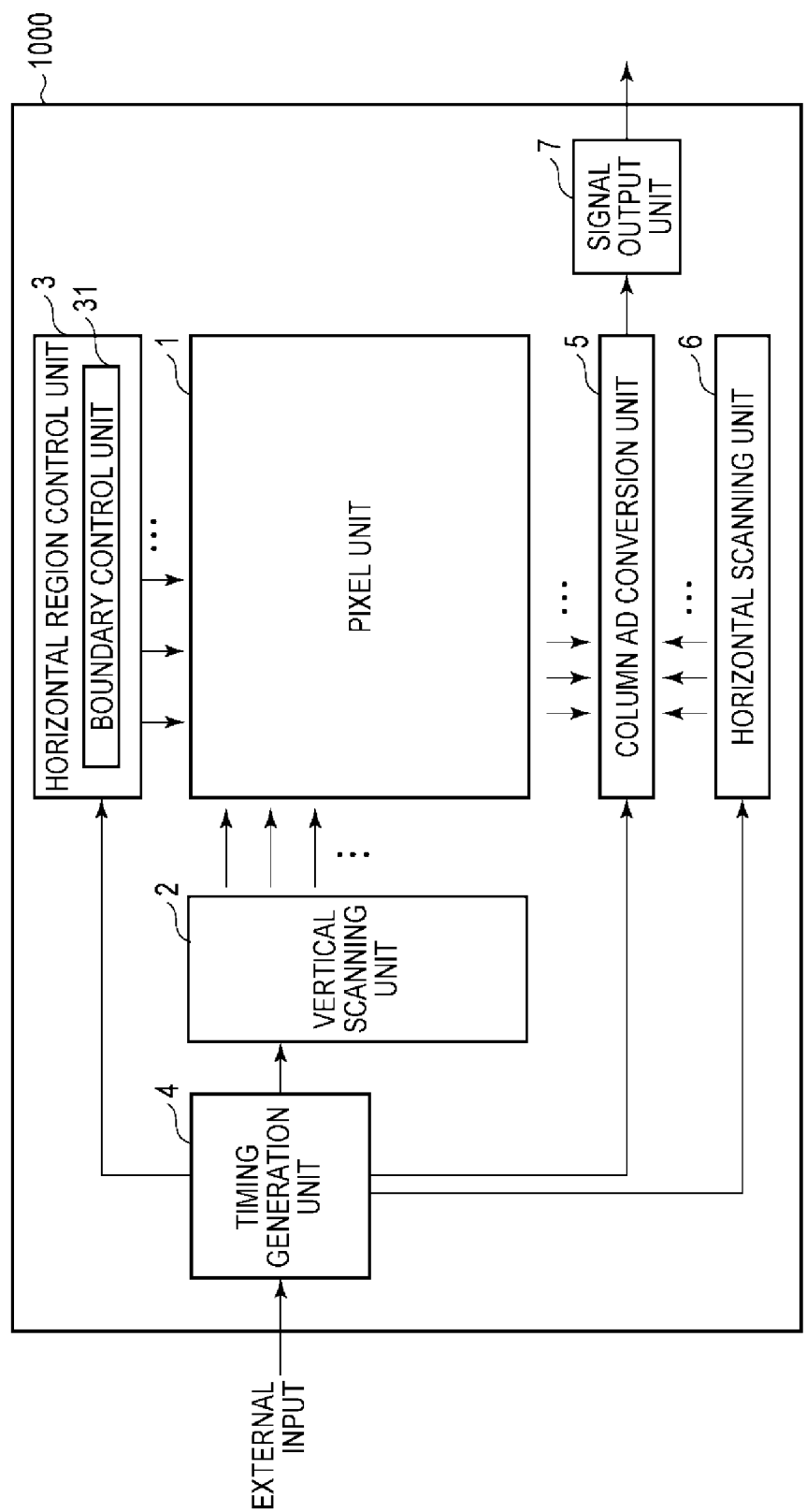
FIG. 9 is a block diagram illustrating a general configuration of an imaging device according to a second embodiment of the present disclosure.
Figure 10:
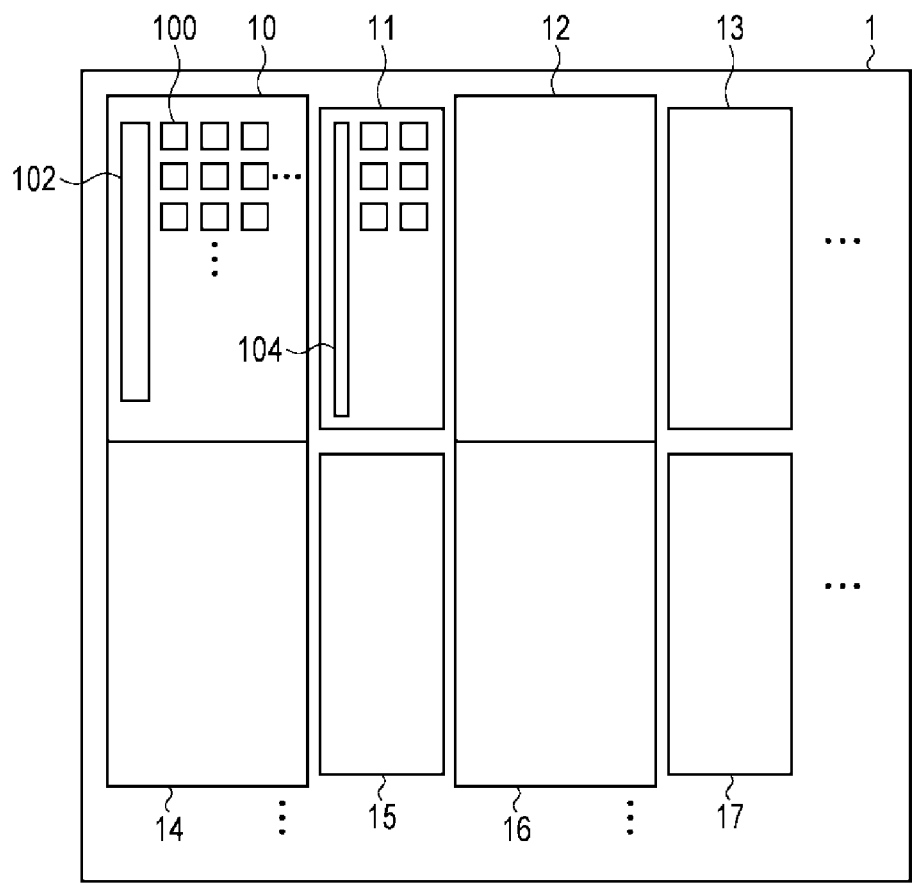
FIG. 10 is a block diagram illustrating an example of a configuration of a pixel unit in the imaging device according to the second embodiment of the present disclosure.
Figure 11A:
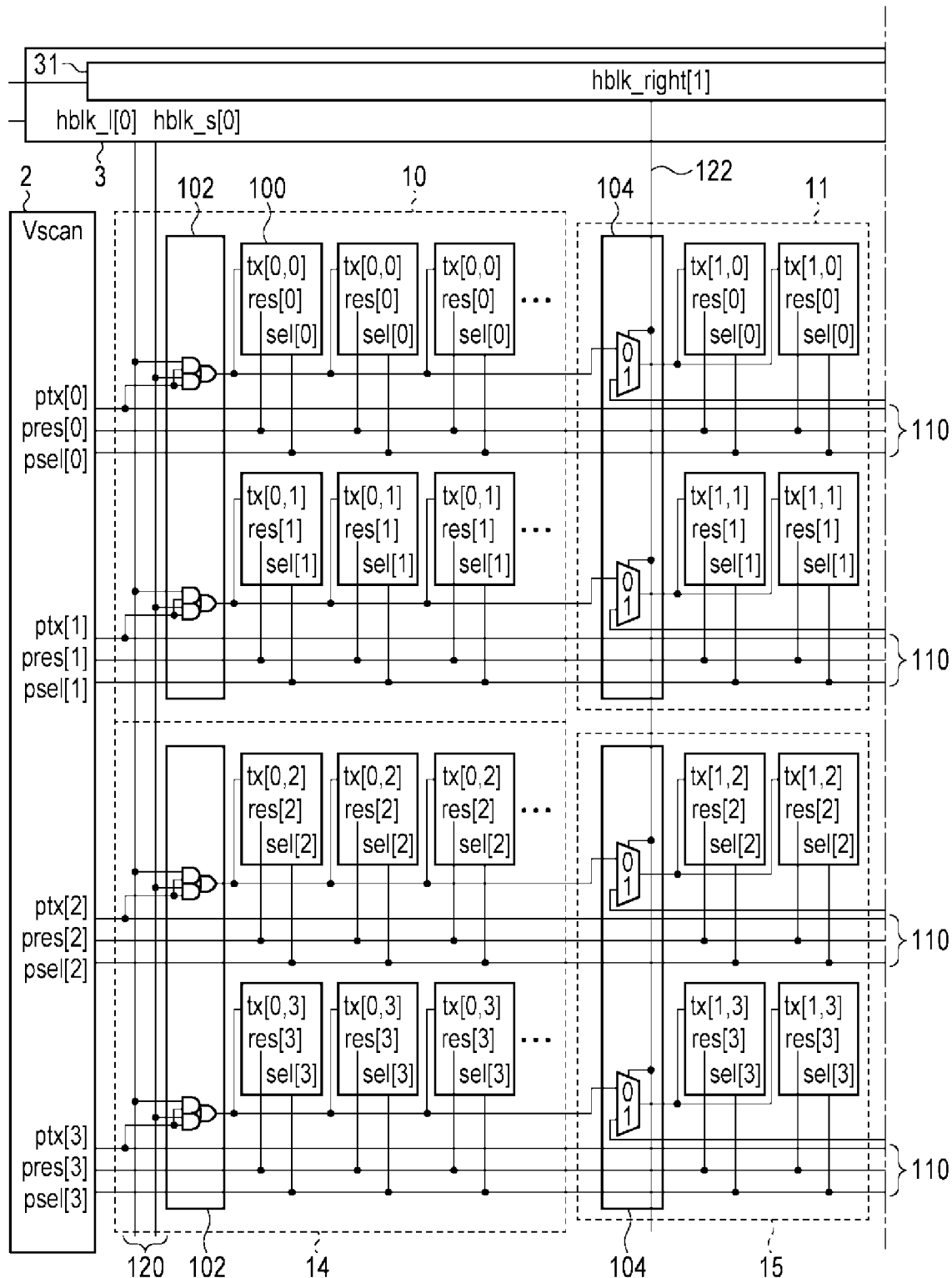
FIG. 11A and FIG. 11B are circuit diagrams illustrating an example of connection between pixel blocks and a vertical scanning unit and between the pixel blocks and a horizontal region control unit in the imaging device according to the second embodiment of the present disclosure.
Figure 11B:
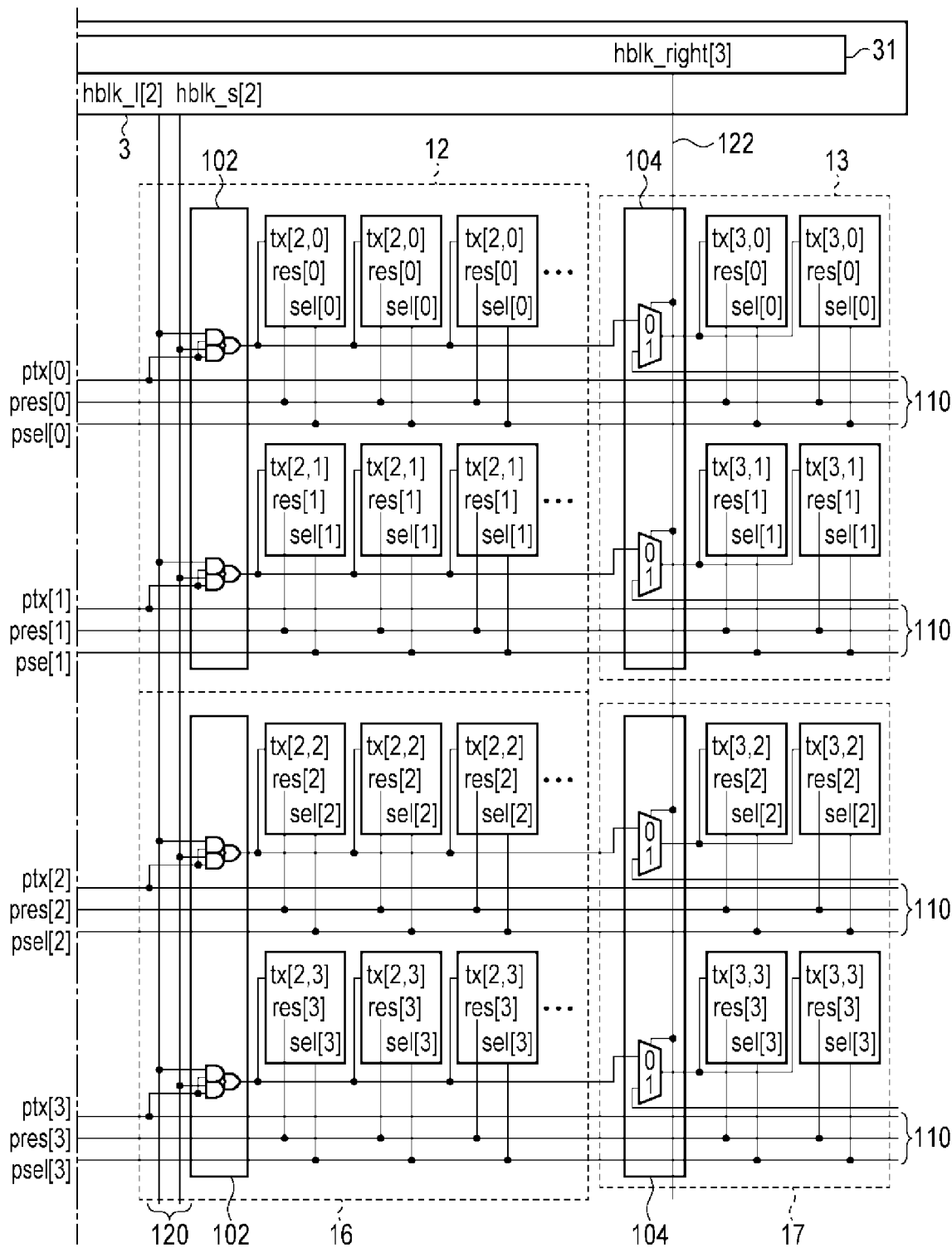

First, the general configuration of the imaging device according to the present embodiment will be described with reference to FIG. 9 to FIG. 11B. FIG. 9 is a block diagram illustrating the general configuration of the imaging device according to the present embodiment. FIG. 10 is a block diagram illustrating an example of a configuration of a pixel unit in the imaging device according to the present embodiment. FIG. 11A and FIG. 11B are circuit diagrams illustrating an example of connection between pixel blocks and a vertical scanning unit and between pixel blocks and a horizontal region control unit in the imaging device according to the present embodiment.

The imaging device 1000 according to the present embodiment is different from the imaging device according to the first embodiment in that the horizontal region control unit 3 includes a boundary control unit 31 as illustrated in FIG. 9. The pixel unit 1 includes the plurality of pixel blocks 10, 11, 12, 13, 14, 15, 16, 17, . . . , and so on arranged two-dimensionally in the same manner as the imaging device according to the first embodiment. Out of the above pixel blocks, each of the pixel blocks 10, 12, 14, 16, . . . , and so on including a larger number of pixels includes the signal generation unit 102 in the same manner as in the first embodiment. On the other hand, each of the pixel blocks 11, 13, 15, 17, ..., and so on including a smaller number of pixels includes a boundary selection unit 104 instead of the signal generation unit 102, as illustrated in FIG. 10. The boundary control unit 31 of the horizontal region control unit 3 is a control circuit that supplies control signals to the boundary selection units 104 of the pixel blocks 11, 13, 15, 17, ..., and so on.

Note that, in the present embodiment, although the boundary selection unit 104 and the signal generation unit 102 are referred to by respective different names, both the units may at least have the same function in terms of generating control signals supplied to pixels in a pixel block. In the present specification, the boundary selection unit 104 may be referred to as the signal generation unit.

Next, an example of connection between pixel blocks and the vertical scanning unit 2 and between the pixel blocks and the horizontal region control unit 3 will be described with reference to FIG. 11A and FIG. 11B. For simplified illustration, FIG. 11A and FIG. 11B illustrate only the pixel blocks corresponding to the pixel blocks 10 to 17 illustrated in FIG. 10 out of a plurality of pixel blocks forming the pixel unit 1. Further, although an example in which each of the pixel blocks 10 to 17 is formed of two pixel rows is illustrated in FIG. 11A and FIG. 11B, the number of pixel rows forming each of the pixel blocks is not particularly limited. Further, the number of pixel columns forming each of the pixel blocks is not particularly limited.

The boundary control unit 31 generates a control signal hblk_right [m] based on a signal (not illustrated) provided from the timing generation unit 4. Herein, the appended index [m] of the control signal hblk_right denotes a value of the horizontal block address described above. FIG. 11A and FIG. 11B illustrate control signals hblk_right [1] and hblk_right [3] as control signals corresponding to the horizontal block addresses [1] and [3].

The control signal hblk_right [m] is supplied to pixel blocks belonging to a corresponding horizontal block address [m] via a control line 122. Each of the control lines 122 is arranged extending in the second direction (the vertical direction or the column direction) and forms a signal line common to pixel blocks having a common horizontal block address.

The control signal hblk_right [m] is provided to the boundary selection units 104 of pixel blocks belonging to a corresponding horizontal block address [m]. That is, the control signal hblk_right [1] is provided to the boundary selection units 104 of the pixel blocks 11 and 15 belonging to a horizontal block address [1]. The control signal hblk_right [3] is provided to the boundary selection units 104 of the pixel blocks 13 and 17 belonging to a horizontal block address [3].

Each boundary selection unit 104 of a pixel block belonging to the horizontal block address [m] receives the control signals hblk_right [m], tx [m−1, n], and tx [m+1, n] as input and outputs the control signal tx [m, n]. That is, the boundary selection unit 104 of a pixel block belonging to the horizontal block address [m] outputs the control signal tx [m−1, n] as the control signal tx [m, n] when the control signal hblk_right [m] is at the Low level. Further, the boundary selection unit 104 of a pixel block belonging to the horizontal block address [m] outputs the control signal tx [m+1, n] as the control signal tx [m, n] when the control signal hblk_right [m] is at the High level.

In the imaging device according to the present embodiment, the control signal supplied from the horizontal region control unit 3 (the boundary control unit 31) to each of the pixel blocks 11, 13, 15, and 17 is only a single signal hblk_right [m]. Therefore, according to the configuration of the present embodiment, the number of signal lines used for supplying control signals from the horizontal region control unit 3 (the boundary control unit 31) to each of the pixel blocks 11, 13, 15, 17, ..., and so on can be reduced by one. In other words, the number of signal lines used for supplying control signals from the horizontal region control unit 3 to each of the pixel blocks 11, 13, 15, 17, ..., and so on is less than the number of signal lines used for supplying control signals from the horizontal region control unit 3 to each of the pixel blocks 10, 12, 14, 16, ..., and so on.

Figure 12:
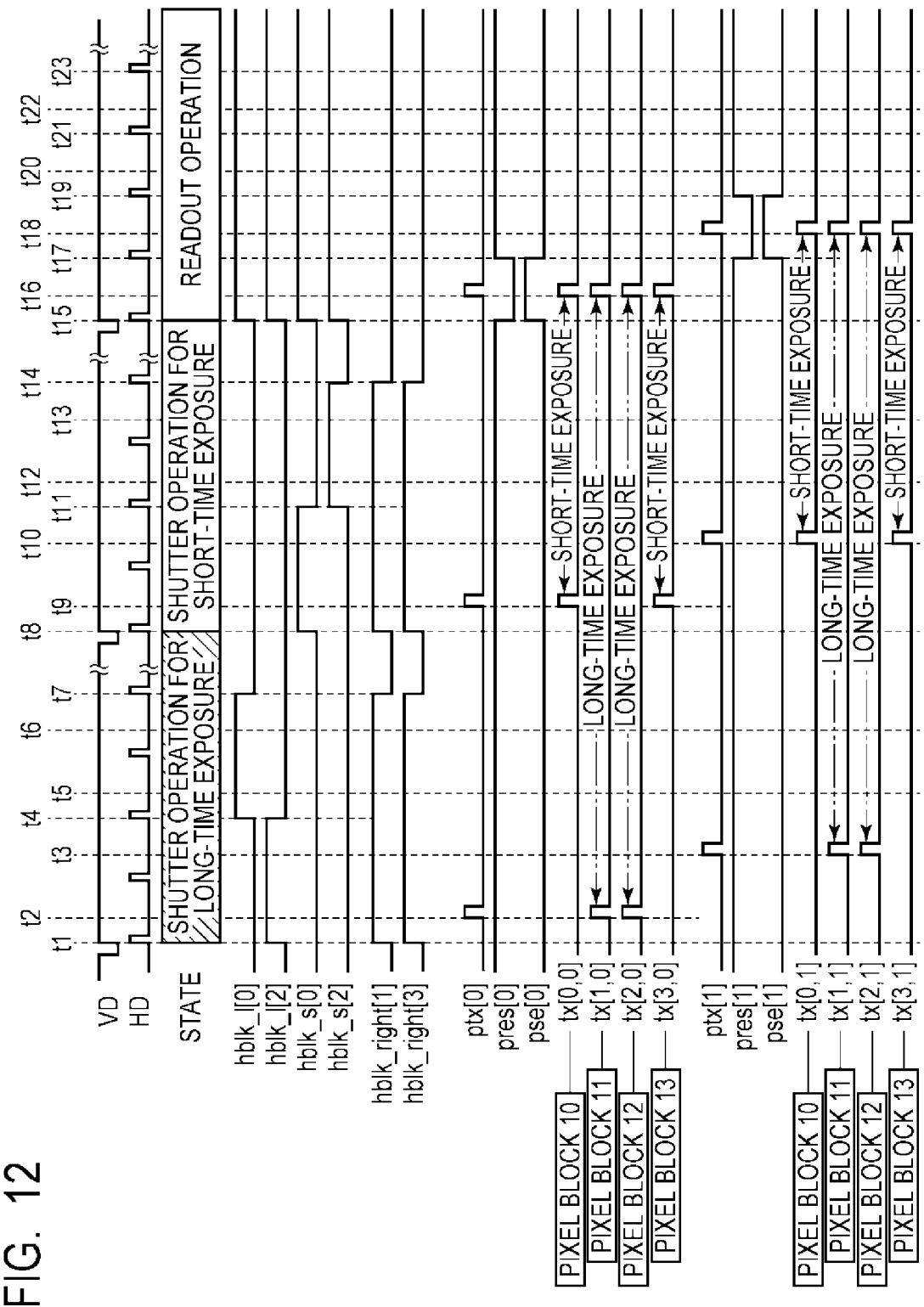
FIG. 12 and FIG. 13 are timing charts illustrating a method of driving the imaging device according to the second embodiment of the present disclosure.
Figure 13:
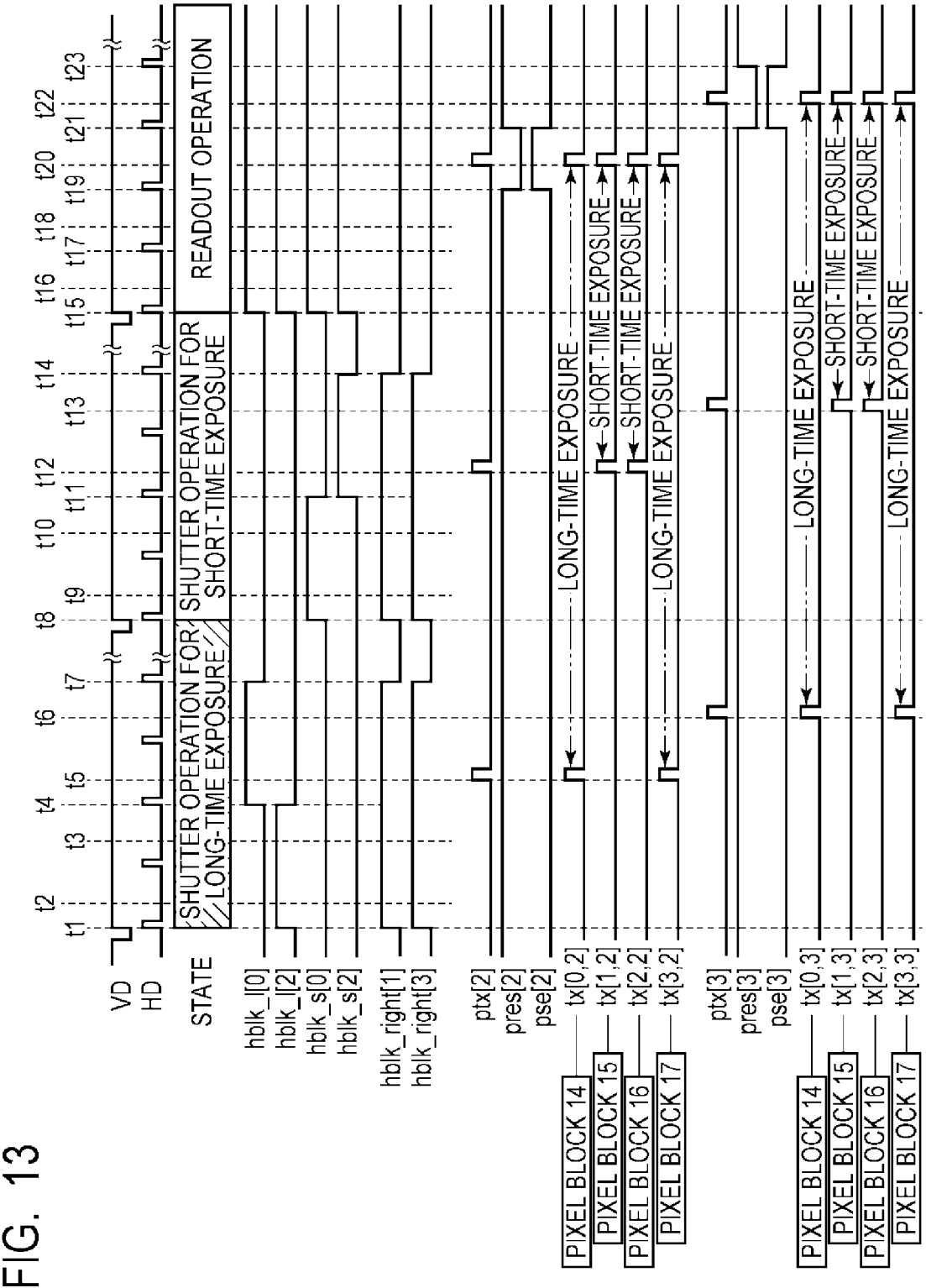

Next, the method of driving the imaging device according to the present embodiment will be described with reference to FIG. 12 and FIG. 13. FIG. 12 and FIG. 13 are timing charts illustrating the method of driving the imaging device according to the present embodiment. Herein, the drive method assuming the overview of control illustrated in FIG. 6 will be described. That is, short-time exposure control is performed in the pixel blocks 10, 13, 15, and 16, and long-time exposure control is performed in the pixel blocks 11, 12, 14, and 17.

FIG. 12 and FIG. 13 illustrate the operation of consecutive three scans in the same manner as FIG. 7 and FIG. 8. In these three scans, the first scan is a scan to perform a shutter operation for long-time exposure, the second scan is a scan to perform a shutter operation for short-time exposure, and the third scan is a scan to perform a readout operation for reading out pixel signals from the pixel unit 1.

First, the first scan, which is a scan to perform a shutter operation for long-time exposure, will be described. The first scan corresponds to the period of around time t1 to time t8 in FIG. 12 and FIG. 13.

At time t1, the vertical synchronization signal VD and the horizontal synchronization signal HD externally supplied to the timing generation unit 4 are controlled to the High level, and the first HD period of the first scan starts. The first HD period is a period in which the pixels 100 on a row corresponding to the vertical row address [0] are driven.

The first scan is a period in which a shutter operation for long-time exposure is performed as described above. Therefore, in the first scan, the control signals hblk_1 [0] and hblk_1[2] are controlled as appropriate. The control signals hblk_s [0] and hblk_s [2] are maintained at the Low level.

The pixel blocks to which the pixels 100 on the row corresponding to the vertical row address [0] belong are pixel blocks 10 and 13 on which short-time exposure is performed and pixel blocks 11 and 12 on which long-time exposure is performed, as illustrated in FIG. 12. Note that the pixel block adjacent on the right side of the pixel block 13 is assumed to be a pixel block in which short-time exposure is performed. Since the first scan corresponds to a period in which a shutter operation for long-time exposure is performed, the pixels 100 of the pixel blocks 10 and 13 on which short-time exposure is performed are not driven, and the pixels 100 of the pixel blocks 11 and 12 on which long-time exposure is performed are driven.

That is, in response to the horizontal synchronization signal HD being controlled to the High level at time t1, the horizontal region control unit 3 controls the control signal hblk_1 [2] corresponding to the pixel block 12 from the Low level to the High level in synchronization with the horizontal synchronization signal HD. The boundary control unit 31 controls the control signals hblk_right [1] and hblk_right [3] from the Low level to the High level so that the pixel block 11 is driven in the same manner as the pixel block 12 and the pixel block 13 is driven in the same manner as the adjacent pixel block on the right. Further, the horizontal region control unit 3 maintains the control signal hblk_1 [0] at the Low level.

Next, at time t2, the vertical scanning unit 2 controls the control signal ptx [0] on the row corresponding to the vertical row address [0] from the Low level to the High level. Thereby, the signal generation unit 102 of the pixel block 10 outputs the control signal tx [0, 0] at the Low level. Further, the boundary selection unit 104 of the pixel block 11 outputs the control signal tx [1, 0] at the High level. Further, the signal generation unit 102 of the pixel block 12 outputs the control signal tx [2, 0] at the High level. Further, the boundary selection unit 104 of the pixel block 13 outputs the control signal tx [3, 0] at the Low level.

Accordingly, while no operation is performed in the pixels 100 on the row corresponding to the vertical row address [0] in the pixel blocks 10 and 13, the transfer transistors M1 are turned on in the pixels 100 on the row corresponding to the vertical row address [0] in the pixel blocks 11 and 12. At this time, the control signal pres [0] is at the High level, the reset transistors M2 of the pixels 100 on the row corresponding to the vertical row address [0] are also in the on-state, and the FD nodes are in the reset state. Therefore, when the transfer transistors M1 are turned on, the photoelectric converters PD are reset to a potential in accordance with the voltage VDD via the reset transistors M2 and the transfer transistors M1.

The vertical scanning unit 2 controls the control signal ptx [0] from the High level to the Low level at a predetermined timing after the completion of reset of the photoelectric converters PD. Thereby, the control signal tx [1, 0] output from the boundary selection unit 104 of the pixel block 11 and the control signal tx [2, 0] output from the signal generation unit 102 of the pixel block 12 also transition back to the Low level. The timing when the control signals tx [1, 0] and tx [2, 0] transition to the Low level is a timing when an exposure period of long-time exposure starts in the photoelectric converters PD of the pixels 100 on the row corresponding to the vertical row address [0] in the pixel blocks 11 and 12.

From time t2, the second HD period of the first scan starts at the next timing when the horizontal synchronization signal HD is controlled to the High level. The second HD period is a period in which the pixels 100 on a row corresponding to the vertical row address [1] are driven. Since the driving in the second HD period is the same as the driving in the first HD period, the description thereof will be omitted here.

At time t4, the horizontal synchronization signal HD is controlled to the High level, and the third HD period of the first scan starts. The third HD period is a period in which the pixels 100 on a row corresponding to the vertical row address [2] are driven.

The pixel blocks to which the pixels 100 on the row corresponding to the vertical row address [2] belong are pixel blocks 14 and 17 on which long-time exposure is performed and pixel blocks 15 and 16 on which short-time exposure is performed, as illustrated in FIG. 13. Note that the pixel block adjacent on the right side of the pixel block 17 is assumed to be a pixel block in which long-time exposure is performed. Since the first scan corresponds to a period in which a shutter operation for long-time exposure is performed, the pixels 100 of the pixel blocks 15 and 16 on which short-time exposure is performed are not driven, and the pixels 100 of the pixel blocks 14 and 17 on which long-time exposure is performed are driven.

That is, in response to the horizontal synchronization signal HD being controlled to the High level at time t4, the horizontal region control unit 3 controls the control signal hblk_1 [0] corresponding to the pixel block 14 from the Low level to the High level in synchronization with the horizontal synchronization signal HD. Further, the horizontal region control unit 3 controls the control signal hblk_1 [2] corresponding to the pixel block 16 from the High level to the Low level. The boundary control unit 31 maintains the control signals hblk_right [1] and hblk_right [3] at the High level so that the pixel block 15 is driven in the same manner as the pixel block 16 and the pixel block 17 is driven in the same manner as the adjacent pixel block on the right.

Next, at time t5, the vertical scanning unit 2 controls the control signal ptx [2] on the row corresponding to the vertical row address [2] from the Low level to the High level. Thereby, the signal generation unit 102 of the pixel block 14 outputs the control signal tx [0, 2] at the High level. Further, the boundary selection unit 104 of the pixel block 15 outputs the control signal tx [1, 2] at the Low level. Further, the signal generation unit 102 of the pixel block 16 outputs the control signal tx [2, 2] at the Low level. Further, the boundary selection unit 104 of the pixel block 17 outputs the control signal tx [3, 2] at the High level.

Accordingly, while no operation is performed in the pixels 100 on the row corresponding to the vertical row address [2] in the pixel blocks 15 and 16, the transfer transistors M1 are turned on in the pixels 100 on the row corresponding to the vertical row address [2] in the pixel blocks 14 and 17. At this time, the control signal pres [2] is at the High level, the reset transistors M2 of the pixels 100 on the row corresponding to the vertical row address [2] are also in the on-state, and the FD nodes are in the reset state. Therefore, when the transfer transistors M1 are turned on, the photoelectric converters PD are reset to a potential in accordance with the voltage VDD via the reset transistors M2 and the transfer transistors M1.

The vertical scanning unit 2 controls the control signal ptx [2] from the High level to the Low level at a predetermined timing after the completion of reset of the photoelectric converters PD. Thereby, the control signal tx [0, 2] output from the signal generation unit 102 of the pixel block 14 and the control signal tx [3, 2] output from the boundary selection unit 104 of the pixel block 17 also transition back to the Low level. The timing when the control signals tx [0, 2] and tx [3, 2] transition to the Low level is a timing when an exposure period of long-time exposure starts in the photoelectric converters PD of the pixels 100 on the row corresponding to the vertical row address [2] in the pixel blocks 14 and 17.

From time t5, the fourth HD period of the first scan starts at the next timing when the horizontal synchronization signal HD is controlled to the High level. The fourth HD period is a period in which the pixels 100 on a row corresponding to the vertical row address [3] are driven. Since the driving in the fourth HD period is the same as the driving in the third HD period, the description thereof will be omitted here.

In such a way, in the first scan, accumulation of signal charge is started in the pixels 100 of the pixel blocks 11, 12, 14, and 17, and no operation is performed on the pixels 100 of the pixel blocks 10, 13, 15, and 16.

Next, the second scan, which is a scan to perform a shutter operation for short-time exposure, will be described. The second scan corresponds to the period of around time t8 to time t15 in FIG. 12 and FIG. 13. In the second scan, accumulation of signal charge in the pixels 100 of the pixel blocks 10, 13, 15, and 16 is started without preventing the operation of accumulating signal charge in the pixels 100 of the pixel blocks 11, 12, 14, and 17.

At time t8, the vertical synchronization signal VD and the horizontal synchronization signal HD are controlled to the High level, and the first HD period of the second scan starts. The first HD period is a period in which the pixels 100 on the row corresponding to the vertical row address [0] are driven.

The second scan corresponds to a period in which a shutter operation for short-time exposure is performed, as described above. Therefore, in the second scan, the control signals hblk_s [0] and hblk_s [2] are controlled as appropriate. The control signals hblk_1 [0] and hblk_1 [2] are maintained at the Low level.

The pixel blocks to which the pixels 100 on the row corresponding to the vertical row address [0] belong are pixel blocks 10 and 13 on which short-time exposure is performed and pixel blocks 11 and 12 on which long-time exposure is performed, as illustrated in FIG. 12. Since the second scan corresponds to a period in which a shutter operation for short-time exposure is performed, the pixels 100 of the pixel blocks 11 and 12 on which long-time exposure is performed are not driven, and the pixels 100 of the pixel blocks 10 and 13 on which short-time exposure is performed are driven.

That is, in response to the horizontal synchronization signal HD being controlled to the High level at time t8, the horizontal region control unit 3 controls the control signals hblk_s [0] corresponding to the pixel block 10 from the Low level to the High level in synchronization with the horizontal synchronization signal HD. The boundary control unit 31 controls the control signals hblk_right [1] and hblk_right [3] from the Low level to the High level so that the pixel block 11 is driven in the same manner as the pixel block 12 and the pixel block 13 is driven in the same manner as the adjacent pixel block on the right. Further, the horizontal region control unit 3 maintains the control signal hblk_s [2] at the Low level.

Next, at time t9, the vertical scanning unit 2 controls the control signal ptx [0] on the row corresponding to the vertical row address [0] from the Low level to the High level. Thereby, the signal generation unit 102 of the pixel block 10 outputs the control signal tx [0, 0] at the High level. Further, the boundary selection unit 104 of the pixel block 11 outputs the control signal tx [1, 0] at the Low level. Further, the signal generation unit 102 of the pixel block 12 outputs the control signal tx [2, 0] at the Low level. Further, the boundary selection unit 104 of the pixel block 13 outputs the control signal tx [3, 0] at the High level.

Accordingly, while no operation is performed in the pixels 100 on the row corresponding to the vertical row address [0] in the pixel blocks 11 and 12, the transfer transistors M1 are turned on in the pixels 100 on the row corresponding to the vertical row address [0] in the pixel blocks 10 and 13. At this time, the control signal pres [0] is at the High level, the reset transistors M2 of the pixels 100 on the row corresponding to the vertical row address [0] are also in the on-state, and the FD nodes are in the reset state. Therefore, when the transfer transistors M1 are turned on, the photoelectric converters PD are reset to a potential in accordance with the voltage VDD via the reset transistors M2 and the transfer transistors M1.

The vertical scanning unit 2 controls the control signal ptx [0] from the High level to the Low level at a predetermined timing after the completion of reset of the photoelectric converters PD. Thereby, the control signal tx [0, 0] output from the signal generation unit 102 of the pixel block 10 and the control signal tx [3, 0] output from the boundary selection unit 104 of the pixel block 13 also transition back to the Low level. The timing when the control signals tx [0, 0] and tx [3, 0] transition to the Low level is a timing when an exposure period of short-time exposure starts in the photoelectric converters PD of the pixels 100 on the row corresponding to the vertical row address [0] in the pixel blocks 10 and 13.

From time t9, the second HD period of the second scan starts at the next timing when the horizontal synchronization signal HD is controlled to the High level. The second HD period is a period in which the pixels 100 on the row corresponding to the vertical row address [1] are driven. Since the driving in the second HD period is the same as the driving in the first HD period, the description thereof will be omitted here.

At time t11, the horizontal synchronization signal HD is controlled to the High level, and the third HD period of the second scan starts. The third HD period is a period in which the pixels 100 on the row corresponding to the vertical row address [2] are driven.

The pixel blocks to which the pixels 100 on the row corresponding to the vertical row address [2] belong are pixel blocks 14 and 17 on which long-time exposure is performed and pixel blocks 15 and 16 on which short-time exposure is performed, as illustrated in FIG. 13. Since the second scan corresponds to a period in which a shutter operation for short-time exposure is performed, the pixels 100 of the pixel blocks 14 and 17 on which long-time exposure is performed are not driven, and the pixels 100 of the pixel blocks 15 and 16 on which short-time exposure is performed are driven.

That is, in response to the horizontal synchronization signal HD being controlled to the High level at time t11, the horizontal region control unit 3 controls the control signal hblk_s [2] corresponding to the pixel block 16 from the Low level to the High level in synchronization with the horizontal synchronization signal HD. Further, the horizontal region control unit 3 controls the control signal hblk_s [0] corresponding to the pixel block 14 from the High level to the Low level. The boundary control unit 31 maintains the control signals hblk_right [1] and hblk_right [3] at the High level so that the pixel block 15 is driven in the same manner as the pixel block 16 and the pixel block 17 is driven in the same manner as the adjacent pixel block on the right.

Next, at time t12, the vertical scanning unit 2 controls the control signal ptx [2] on the row corresponding to the vertical row address [2] from the Low level to the High level. Thereby, the signal generation unit 102 of the pixel block 14 outputs the control signal tx [0, 2] at the Low level. Further, the boundary selection unit 104 of the pixel block 15 outputs the control signal tx [1, 2] at the High level. Further, the signal generation unit 102 of the pixel block 16 outputs the control signal tx [2, 2] at the High level. Further, the boundary selection unit 104 of the pixel block 17 outputs the control signal tx [3, 2] at the Low level.

Accordingly, while no operation is performed in the pixels 100 on the row corresponding to the vertical row address [2] in the pixel blocks 14 and 17, the transfer transistors M1 are turned on in the pixels 100 on the row corresponding to the vertical row address [2] in the pixel blocks 15 and 16. At this time, the control signal pres [2] is at the High level, the reset transistors M2 of the pixels 100 on the row corresponding to the vertical row address [2] are also in the on-state, and the FD nodes are in the reset state. Therefore, when the transfer transistors M1 are turned on, the photoelectric converters PD are reset to a potential in accordance with the voltage VDD via the reset transistors M2 and the transfer transistors M1.

The vertical scanning unit 2 controls the control signal ptx [2] from the High level to the Low level at a predetermined timing after the completion of reset of the photoelectric converters PD. Thereby, the control signal tx [1, 2] output from the boundary selection unit 104 of the pixel block 15 and the control signal tx [2, 2] output from the signal generation unit 102 of the pixel block 16 also transition back to the Low level. The timing when the control signals tx [1, 2] and tx [2, 2] transition to the Low level is a timing when an exposure period of short-time exposure starts in the photoelectric converters PD of the pixels 100 on the row corresponding to the vertical row address [2] in the pixel blocks 15 and 16.

From time t12, the fourth HD period of the second scan starts at the next timing when the horizontal synchronization signal HD is controlled to the High level. The fourth HD period is a period in which the pixels 100 on the row corresponding to the vertical row address [3] are driven. Since the driving in the fourth HD period is the same as the driving in the third HD period, the description thereof will be omitted here.

In such a way, in the second scan, accumulation of signal charge is newly started in the pixels 100 of the pixel blocks 10, 13, 15, and 16, and no operation is performed on the pixels 100 of the pixel blocks 11, 12, 14, and 17. In the pixels 100 of the pixel blocks 11, 12, 14, and 17, accumulation of signal charge that started in the first scan is continued.

Next, the third scan that is a scan of a readout operation for reading out pixel signals from the pixel unit 1 will be described. The third scan starts from around time t15 in FIG. 12 and FIG. 13.

At time t15, the vertical synchronization signal VD and the horizontal synchronization signal HD are controlled to the High level, and the first HD period of the third scan starts.

In the third scan, readout of signals from the pixels 100 belonging to all the pixel blocks is performed. Accordingly, the horizontal region control unit 3 maintains the control signals hblk_1 [0], hblk_1 [2], hblk_s [0], and hblk_s [2] at the High level over the entire period of the third scan. Further, the boundary control unit 31 maintains the control signals hblk_right [1] and hblk_right [3] at the Low level over the entire period of the third scan. Thereby, the control signal ptx [n] will be input to all the pixel blocks located on a row corresponding to the vertical row address [n].

Since the driving of the control signals ptx [n], pres [n], and psel [n] from time t15 of the third scan is the same as that in the first embodiment, the description thereof is omitted here.

As described above, in the present embodiment, the boundary selection unit 104 is arranged in association with the pixel block 11, for example. The boundary selection unit 104 switches a first mode and a second mode based on a provided control signal. As used herein, the first mode is a mode to commonly control the accumulation period in the pixel block 11 and the accumulation period in the pixel block 10, and the second mode is a mode to commonly control the accumulation period in the pixel block 11 and the accumulation period in the pixel block 12. In the first mode, the accumulation period in the pixel block 12 is controlled independently of the pixel block 11 and the pixel block 10. In the second mode, the accumulation period in the pixel block 10 is controlled independently of the pixel block 11 and the pixel block 12. With such a configuration of the imaging device, flexibility in the arrangement or the size of regions for which an exposure period is set can be improved.

Note that, in the present embodiment, in the imaging device that can control the exposure period on a pixel block basis, two types of pixel blocks having different sizes are set in the pixel unit 1, and these pixel blocks are arranged alternately in the horizontal direction. Further, the boundary selection unit 104 is arranged to a pixel block including a relatively smaller number of pixels. Therefore, the present embodiment facilitates suitable arrangement of exposure areas in accordance with an object, such as an exposure area suitable for a moving object or an exposure area suitable for a dark background, and it is possible to prevent a reduction in image quality. Further, the number of pixel blocks per unit area, that is, the number of signal lines can be smaller than that in a case where the sizes of all the pixel blocks are evenly reduced. In particular, in the configuration of the present embodiment, the number of signal lines can be further reduced from the case of the first embodiment by using control signals of adjacent pixel blocks. It is therefore possible to further suppress an increase in complicatedness of control and a reduction in the opening ratio.

Third Embodiment

An imaging device and a method of driving the same according to a third embodiment of the present disclosure will be described with reference to FIG. 14 to FIG. 17. The same components as those of the imaging device according to the first and second embodiments are labeled with the same references, and the description thereof will be omitted or simplified.

Figure 14:
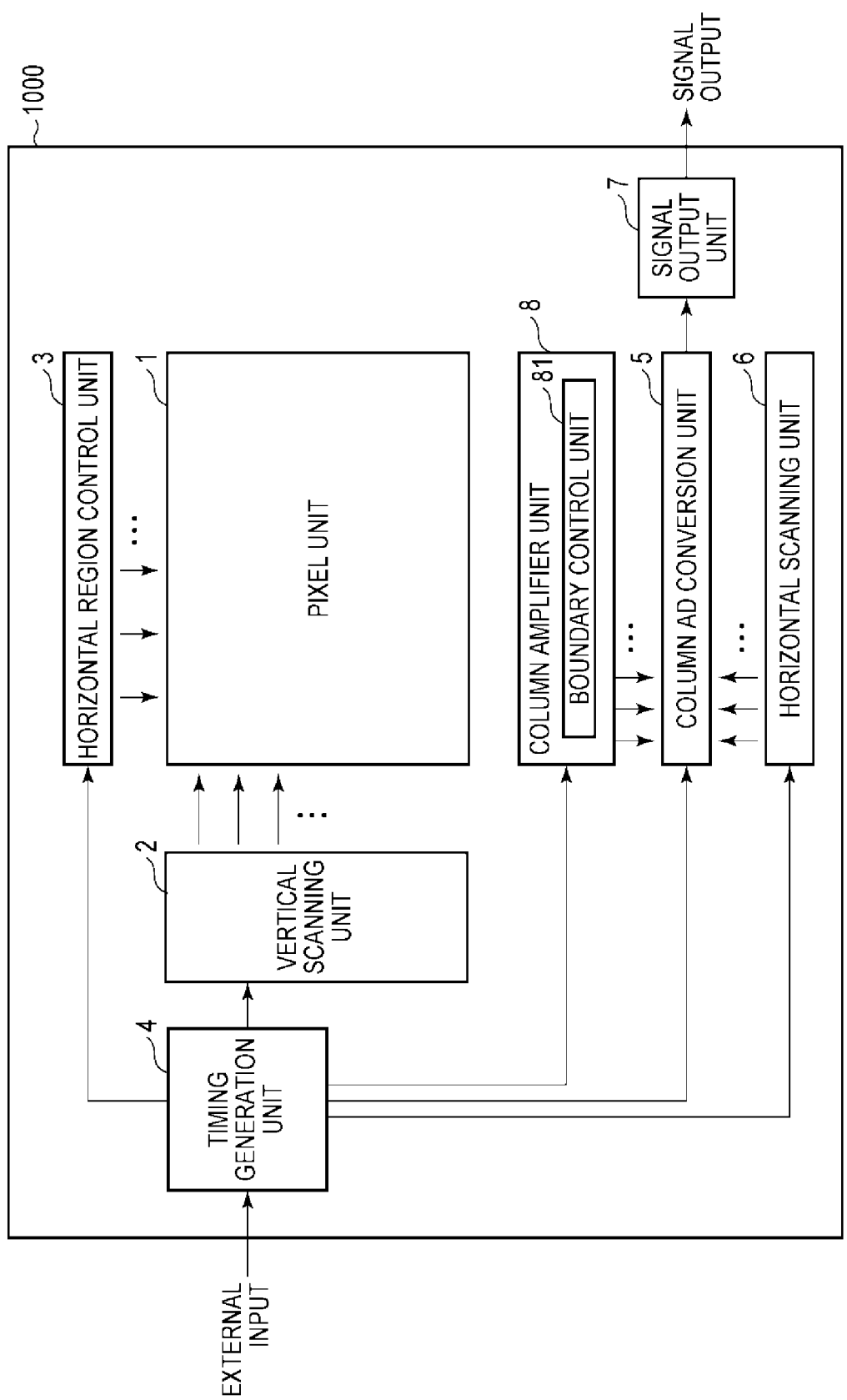
FIG. 14 is a block diagram illustrating a general configuration of an imaging device according to a third embodiment of the present disclosure.
Figure 15:
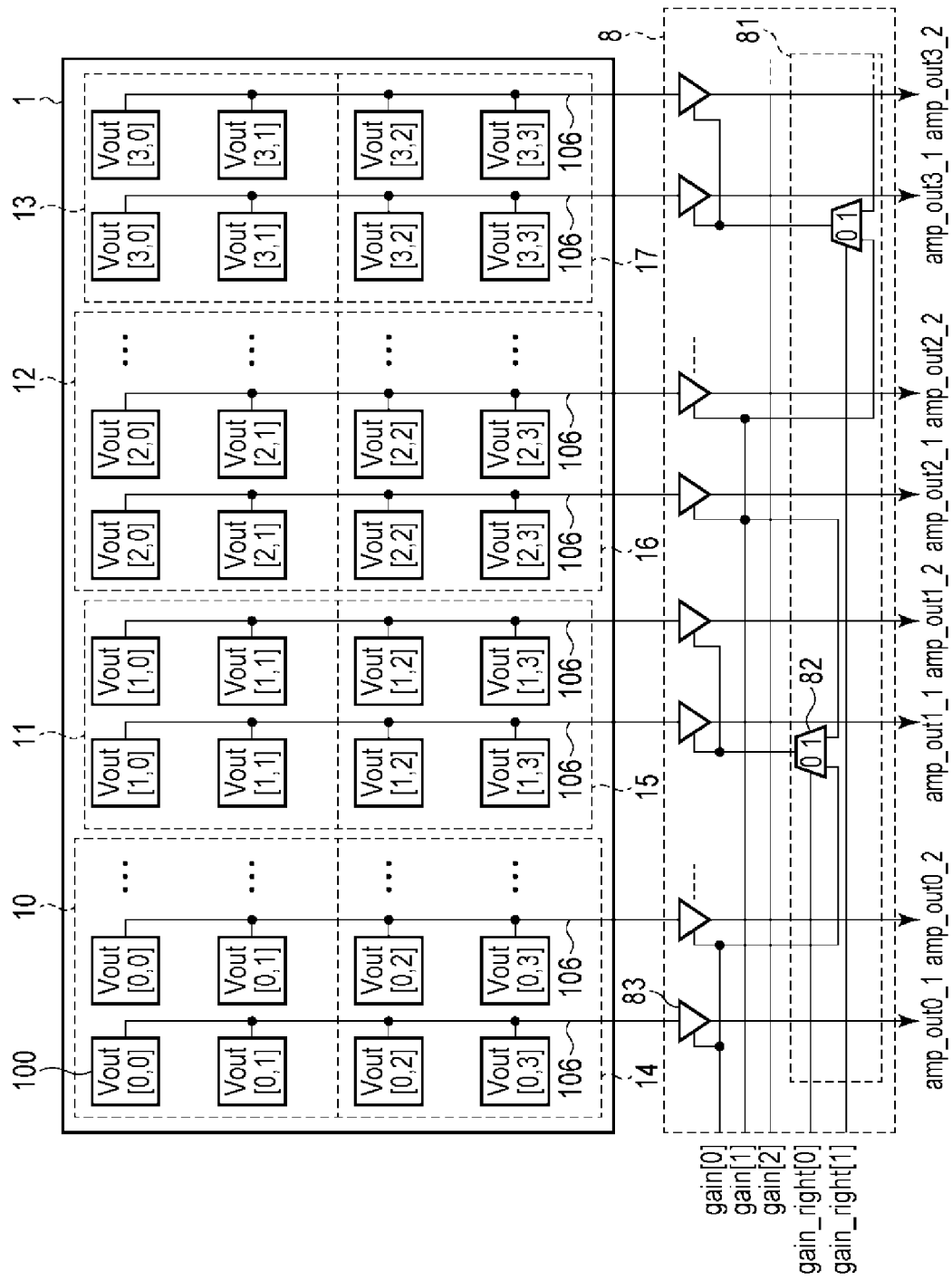
FIG. 15 is a circuit diagram illustrating an example of a configuration of a pixel unit and a column amplifier unit in the imaging device according to the third embodiment of the present disclosure.

First, the general configuration of the imaging device according to the present embodiment will be described with reference to FIG. 14 and FIG. 15. FIG. 14 is a block diagram illustrating the general configuration of the imaging device according to the present embodiment. FIG. 15 is a circuit diagram illustrating an example of a configuration of a pixel unit and a column amplifier unit in the imaging device according to the present embodiment.

The imaging device 1000 according to the present embodiment is different from the imaging device according to the first and second embodiments in that a column amplifier unit 8 is further provided on the pre-stage of the column AD conversion unit 5, as illustrated in FIG. 14. The column amplifier unit 8 is connected to the pixel unit 1, the column AD conversion unit 5, and the timing generation unit 4, amplifies pixel signals on respective columns output from the pixel unit 1 at predetermined gains set for respective pixel blocks, and outputs the amplified pixel signals to the column AD conversion unit 5 under the control of the timing generation unit 4. The column amplifier unit 8 includes a boundary control unit 81. The boundary control unit 81 has a function of controlling the gain to pixel signals output from the pixels 100 of the pixel blocks 11, 13, 15, 17, . . . , and so on.

As illustrated in FIG. 15, the column amplifier unit 8 includes a plurality of amplifiers 83 and a plurality of selectors 82 forming the boundary control unit 81. Each of the amplifiers 83 is connected to the vertical output line 106 arranged on each of the pixel column of the pixel unit 1. The selectors 82 are provided in association with respective pixel block columns on which the pixel blocks 11, 13, 15, 17, . . . , and so on are arranged.

Each of the plurality of amplifiers 83 amplifies a pixel signal output from the vertical output line 106 on a corresponding column at a predetermined gain. In the amplifiers 83, a gain can be set on a pixel block column basis. That is, the gain of the amplifiers 83 on the pixel block column to which the pixel blocks 10 and 14 belong is set to a predetermined gain by the control signal gain [0]. The gain of the amplifiers 83 on the pixel block column to which the pixel blocks 12 and 16 belong and the amplifiers 83 is set to a predetermined gain by the control signal gain [1]. The gains of the amplifiers 83 on the pixel block column to which the pixel blocks 11 and 15 belong and the amplifiers 83 on the pixel block column to which the pixel blocks 13 and 17 belong are set to any of the gains set to the amplifiers 83 on both the adjacent pixel block columns. For example, the gain of the amplifiers 83 on the pixel block column to which the pixel blocks 11 and 15 belong is set to a predetermined gain by any one of control signals selected by control signal gain_right [0] out of the control signal gain [0] and the control signal gain [1].

For example, the gain of the amplifier 83 on the pixel block column to which the pixel blocks 11 and 15 belong is controlled to a predetermined gain in accordance with the control signal gain [0] when the control signal gain_right [0] is at the Low level. Further, the gain of the amplifier 83 on the pixel block column to which the pixel blocks 11 and 15 belong is set to a predetermined gain in accordance with the control signal gain [1] when the control signal gain_right [0] is at the High level.

In FIG. 15, the output signal from the pixels 100 on the pixel block column to which the pixel blocks 10 and 14 belong is denoted as Vout [0, n]. Further, the output signal from the pixels 100 on the pixel block column to which the pixel blocks 11 and 15 belong is denoted as Vout [1, n]. Further, the output signal from the pixels 100 on the pixel block column to which the pixel blocks 12 and 16 belong is denoted as Vout [2, n]. Further, the output signal from the pixels 100 on the pixel block column to which the pixel blocks 13 and 17 belong is denoted as Vout [3, n].

Further, a signal obtained by using the amplifier 83 to amplify the output signal Vout [0, n] of the pixels 100 on the pixel block column to which the pixel blocks 10 and 14 belong is denoted as the output signal amp_out0. Further, a signal obtained by using the amplifier 83 to amplify the output signal Vout [1, n] of the pixels 100 on the pixel block column to which the pixel blocks 11 and 15 belong is denoted as the output signal amp_out1. Further, a signal obtained by using the amplifier 83 to amplify the output signal Vout [2, n] of the pixels 100 on the pixel block column to which the pixel blocks 12 and 16 belong is denoted as the output signal amp_out2. Further, a signal obtained by using the amplifier 83 to amplify the output signal Vout [3, n] of the pixels 100 on the pixel block column to which the pixel blocks 13 and 17 belong is denoted as the output signal amp_out3. Further, in a pixel block including a plurality of pixel columns, a reference for distinguishing pixel columns inside the pixel block is appended, such as the output signal amp_out0_1 or amp_out0_2, for example.

As described above, in the present embodiment, in the imaging device that can control the gain to output signals on a pixel block basis, two types of pixel blocks having different sizes are set in the pixel unit 1, and these pixel blocks are arranged alternately in the horizontal direction. Further, a gain to an output signal can be set for each pixel block. Therefore, in the same manner as the case where the exposure period is controlled in the first and second embodiments, flexibility in the arrangement or the size of a plurality of regions having different gain settings can be improved compared to a case where pixel blocks having an even size are set in the pixel unit 1. This facilitates suitable arrangement of areas on which gain control in accordance with an object is performed, such as an area on which gain control suitable for a moving object is performed or an area on which gain control suitable for a dark background is performed, and it is possible to prevent a reduction in image quality. Further, since the number of pixel blocks per unit area can be smaller than that in a case where the sizes of all the pixel blocks are evenly reduced, it is also possible to suppress an increase in complicatedness of control and an increase of signal lines.

Figure 16:
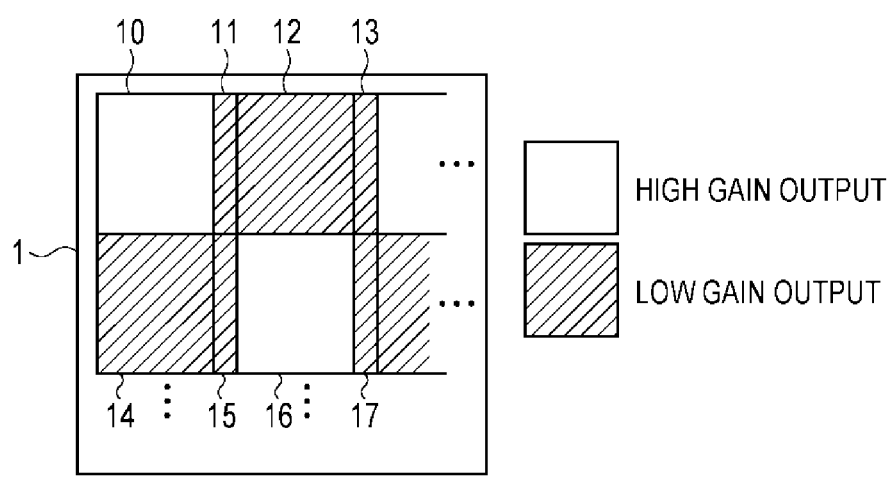
FIG. 16 is a diagram schematically illustrating gains in each pixel block inside the pixel unit.
Figure 17:
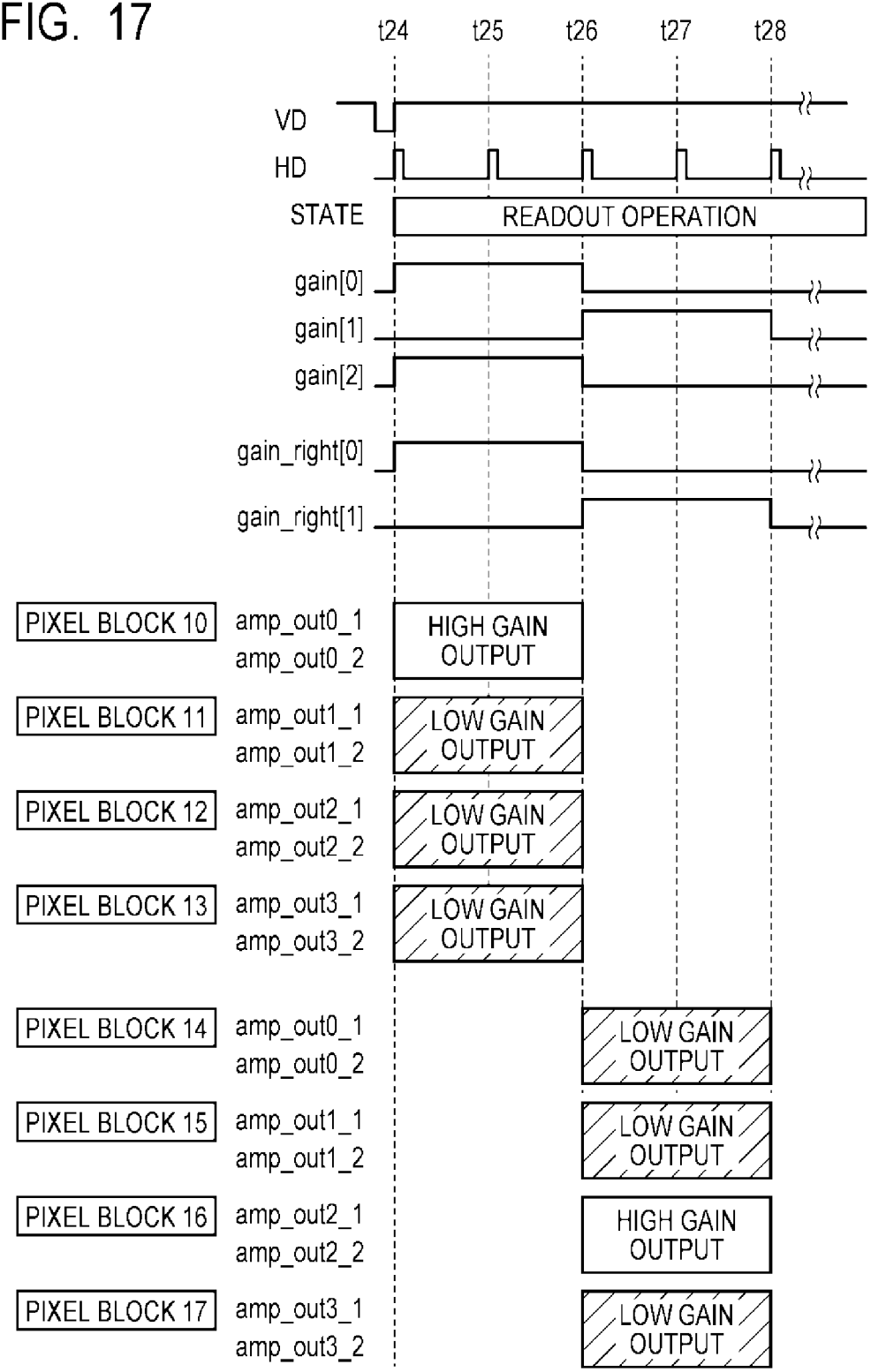
FIG. 17 is a timing chart illustrating a method of driving the imaging device according to the third embodiment of the present disclosure.

Next, the method of driving the imaging device according to the present embodiment will be described with reference to FIG. 16 and FIG. 17. FIG. 16 is a diagram schematically illustrating a gain in each pixel block in a pixel unit. FIG. 17 is a timing chart illustrating the method of driving the imaging device according to the present embodiment.

An operation illustrated in FIG. 16 is assumed here as an example of controlling the gain for each pixel block of the pixel unit 1. That is, FIG. 16 illustrates that, out of the pixel unit 1, control at a high gain is performed on the pixel blocks 10 and 16 that are dark as a whole, and control at a low gain is performed on the pixel blocks 11, 12, 13, 14, 15, and 17 that are bright as a whole. Note that the pixel block adjacent to the right of the pixel block 13 is a pixel block on which control at the high gain is performed, and the pixel block adjacent to the right of the pixel block 17 is a pixel block on which control at the low gain is performed.

A specific example of driving of the imaging device 1000 for realizing the operation of FIG. 16 will be described with reference to FIG. 17. FIG. 17 illustrates a readout operation corresponding to the third scan of the first and second embodiments. In the shutter operation corresponding to the first and second scans of the first and second embodiments, control of the exposure period on a pixel block basis may be performed in accordance with the same procedure as that in the first or second embodiment, or no control of the exposure period on a pixel block basis may be performed.

In FIG. 17, the first HD period from time t24 to time t25 is a period in which readout from the first pixel row (vertical row address [n]=[0]) belonging to the pixel blocks 10, 11, 12, and 13 is performed. The second HD period from time t25 to time t26 is a period in which readout from the second pixel row (vertical row address [n]=[1]) belonging to the pixel blocks 10, 11, 12, and 13 is performed. The third HD period from time t26 to time t27 is a period in which readout from the first pixel row (vertical row address [n]=[2]) belonging to the pixel blocks 14, 15, 16, and 17 is performed. The fourth HD period from time t27 to time t28 is a period in which readout from the second pixel row (vertical row address [n]=[3]) belonging to the pixel blocks 14, 15, 16, and 17 is performed.

The first HD period is a period in which readout is performed at a high gain from the first pixel row of the pixel block 10 and readout is performed at a low gain from the first pixel row of the pixel blocks 11, 12, and 13. Accordingly, in the first HD period, to set the amplifier 83 on the pixel column belonging to the pixel block 10 at a high gain, the control signal gain [0] at the High level is output from the timing generation unit 4. Further, to set the amplifier 83 on the pixel column belonging to the pixel block 12 at a low gain, the control signal gain [1] at the Low level is output from the timing generation unit 4. Further, to set the amplifiers 83 on the pixel columns belonging to the pixel blocks 11 and 13 at the same low gain as that for the pixel block 12, the control signal gain_right [0] is set to the High level, and the control signal gain_right [1] is set to the Low level.

Accordingly, the output signals amp_out0_1 and amp_out0_2 amplified at the high gain are output from the first pixel row of the pixel block 10. Further, the output signals amp_out1_1 and amp_out1_2 amplified at the low gain are output from the first pixel row of the pixel block 11. Further, the output signals amp_out2_1 and amp_out2_2 amplified at the low gain are output from the first pixel row of the pixel block 12. Further, the output signals amp_out3_1 and amp_out3_2 amplified at the low gain are output from the first pixel row of the pixel block 13.

The second HD period is a period in which readout is performed at the high gain from the second pixel row of the pixel block 10 and readout is performed at the low gain from the second pixel row of the pixel blocks 11, 12, and 13. Since the operation in the second HD period is the same as the operation in the first HD period, the description thereof is omitted here.

The third HD period is a period in which readout is performed at the high gain from the first pixel row of the pixel block 16 and readout is performed at the low gain from the first pixel row of the pixel blocks 14, 15, and 17. Accordingly, in the third HD period, to set the amplifier 83 on the pixel column belonging to the pixel block 14 at the low gain, the control signal gain [0] at the Low level is output from the timing generation unit 4. Further, to set the amplifier 83 on the pixel column belonging to the pixel block 16 at the high gain, the control signal gain [1] at the High level is output from the timing generation unit 4. Further, to set the amplifiers 83 on the pixel columns belonging to the pixel blocks 15 and 17 at the same low gain as that for the pixel block 14, the control signal gain_right [0] is set to the Low level, and the control signal gain_right [1] is set to the High level.

Accordingly, the output signals amp_out2_1 and amp_out2_2 amplified at the high gain are output from the first pixel row of the pixel block 16. Further, the output signals amp_out0_1 and amp_out0_2 amplified at the low gain are output from the first pixel row of the pixel block 14. Further, the output signals amp_out1_1 and amp_out1_2 amplified at the low gain are output from the first pixel row of the pixel block 15. Further, the output signals amp_out3_1 and amp_out3_2 amplified at the low gain are output from the first pixel row of the pixel block 17.

The fourth HD period is a period in which readout is performed at the high gain from the second pixel row of the pixel block 16 and readout is performed at the low gain from the second pixel row of the pixel blocks 14, 15, and 17. Since the operation in the fourth HD period is the same as the operation in the third HD period, the description thereof is omitted here.

As described above, in the present embodiment, in the imaging device that can control the gain to output signals on a pixel block basis, two types of pixel blocks having different sizes are set in the pixel unit 1, and these pixel blocks are arranged alternately in the horizontal direction. Further, a gain to an output signal can be set for each pixel block. Therefore, in the same manner as the case where the exposure period is controlled in the first and second embodiments, flexibility in the arrangement or the size of a plurality of regions having different gain settings can be improved compared to a case where pixel blocks having an even size are set in the pixel unit 1.

Therefore, the present embodiment facilitates suitable arrangement of areas on which gain control in accordance with an object is performed, such as an area on which gain control suitable for a moving object is performed or an area on which gain control suitable for a dark background is performed, and it is possible to prevent a reduction in image quality. Further, since the number of pixel blocks per unit area, that is, the number of signal lines can be smaller than that in a case where the sizes of all the pixel blocks are evenly reduced, it is possible to suppress an increase in complicatedness of control and a reduction in the opening ratio.

Fourth Embodiment

An imaging device and a method of driving the same according to a fourth embodiment of the present disclosure will be described with reference to FIG. 18 to FIG. 20. The same components as those of the imaging device according to the first to third embodiments are labeled with the same references, and the description thereof will be omitted or simplified.

First, the general configuration of the imaging device according to the present embodiment will be described with reference to FIG. 18, FIG. 19A, and FIG. 19B. FIG. 18 is a circuit diagram illustrating an example of a configuration of a pixel in the imaging device according to the present embodiment. FIG. 19A and FIG. 19B are circuit diagrams illustrating an example of connection between pixel blocks and a vertical scanning unit and between the pixel blocks and a horizontal region control unit in the imaging device according to the present embodiment.

Figure 18:
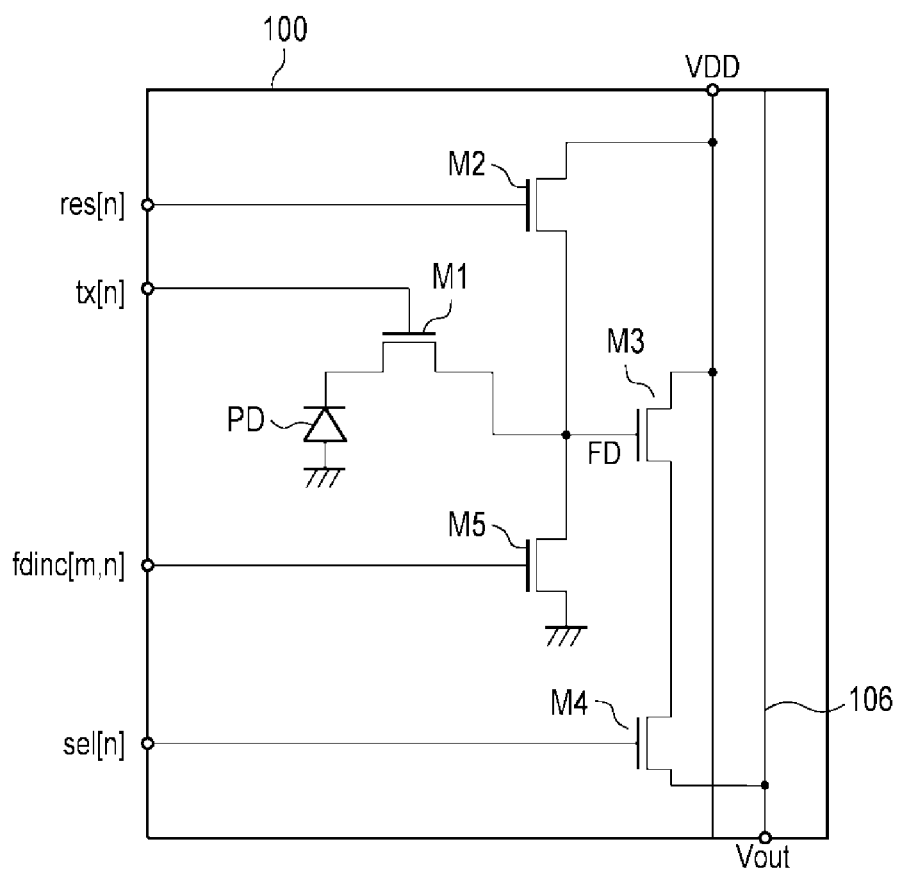
FIG. 18 is a circuit diagram illustrating an example of a configuration of a pixel in an imaging device according to a fourth embodiment of the present disclosure.
Figure 19A:
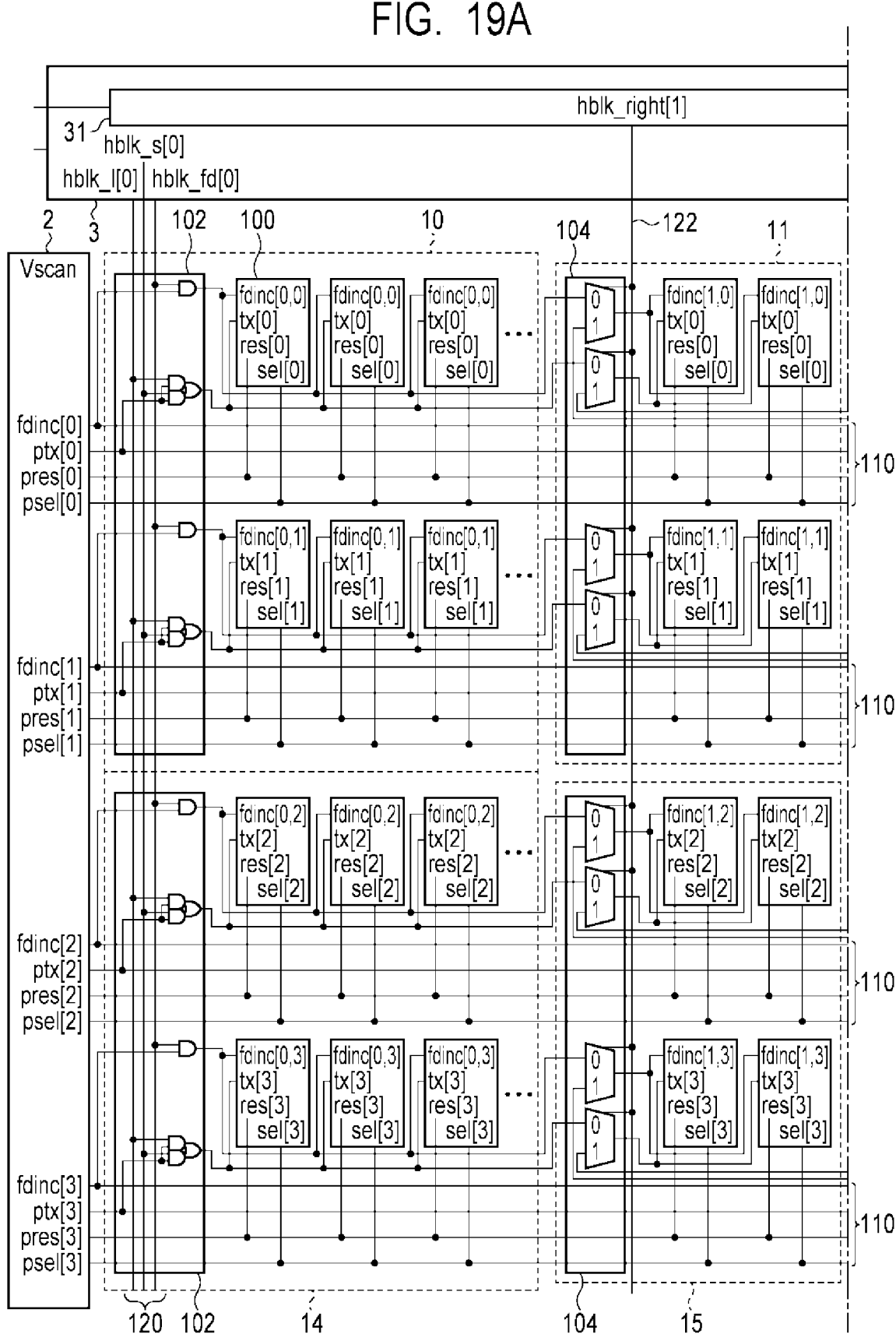
FIG. 19A and FIG. 19B are circuit diagrams illustrating an example of connection between pixel blocks and a vertical scanning unit and between the pixel blocks and a horizontal region control unit in the imaging device according to the fourth embodiment of the present disclosure.
Figure 19B:
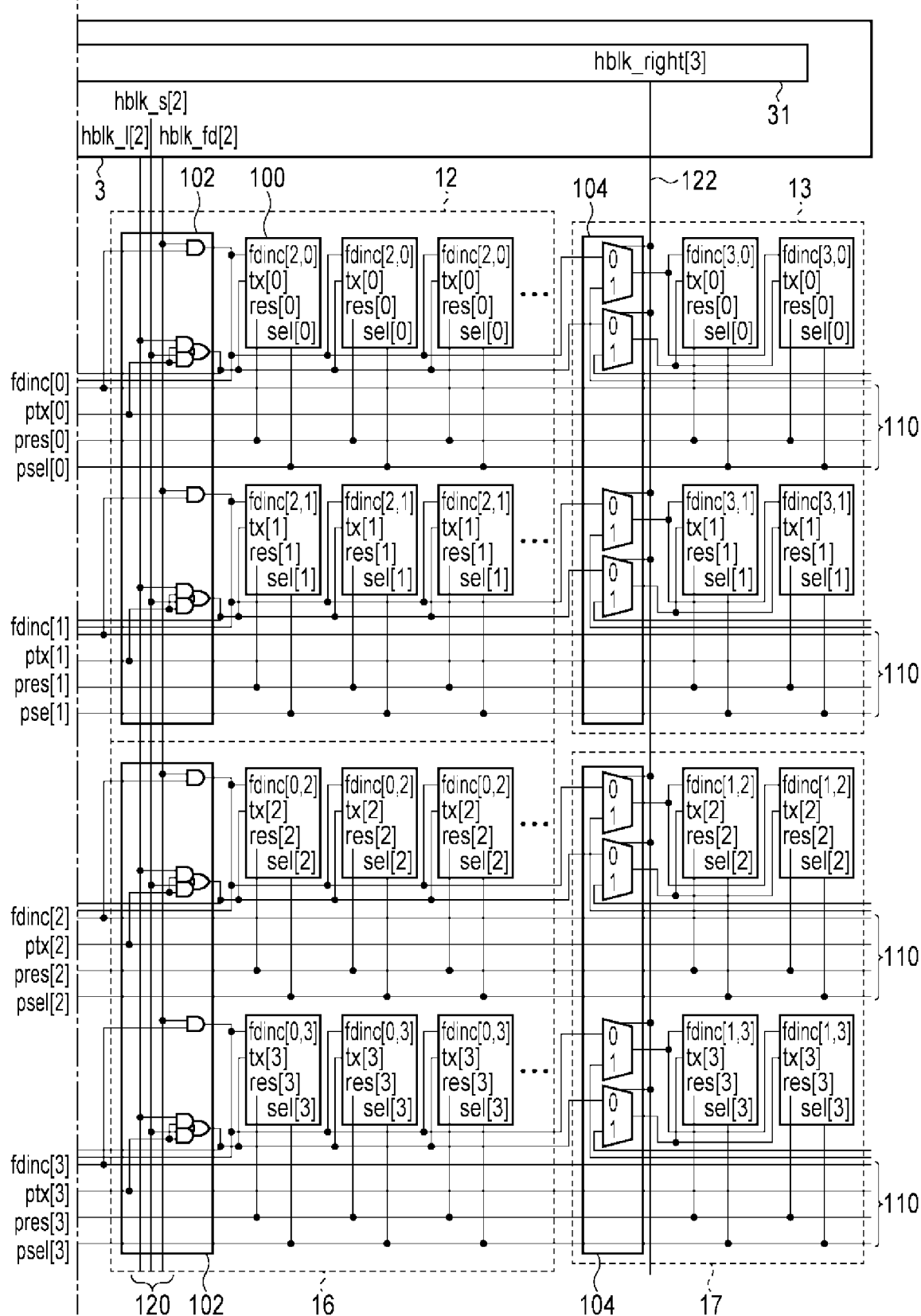

The imaging device according to the present embodiment is different from the imaging device according to the first to third embodiments in that the pixel 100 further includes a transistor M5 connected to the FD node, as illustrated in FIG. 18. The transistor M5 is a transistor used for controlling a capacitance (FD capacitance) coupled to the FD node and is driven by a control signal fdinc [m, n] supplied from the timing generation unit 4 to the gate.

When formed of an n-channel transistor, for example, the transistor M5 is turned on when the control signal fdinc [m, n] at the High level is supplied to the gate and turned off when the control signal fdinc [m, n] at the Low level is supplied to the gate. Since the gate capacitance of the transistor M5 varies in accordance with the operation state of the transistor M5, the capacitance value when the transistor M5 is in the on-state is larger than the capacitance value when the transistor M5 is in the off-state.

Accordingly, it is possible to control the FD capacitance by using the control signal fdinc [m, n], and it is possible to reduce the FD capacitance to have a high gain setting when an object is dark and increase the FD capacitance to have a low gain setting when the object is bright. That is, the FD node in the present embodiment forms a charge holding portion having a variable capacitance value.

Next, an example of connection between the vertical scanning unit 2 and pixel blocks and between the horizontal region control unit 3 and the pixel blocks will be described with reference to FIG. 19A and FIG. 19B. For simplified illustration, FIG. 19A and FIG. 19B illustrates only the pixel blocks corresponding to the pixel blocks 10 to 17 illustrated in FIG. 10 out of the plurality of pixel blocks forming the pixel unit 1. Further, although FIG. 19A and FIG. 19B illustrate the example in which each of the pixel blocks 10 to 17 is formed of two pixel rows, the number of pixel rows forming each of the pixel blocks is not particularly limited. Further, the number of pixel columns forming each of the pixel blocks is not particularly limited.

The vertical scanning unit 2 further outputs a control signal fdinc [n] in addition to the control signals ptx [n], pres [n], and psel [n] described in the first to third embodiments.

The control signal fdinc [n] is supplied to the signal generation unit 102 of a pixel block including the pixels 100 arranged on a row corresponding to the vertical row address [n] via the control line 110 arranged for each vertical row address.

Further, the horizontal region control unit 3 further outputs a control signal hblk_fd [m] in addition to the control signals hblk_1 [m], hblk_s [m], and hblk_right [m] described in the second embodiment. The control signal hblk_right [m] is supplied to the signal generation unit 102 of a pixel block belonging to a corresponding horizontal block address [m] via the control line 120 arranged for each horizontal block address.

The signal generation unit 102 generates the control signal fdinc [m, n] based on the control signal fdinc [n] and the control signal hblk_fd [m]. Specifically, the signal generation unit 102 outputs the control signal fdinc [m, n] at the High level when both the control signal fdinc [n] and the control signal hblk_fd [m] are at the High level. The signal generation unit 102 outputs the control signal fdinc [m, n] at the Low level when at least one of the control signal fdinc [n] and the control signal hblk_fd [m] is at the Low level. The control signal fdinc [m, n] generated by the signal generation unit 102 is provided to the pixels 100 in a pixel block corresponding to the horizontal block address [m] and the vertical row address [n].

A circuit that implements such operation in the signal generation unit 102 is not particularly limited and may be formed of a logic circuit illustrated in FIG. 19A and FIG. 19B, for example. The logic circuit illustrated in FIG. 19A and FIG. 19B is formed of an AND gate that performs logic product operation of the control signal fdinc [n] and the control signal hblk_fd [m]. The output of this AND gate is the control signal fdinc [m, n].

The boundary selection unit 104 of a pixel block belonging to the horizontal block address [m] receives the control signals hblk_right [m], fdinc [m−1, n], and fdine [m+1, n] as input and outputs the control signal fdinc [m, n]. That is, the boundary selection unit 104 of a pixel block belonging to the horizontal block address [m] outputs the control signal fdinc [m−1, n] as the control signal fdinc [m, n] when the control signal hblk_right [m] is at the Low level. Further, the boundary selection unit 104 of a pixel block belonging to the horizontal block address [m] outputs the control signal fdinc [m+1, n] as the control signal fdinc [m, n] when the control signal hblk_right [m] is at the High level. The control signal fdinc [m, n] generated by the boundary selection unit 104 is provided to the pixels 100 in a pixel block corresponding to the horizontal block address [m] and the vertical row address [n].

As described above, in the present embodiment, in the imaging device that can control the gain to output signals on a pixel block basis, two types of pixel blocks having different sizes are set in the pixel unit 1, and these pixel blocks are arranged alternately in the horizontal direction. Further, a gain to an output signal can be set for each pixel block. Therefore, in the same manner as the case where the exposure period is controlled in the first and second embodiments, flexibility in the arrangement or the size of a plurality of regions having different gain settings can be improved compared to a case where pixel blocks having an even size are set in the pixel unit 1. Accordingly, the present embodiment facilitates suitable arrangement of areas on which gain control in accordance with an object is performed, such as an area on which gain control suitable for a moving object is performed or an area on which gain control suitable for a dark background is performed, and it is possible to prevent a reduction in image quality. Further, since the number of pixel blocks per unit area can be smaller than that in a case where the sizes of all the pixel blocks are evenly reduced, it is also possible to suppress an increase in complicatedness of control and an increase of signal lines.

Next, the method of driving the imaging device according to the present embodiment will be described with reference to FIG. 20. FIG. 20 is a timing chart illustrating the method of driving the imaging device according to the present embodiment. Herein, the drive method assuming the overview of control illustrated in FIG. 16 will be described. That is, out of the pixel unit 1, control at a high gain is performed on the pixel blocks 10 and 16 that are dark as a whole, and control at a low gain is performed on the pixel blocks 11, 12, 13, 14, 15, and 17 that are bright as a whole.

A specific example of driving of the imaging device for realizing the operation of FIG. 16 will be described with reference to FIG. 20. FIG. 20 illustrates a readout operation corresponding to the third scan of the first and second embodiments. In the shutter operation corresponding to the first and second scans of the first and second embodiments, control of the exposure period on a pixel block basis may be performed in accordance with the same procedure as that in the first or second embodiment, or no control of the exposure period on a pixel block basis may be performed. Further, in the readout operation corresponding to the third scan of the first and second embodiments, the driving of the third embodiment may be used in combination.

Figure 20:
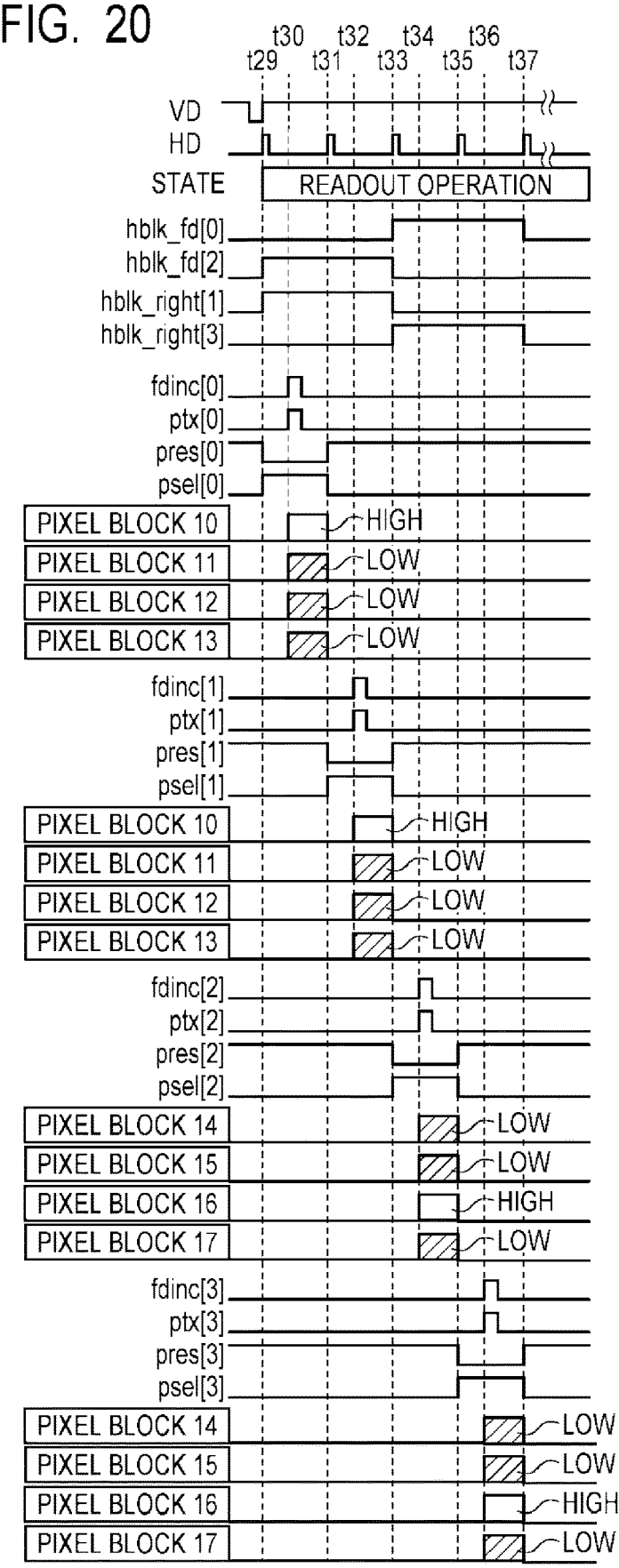
FIG. 20 is a timing chart illustrating a method of driving the imaging device according to the fourth embodiment of the present disclosure.

In FIG. 20, the first HD period from time t29 to time t31 is a period in which readout from the first pixel row (vertical row address [n]=[0]) belonging to the pixel blocks 10, 11, 12, and 13 is performed. The second HD period from time t31 to time t33 is a period in which readout from the second pixel row (vertical row address [n]=[1]) belonging to the pixel blocks 10, 11, 12, and 13 is performed. The third HD period from time t33 to time t35 is a period in which readout from the first pixel row (vertical row address [n]=[2]) belonging to the pixel blocks 14, 15, 16, and 17 is performed. The fourth HD period from time t35 to time t37 is a period in which readout from the second pixel row (vertical row address [n]=[3]) belonging to the pixel blocks 14, 15, 16, and 17 is performed.

The first HD period is a period in which readout is performed at a high gain from the first pixel row of the pixel block 10 and readout is performed at a low gain from the first pixel row of the pixel blocks 11, 12, and 13.

First, at time t29, the horizontal region control unit 3 outputs the control signal hblk_fd [0] at the Low level in order to set the transistors M5 of the pixels 100 belonging to the first pixel row of the pixel block 10 to be turned off. Further, the horizontal region control unit 3 outputs the control signal hblk_fd [2] at the High level in order to set the transistors M5 of the pixels 100 belonging to the first pixel row of the pixel block 12 to be turned on. Further, the horizontal region control unit 3 sets the control signal hblk_right [1] to the Low level and the control signal hblk_right [3] to the High level in order to set the transistors M5 of the pixels 100 belonging to the first pixel row of the pixel blocks 11 and 13 to be turned on.

Next, at time t30, the vertical scanning unit 2 controls the control signal fdinc [0] to the High level at the same timing as the timing to control the control signal ptx [0] to the High level. Accordingly, the transistors M5 of the pixels 100 belonging to the first pixel row of the pixel block 10 remain in the off-state, and the output signals Vout amplified at the high gain is output from the pixels 100 of interest. Further, the transistors M5 of the pixels 100 on the first pixel row of the pixel blocks 11, 12, and 13 are turned on, and the output signals Vout amplified at the low gain is output from the pixels 100 of interest.

The second HD period is a period in which readout is performed at the high gain from the second pixel row of the pixel block 10 and readout is performed at the low gain from the second pixel row of the pixel blocks 11, 12, and 13. Since the operation in the second HD period is the same as the operation in the first HD period, the description thereof is omitted here.

The third HD period is a period in which readout is performed at the high gain from the first pixel row of the pixel block 16 and readout is performed at the low gain from the first pixel row of the pixel blocks 14, 15, and 17.

First, at time t33, the horizontal region control unit 3 outputs the control signal hblk_fd [2] at the Low level in order to set the transistors M5 of the pixels 100 belonging to the first pixel row of the pixel block 16 to be turned off. Further, the horizontal region control unit 3 outputs the control signal hblk_fd [0] at the High level in order to set the transistors M5 of the pixels 100 belonging to the first pixel row of the pixel block 14 to be turned on. Further, the horizontal region control unit 3 sets the control signal gain_right [1] to the Low level and the control signal gain_right [3] to the High level in order to set the transistors M5 of the pixels 100 belonging to the first pixel row of the pixel blocks 15 and 17 to be turned on.

Next, at time t34, the vertical scanning unit 2 controls the control signal fdinc [2] to the High level at the same timing as the timing to control the control signal ptx [2] to the High level. Accordingly, the transistors M5 of the pixels 100 belonging to the first pixel row of the pixel block 16 remain in the off-state, and the output signals Vout amplified at the high gain are output from the pixels 100 of interest. Further, the transistors M5 of the pixels 100 on the first pixel row of the pixel blocks 14, 15, and 17 are turned on, and the output signals Vout amplified at the low gain are output from the pixels 100 of interest.

The fourth HD period is a period in which readout is performed at the high gain from the second pixel row of the pixel block 16 and readout is performed at the low gain from the second pixel row of the pixel blocks 14, 15, and 17. Since the operation in the fourth HD period is the same as the operation in the third HD period, the description thereof is omitted here.

As described above, in the present embodiment, in the imaging device that can control the gain of output signals on a pixel block basis, two types of pixel blocks having different sizes are set in the pixel unit 1, and these pixel blocks are arranged alternately in the horizontal direction. Further, a gain to an output signal can be set for each pixel block. Therefore, in the same manner as the case where the exposure period is controlled in the first and second embodiments, flexibility in the arrangement or the size of a plurality of regions having different gain settings can be improved compared to a case where pixel blocks having an even size are set in the pixel unit 1.

Therefore, the present embodiment facilitates suitable arrangement of areas on which gain control in accordance with an object is performed, such as an area on which gain control suitable for a moving object is performed or an area on which gain control suitable for a dark background is performed, and it is possible to prevent a reduction in image quality. Further, since the number of pixel blocks per unit area, that is, the number of signal lines can be smaller than that in a case where the sizes of all the pixel blocks are evenly reduced, it is possible to suppress an increase in complicatedness of control and a reduction in the opening ratio.

Fifth Embodiment

An imaging device and a method of driving the same according to a fifth embodiment of the present disclosure will be described with reference to FIG. 21 to FIG. 25. The same components as those of the imaging device according to the first to fourth embodiments are labeled with the same references, and the description thereof will be omitted or simplified.

Figure 22A:
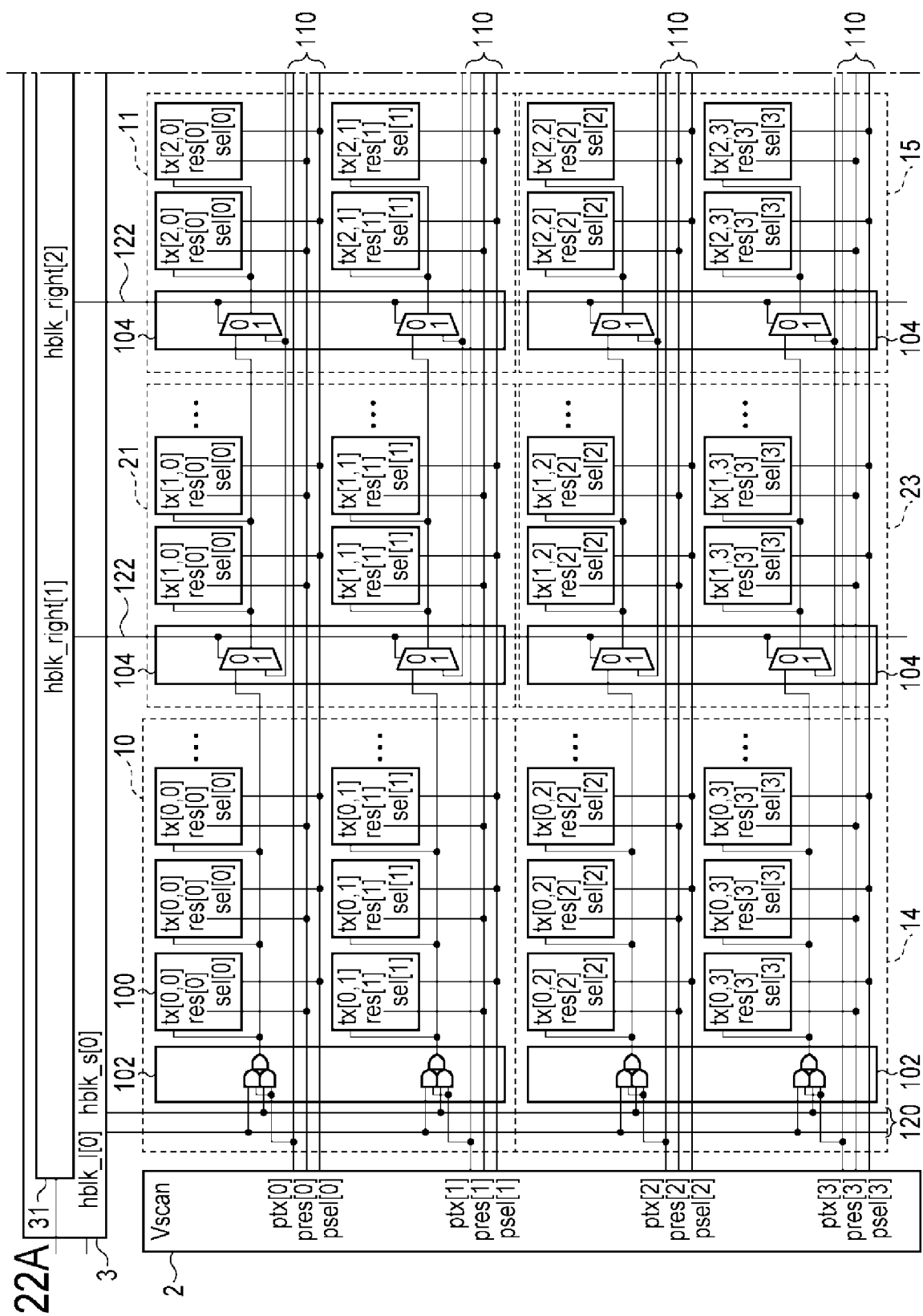
FIG. 22A and FIG. 22B are circuit diagrams illustrating an example of connection between pixel blocks and a vertical scanning unit and between the pixel blocks and a horizontal region control unit in the imaging device according to the fifth embodiment of the present disclosure.
Figure 22B:
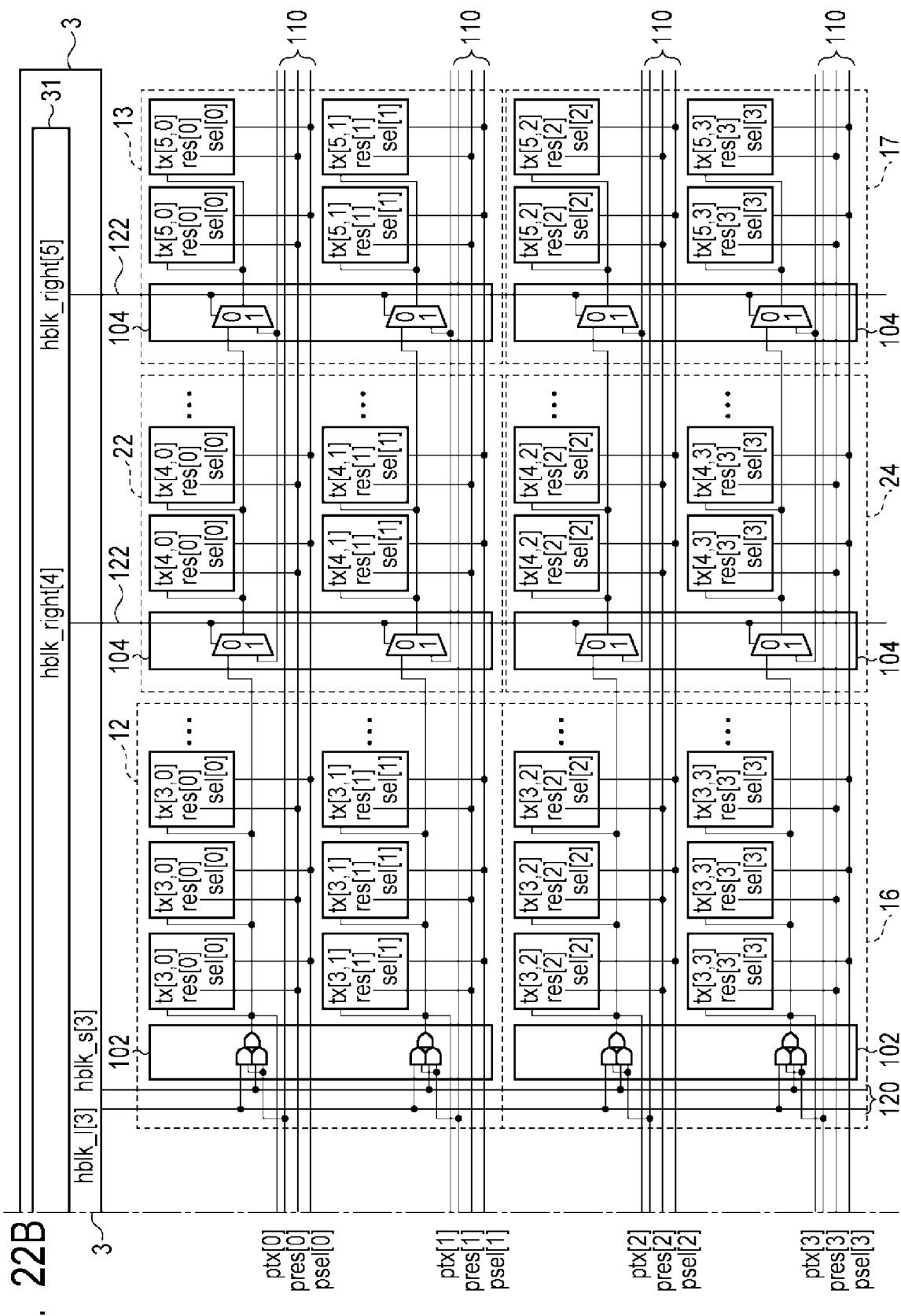

First, the general configuration of the imaging device according to the present embodiment will be described with reference to FIG. 21, FIG. 22A and FIG. 22B. FIG. 21 is a block diagram illustrating an example of a configuration of a pixel unit in the imaging device according to the present embodiment. FIG. 22A and FIG. 22B are circuit diagrams illustrating an example of connection between pixel blocks and a vertical scanning unit and between the pixel blocks and a horizontal region control unit in the imaging device according to the present embodiment.

In the pixel unit 1 of the imaging device according to the present embodiment, a plurality of pixel blocks controlled by the control signal hblk_right are arranged between pixel blocks controlled by the control signals hblk_1 and hblk_s, as illustrated in FIG. 21. The pixel blocks controlled by the control signals hblk_and hblk_s are the pixel blocks including the larger number of pixels described above, and the pixel blocks controlled by the control signal hblk_right are the pixel blocks including the smaller number of pixels described above.

Specifically, the pixel unit 1 further includes a pixel block 21 arranged between the pixel block 10 including the larger number of pixels and the pixel block 11 including the smaller number of pixels. Further, the pixel unit 1 further includes a pixel block 22 arranged between the pixel block 12 including the larger number of pixels and the pixel block 13 including the smaller number of pixels. Further, the pixel unit 1 further includes a pixel block 23 arranged between the pixel block 14 including the larger number of pixels and the pixel block 15 including the smaller number of pixels. Further, the pixel unit 1 further includes a pixel block 24 arranged between the pixel block 16 including the larger number of pixels and the pixel block 17 including the smaller number of pixels.

While not particularly limited, the number of pixels forming each of the pixel blocks 21, 22, 23, and 24 may be set to be less than the number of pixels of the pixel block arranged adjacent to the left of each of the pixel blocks 21, 22, 23, and 24 and greater than the number of pixels of the pixel block arranged adjacent to the right of each of the pixel blocks 21, 22, 23, and 24, for example. For example, the number of pixels (the number of pixel columns) forming the pixel block 21 is greater than the number of pixels (the number of pixel columns) forming the pixel block 11 and less than the number of pixels (the number of pixel columns) forming the pixel block 10. The same applies to the pixel blocks 22, 23, and 24. Each of the pixel blocks 21, 22, 23, and 24 includes the boundary selection unit 104 in the same manner as the pixel blocks 11, 13, 15, and 17.

Next, an example of connection between the vertical scanning unit 2 and pixel blocks and between the horizontal region control unit 3 and the pixel blocks will be described with reference to FIG. 22A and FIG. 22B. For simplified illustration, FIG. 22A and FIG. 22B illustrate only the pixel blocks corresponding to the pixel blocks 10 to 17 and 21 to 24 illustrated in FIG. 21 out of the plurality of pixel blocks forming the pixel unit 1. Further, although FIG. 21 illustrates the example in which each of the pixel blocks 10 to 17 and 21 to 24 is formed of two pixel rows, the number of pixel rows forming each of the pixel blocks is not particularly limited. Further, the number of pixel columns forming each of the pixel blocks is not particularly limited.

The horizontal region control unit 3 is configured to supply the control signal hblk_right [m] via the control line 122 to each of the pixel block columns on which a pixel block including the boundary selection unit 104 are arranged. For example, as illustrated in FIG. 22A and FIG. 22B, the horizontal region control unit 3 supplies the control signal hblk_right [1] to the boundary selection units 104 of the pixel blocks 21 and 23 and supplies the control signal hblk_right [2] to the boundary selection units 104 of the pixel blocks 11 and 15. Further, the horizontal region control unit 3 supplies the control signal hblk_right [4] to the boundary selection units 104 of the pixel blocks 22 and 24 and supplies the control signal hblk_right [5] to the boundary selection units 104 of the pixel blocks 13 and 17.

For the purpose of illustration here, the horizontal block address of the pixel blocks 10 and 14 is defined as [0]. In such a case, the horizontal block address of a pixel block including the signal generation unit 102 can be represented as [3x]. Further, the horizontal block address of a pixel block including the boundary selection unit 104 can be represented as [3x+1] or [3x+2]. Herein, x is an integer greater than or equal to 0. The pixel blocks represented by the horizontal block address [3x] are the pixel blocks 10, 12, 14, and 16, for example. The pixel blocks represented by the horizontal block address [3x+1] are the pixel blocks 21, 22, 23, and 24, for example. The pixel blocks represented by the horizontal block address [3x+2] are the pixel blocks 11, 13, 15, and 17, for example.

The boundary selection unit 104 of a pixel block represented by the horizontal block address [3x+1] receives control signals hblk_right [3x+1], tx [3x, n], and tx [3x+3, n] as input and outputs a control signal tx [3x+1, n]. For example, the boundary selection units 104 of the pixel blocks 21 and 22 receive control signals hblk_right [1], tx [0, n], and tx [3, n] and output a control signal tx [1, n]. When the control signal hblk_right [1] is at the High level, the control signal tx [3, n] is output as the control signal tx [1, n]. Further, when the control signal hblk_right [2] is at the Low level, the control signal tx [0, n] is output as the control signal tx [1, n].

Further, the boundary selection unit 104 of a pixel block represented by the horizontal block address [3x+2] receives control signals hblk_right [3x+2], tx [3x+1, n], and tx [3x+3, n] as input and outputs a control signal tx [3x+1, n]. For example, the boundary selection units 104 of the pixel blocks 11 and 15 receive control signals hblk_right [2], tx [1, n], and tx [3, n] and output a control signal tx [2, n]. When the control signal hblk_right [2] is at the High level, the control signal tx [3, n] is output as the control signal tx [2, n]. Further, when the control signal hblk_right [2] is at the Low level, the control signal tx [1, n] is output as the control signal tx [2, n].

As described above, in the present embodiment, a plurality of pixel blocks controlled by the control signal hblk_right are arranged between the adjacent pixel blocks controlled by the control signals hblk_1 and hblk_s. This enables fine setting of the exposure areas in accordance with an object, and it is possible to suppress a reduction in image quality.

Figure 23:
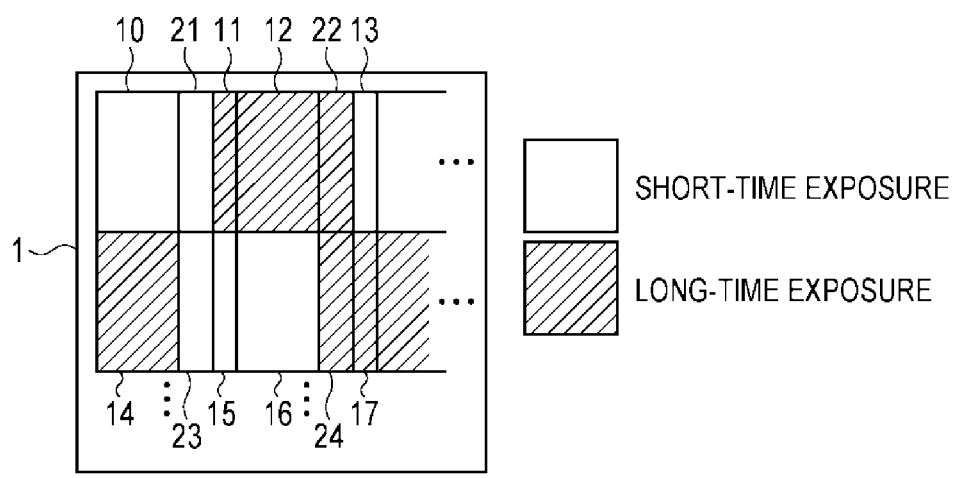
FIG. 23 is a diagram schematically illustrating exposure periods in each pixel block inside the pixel unit.
Figure 24:
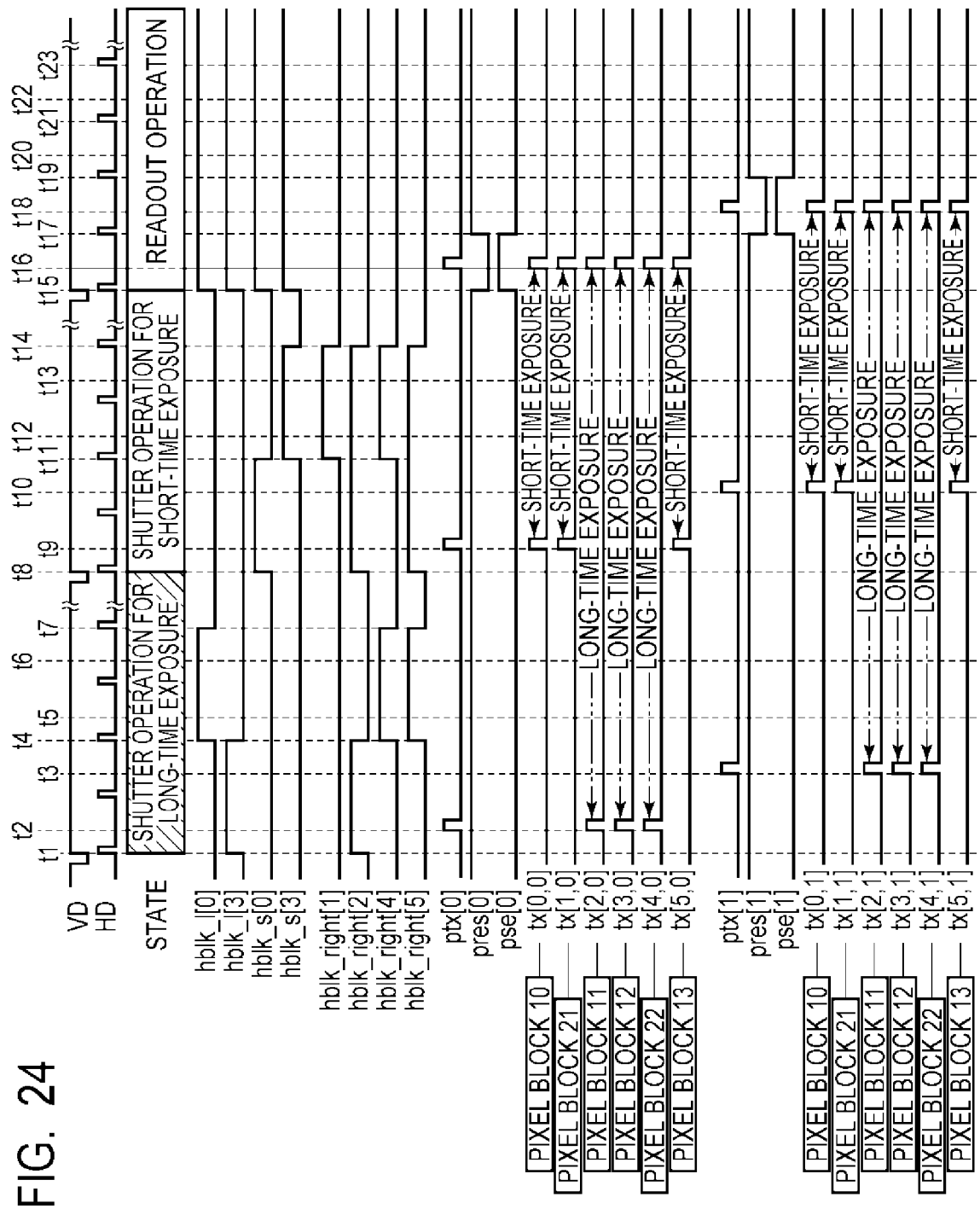
FIG. 24 and FIG. 25 are timing charts illustrating a method of driving the imaging device according to the fifth embodiment of the present disclosure.
Figure 25:
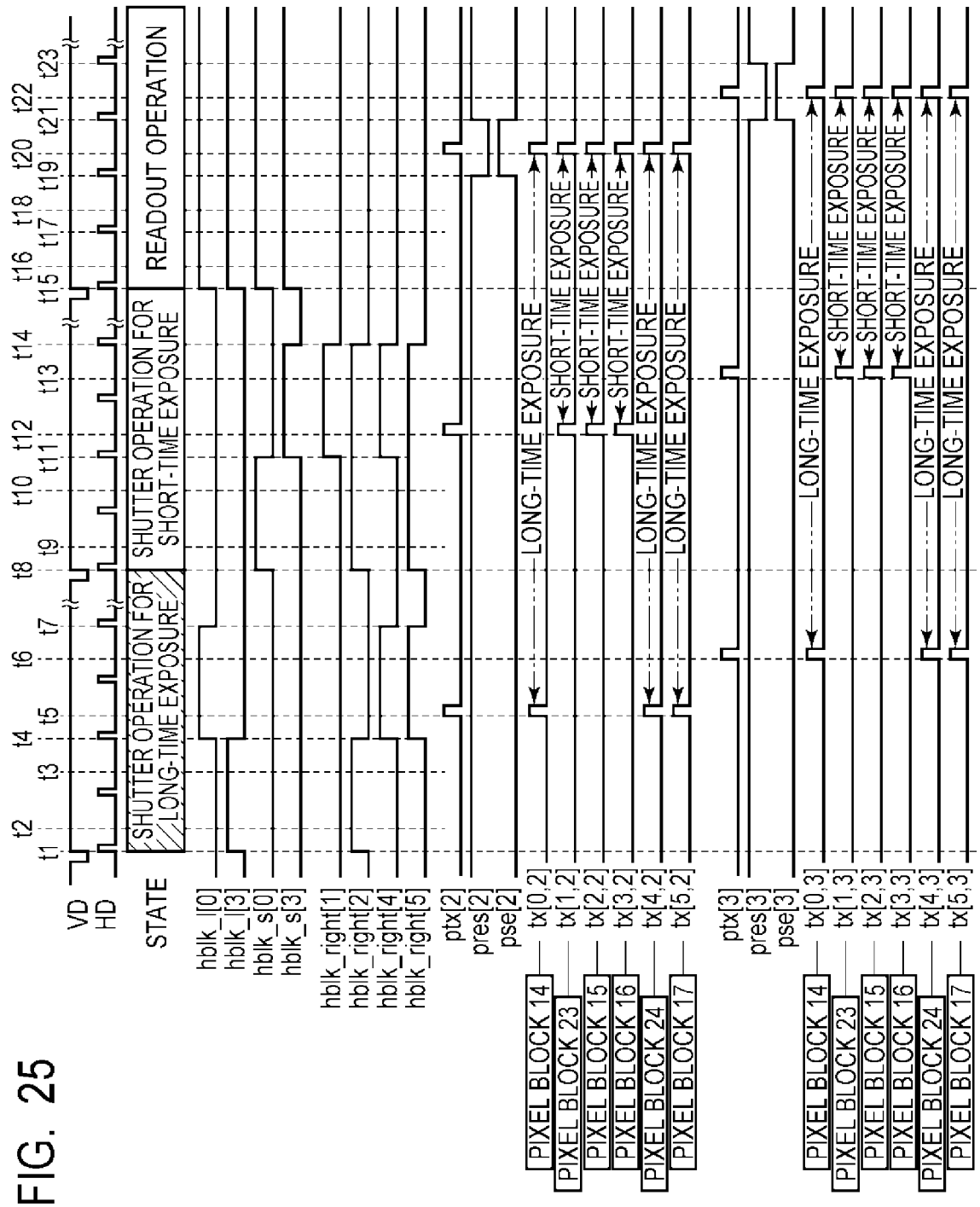

Next, the method of driving the imaging device according to the present embodiment will be described with reference to FIG. 23 to FIG. 25. FIG. 23 is a diagram schematically illustrating an exposure period in each pixel block in a pixel unit. FIG. 24 and FIG. 25 are timing charts illustrating the method of driving the imaging device according to the present embodiment.

An operation illustrated in FIG. 23 is assumed here as an example of controlling an exposure period for each pixel block of the pixel unit 1. That is, FIG. 23 illustrates that, out of the pixel unit 1, control of short-time exposure is performed on the pixel blocks 10, 21, 13, 23, 15, and 16 that are bright as a whole, and control of long-time exposure is performed on the pixel blocks 11, 12, 22, 14, 24, and 17 that are dark as a whole. Note that the pixel block adjacent to the right of the pixel block 13 is a pixel block on which control of short-time exposure is performed, and the pixel block adjacent to the right of the pixel block 17 is a pixel block on which control of long-time exposure is performed.

A specific example of driving of the imaging device for realizing the operation of FIG. 23 will be described with reference to FIG. 24 and FIG. 25. FIG. 24 is a timing diagram illustrating the operation of the pixel blocks 10, 21, 11, 12, 22, and 13, and FIG. 25 is a timing diagram illustrating the operation of the pixel blocks 14, 23, 15, 16, 24, and 17.

FIG. 24 and FIG. 25 illustrate the operation for consecutive three scans. In these three scans, the first scan is a scan to perform a shutter operation for long-time exposure, the second scan is a scan to perform a shutter operation for short-time exposure, and the third scan is a scan to perform a readout operation for reading out pixel signals from the pixel unit 1. The overview of the operation is the same as the operation of the first embodiment described with reference to FIG. 7 and FIG. 8.

The first HD period of the first scan is a period in which a shutter operation for long-time exposure is performed on the pixels 100 belonging to a pixel row corresponding to the vertical row address [0]. Pixel blocks on which long-time exposure is performed are pixel blocks 11, 12, and 22 out of the pixel blocks corresponding to the vertical row address [0].

At time t1, out of the control signals hblk_1 and hblk_s, only the control signal hblk_1 [3] corresponding to the pixel block 12 is controlled to the High level. Further, to cause the pixel block 11 to be controlled in long-time exposure, the control signal hblk_right [2] corresponding to the pixel block 11 is controlled to the High level. Further, to cause the pixel block 22 to be controlled in long-time exposure, the control signal hblk_right [4] corresponding to the pixel block 22 is controlled to the Low level. Other control signals supplied from the horizontal region control unit 3 are maintained at the Low level.

In this state, at time t2, the control signal ptx [0] on a pixel row corresponding to the vertical row address [0] is controlled from the Low level to the High level. Thereby, the control signals tx [2, 0], tx [3, 0], and tx [4, 0] are at the High level, and the pixels 100 belonging to the pixel row corresponding to the vertical row address [0] of the pixel blocks 11, 12, and 22 are reset. The control signal ptx [0] is then turned back to the Low level, and thereby an exposure period for long-time exposure starts in the photoelectric converter PD of the pixels 100 on the row corresponding to the vertical row address [0] of the pixel blocks 11, 12, and 22.

The second HD period of the first scan is a period in which a shutter operation for long-time exposure is performed on the pixels 100 belonging to a pixel row corresponding to the vertical row address [1]. Pixel blocks on which long-time exposure is performed are pixel blocks 11, 12, and 22 out of the pixel blocks corresponding to the vertical row address [1]. Since the operation in the second HD period is the same as the operation in the first HD period, the description thereof is omitted here.

The third HD period of the first scan is a period in which a shutter operation for long-time exposure is performed on the pixels 100 belonging to a pixel row corresponding to the vertical row address [2]. Pixel blocks on which long-time exposure is performed are pixel blocks 14, 24, and 17 out of the pixel blocks corresponding to the vertical row address [2].

At time t4, out of the control signals hblk_1 and hblk_s, only the control signal hblk_1 [0] corresponding to the pixel block 14 is controlled to the High level. Further, to cause the pixel block 24 to be controlled in long-time exposure, the control signal hblk_right [4] corresponding to the pixel block 24 is controlled to the High level. Further, to cause the pixel block 17 to be controlled in long-time exposure, the control signal hblk_right [5] corresponding to the pixel block 17 is controlled to the High level. Other control signals supplied from the horizontal region control unit 3 are maintained at the Low level.

In this state, at time t5, the control signal ptx [2] on a pixel row corresponding to the vertical row address [2] is controlled from the Low level to the High level. Thereby, the control signals tx [0, 2], tx [4, 2], and tx [5, 2] are at the High level, and the pixels 100 belonging to the pixel row corresponding to the vertical row address [2] of the pixel blocks 14, 24, and 17 are reset. The control signal ptx [2] is then turned back to the Low level, and thereby an exposure period for long-time exposure starts in the photoelectric converter PD of the pixels 100 on the row corresponding to the vertical row address [2] of the pixel blocks 14, 24, and 17.

The fourth HD period of the first scan is a period in which a shutter operation for long-time exposure is performed on the pixels 100 belonging to a pixel row corresponding to the vertical row address [3]. Pixel blocks on which long-time exposure is performed are pixel blocks 14, 24, and 17 out of the pixel blocks corresponding to the vertical row address [3]. Since the operation in the fourth HD period is the same as the operation in the third HD period, the description thereof is omitted here.

In such a way, in the first scan, accumulation of signal charge is started in the pixels 100 of the pixel blocks 11, 12, 22, 14, 24, and 17, and no operation is performed on the pixels 100 of the pixel blocks 10, 21, 13, 23, 15, and 16.

The first HD period of the second scan is a period in which a shutter operation for short-time exposure is performed on the pixels 100 belonging to a pixel row corresponding to the vertical row address [0]. Pixel blocks on which short-time exposure is performed are pixel blocks 10, 21, and 13 out of the pixel blocks corresponding to the vertical row address [0].

At time t8, out of the control signals hblk_1 and hblk_s, only the control signal hblk_s [0] corresponding to the pixel block 10 is controlled to the High level. Further, to cause the pixel block 21 to be controlled in short-time exposure, the control signal hblk_right [1] corresponding to the pixel block 21 is controlled to the Low level. Further, to cause the pixel block 13 to be controlled in short-time exposure, the control signal hblk_right [5] corresponding to the pixel block 13 is controlled to the High level. Other control signals supplied from the horizontal region control unit 3 are maintained at the Low level.

In this state, at time t9, the control signal ptx [0] on a pixel row corresponding to the vertical row address [0] is controlled from the Low level to the High level. Thereby, the control signals tx [0, 0], tx [1, 0], and tx [5, 0] are at the High level, and the pixels 100 belonging to the pixel row corresponding to the vertical row address [0] of the pixel blocks 10, 21, and 13 are reset. The control signal ptx [0] is then turned back to the Low level, and thereby an exposure period for short-time exposure starts in the photoelectric converter PD of the pixels 100 on the row corresponding to the vertical row address [0] of the pixel blocks 10, 21, and 13.

The second HD period of the second scan is a period in which a shutter operation for short-time exposure is performed on the pixels 100 belonging to a pixel row corresponding to the vertical row address [1]. Pixel blocks on which short-time exposure is performed are pixel blocks 10, 21, and 13 out of the pixel blocks corresponding to the vertical row address [1]. Since the operation in the second HD period is the same as the operation in the first HD period, the description thereof is omitted here.

The third HD period of the second scan is a period in which a shutter operation for short-time exposure is performed on the pixels 100 belonging to a pixel row corresponding to the vertical row address [2]. Pixel blocks on which short-time exposure is performed are pixel blocks 23, 15, and 16 out of the pixel blocks corresponding to the vertical row address [2].

At time t11, out of the control signals hblk_1 and hblk_s, only the control signal hblk_s [3] corresponding to the pixel block 16 is controlled to the High level. Further, to cause the pixel block 23 to be controlled in short-time exposure, the control signal hblk_right [1] corresponding to the pixel block 23 is controlled to the High level. Further, to cause the pixel block 15 to be controlled in short-time exposure, the control signal hblk_right [2] corresponding to the pixel block 15 is controlled to the High level. Other control signals supplied from the horizontal region control unit 3 are maintained at the Low level.

In this state, at time t12, the control signal ptx [2] on a pixel row corresponding to the vertical row address [2] is controlled from the Low level to the High level. Thereby, the control signals tx [1, 2], tx [2, 2], and tx [3, 2] are at the High level, and the pixels 100 belonging to the pixel row corresponding to the vertical row address [2] of the pixel blocks 23, 15, and 16 are reset. The control signal ptx [2] is then turned back to the Low level, and thereby an exposure period for short-time exposure starts in the photoelectric converter PD of the pixels 100 on the row corresponding to the vertical row address [2] of the pixel blocks 23, 15, and 16.

The fourth HD period of the second scan is a period in which a shutter operation for short-time exposure is performed on the pixels 100 belonging to a pixel row corresponding to the vertical row address [3]. Pixel blocks on which short-time exposure is performed are pixel blocks 23, 15, and 16 out of the pixel blocks corresponding to the vertical row address [3]. Since the operation in the fourth HD period is the same as the operation in the third HD period, the description thereof is omitted here.

In such a way, in the second scan, accumulation of signal charge is started in the pixels 100 of the pixel blocks 10, 21, 13, 23, 15, and 16, and no operation is performed on the pixels 100 of the pixel blocks 11, 12, 22, 14, 24, and 17. In the pixels 100 of the pixel blocks 11, 12, 22, 14, 24, and 17, the accumulation of signal charge started in the first scan is continued.

In the third scan, readout of signals from the pixels 100 belonging to all the pixel blocks is performed. Accordingly, the horizontal region control unit 3 maintains the control signals hblk_1 [0], hblk_1 [3], hblk_s [0], and hblk_s [3] at the High level over the entire period of the third scan. Further, the boundary control unit 31 maintains the control signals hblk_right [1], hblk_right [2], hblk_right [4], and hblk_right [5] at the Low level over the entire period of the third scan. Thereby, the control signal ptx [n] will be input to all the pixel blocks located on a row corresponding to the vertical row address [n].

Since the driving of the control signals ptx [n], pres [n], and psel [n] from time t15 of the third scan is the same as that in the first embodiment, the description thereof is omitted here.

As described above, in the present embodiment, a plurality of pixel blocks controlled by the control signal hblk_right are arranged between the adjacent pixel blocks controlled by the control signals hblk_1 and hblk_s. Therefore, according to the present embodiment, the advantageous effects described in the first and second embodiments are obtained, and in addition, it is possible to perform fine setting of the exposure area in accordance with an object and further suppress a reduction in image quality.

Note that, although the case where the exposure period is controlled has been illustrated as an example in the present embodiment as a variation of the second embodiment, a similar configuration to that of the present embodiment is also applicable to the case where the gain is controlled as with the third or fourth embodiment. For example, in the third embodiment, a plurality of pixel blocks connected to the amplifier 83 whose gain is controlled via the selector 82 controlled by the control signal gain_right can be arranged between pixel blocks connected to the amplifier 83 controlled by the control signal gain.

Sixth Embodiment

An imaging device and a method of driving the same according to a sixth embodiment of the present disclosure will be described with reference to FIG. 26 and FIG. 27. The same components as those of the imaging device according to the first to fifth embodiments are labeled with the same references, and the description thereof will be omitted or simplified.

Figure 26:
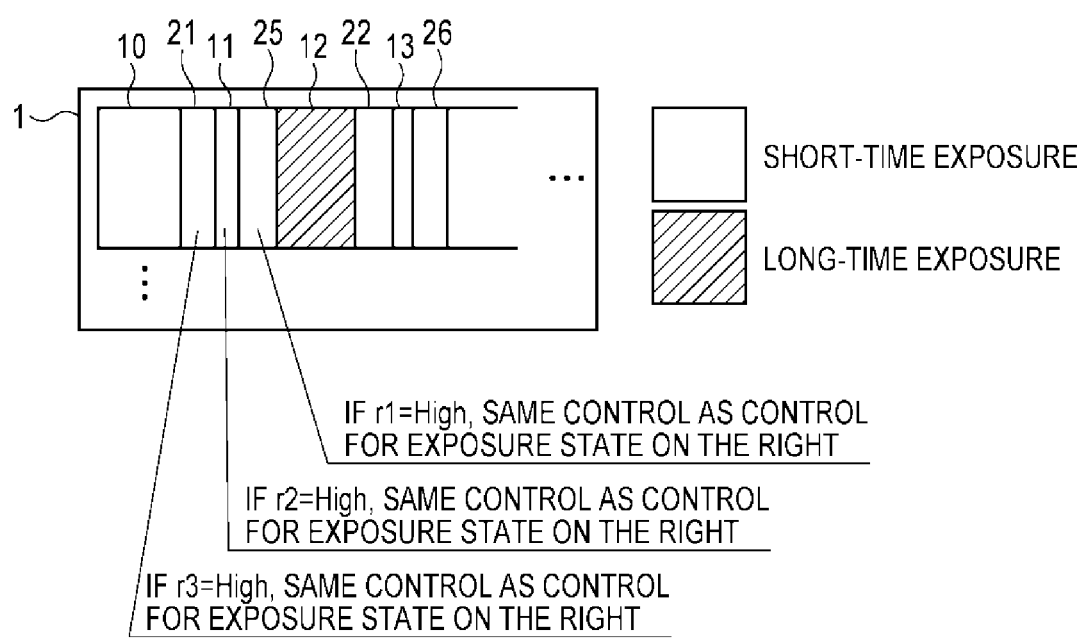
FIG. 26 is a diagram illustrating an overview of control on a pixel block basis in an imaging device according to a sixth embodiment of the present disclosure.

FIG. 26 is a diagram illustrating an overview of control on a pixel block basis in the imaging device according to the present embodiment. In the present embodiment, pixel blocks 25 and 26 are further added to the pixel unit 1 of the imaging device according to the fifth embodiment. The pixel block 25 is a pixel block arranged between the pixel block 11 and the pixel block 12. The pixel block 26 is a pixel block arranged adjacent to the right of the pixel block 13. The pixel blocks 25 and 26 may be formed of the same number of pixels as the pixel blocks 21 and 22.

Herein, control signals used for performing exposure control of the pixel blocks 25, 11, and 21 are denoted as control signals r1, r2, and r3. The control signals r1, r2, and r3 correspond to the control signal hblk_right in the fifth embodiment. The control signal r1 is set to the High level when the same exposure control as that for the adjacent pixel block 12 on the right is set for the pixel block 25, and the control signal r1 is set to the Low level when the same exposure control as that for the adjacent pixel block 11 on the left is set for the pixel block 25. Further, the control signal r2 is set to the High level when the same exposure control as that for the adjacent pixel block 25 on the right is set for the pixel block 11, and the control signal r2 is set to the Low level when the same exposure control as that for the adjacent pixel block 21 on the left is set for the pixel block 11. Further, the control signal r3 is set to the High level when the same exposure control as that for the adjacent pixel block 11 on the right is set for the pixel block 21, and the control signal r3 is set to the Low level when the same exposure control as that for the adjacent pixel block 10 on the left is set for the pixel block 21.

Next, the method of driving the imaging device according to the present embodiment will be described with reference to FIG. 27. FIG. 27 is a flowchart illustrating the method of driving the imaging device according to the present embodiment. The process flow illustrated in FIG. 27 can be performed in the timing generation unit 4 or a signal processing unit outside the imaging device, for example.

First, in step S100, a count value fcnt of a counter is initialized to 0. This counter is a counter that counts up every time the vertical synchronization signal VD at the High level is externally input.

Next, in step S101, it is determined whether or not the remainder of the count value fcnt divided by 6 is 0. If the remainder is 0 (FIG. 27, "YES"), the process proceeds to step S102.

In step S102, control signal r1=0 (Low level), control signal r2=0 (Low level), and control signal r3=0 (Low level) are set, and exposure control of each pixel block is performed. That is, as illustrated on the right side of step S102 in FIG. 27, control of short-time exposure is performed on the pixel blocks 10, 21, 11, and 25, and control of long-time exposure is performed on the pixel block 12. Note that the short-time exposure control of the pixel block 10 and the long-time exposure control of the pixel block 12 are performed by controlling predetermined control signals at predetermined timings in accordance with the drive method described in the fifth embodiment. After the process of step S102, the process proceeds to step S108.

As a result of determination in step S101, if the remainder of the count value fcnt divided by 6 is not 0, that is, the remainder is any of 1 to 5 (FIG. 27, "NO"), the process proceeds to step S103.

In step S103, it is determined whether or not the remainder of the count value fcnt divided by 6 is 1 or 5. If the remainder is 1 or 5 (FIG. 27, "YES"), the process proceeds to step S104.

In step S104, control signal r1=1 (High level), control signal r2=0 (Low level), and control signal r3=0 (Low level) are set, and exposure control of each pixel block is performed. That is, as illustrated on the right side of step S104 in FIG. 27, control of short-time exposure is performed on the pixel blocks 10, 21, and 11, and control of long-time exposure is performed on the pixel blocks 25 and 12. After the process of step S104, the process proceeds to step S108.

As a result of determination in step S103, if the remainder of the count value fcnt divided by 6 is neither 1 nor 5, that is, the remainder is any of 2 to 4 (FIG. 27, "NO"), the process proceeds to step S105.

In step S105, it is determined whether or not the remainder of the count value fcnt divided by 6 is 2 or 4. If the remainder is 2 or 4 (FIG. 27, "YES"), the process proceeds to step S106.

In step S106, control signal r1=1 (High level), control signal r2=1 (High level), and control signal r3=0 (Low level) are set, and exposure control of each pixel block is performed. That is, as illustrated on the right side of step S106 in FIG. 27, control of short-time exposure is performed on the pixel blocks 10 and 21, and control of long-time exposure is performed on the pixel blocks 11, 25, and 12. After the process of step S106, the process proceeds to step S108.

As a result of determination in step S105, if the remainder of the count value fcnt divided by 6 is neither 2 nor 4, that is, the remainder is 3 (FIG. 27, "NO"), the process proceeds to step S107.

In step S107, control signal r1=1 (High level), control signal r2=1 (High level), and control signal r3=1 (High level) are set, and exposure control of each pixel block is performed. That is, as illustrated on the right side of step S107 in FIG. 27, control of short-time exposure is performed on the pixel block 10, and control of long-time exposure is performed on the pixel blocks 21, 11, 25, and 12. After the process of step S107, the process proceeds to step S108.

Next, in step S108, it is determined whether or not the vertical synchronization signal VD is input. If the vertical synchronization signal VD is input (FIG. 27, "YES"), the process proceeds to step S109, and if the vertical synchronization signal VD is not input (FIG. 27, "NO"), the process returns to step S108. Step S108 is a step of waiting for input of the vertical synchronization signal VD.

Next, in step S109, the count value fcnt of the counter is counted up.

Next, in step S110, it is determined whether or not a sensor is stopped. As a result of the determination in step S110, if the sensor is stopped (FIG. 27, "YES"), the process ends, and if the sensor is not stopped (FIG. 27, "NO"), the process returns to step S101 and is continued.

Figure 27:
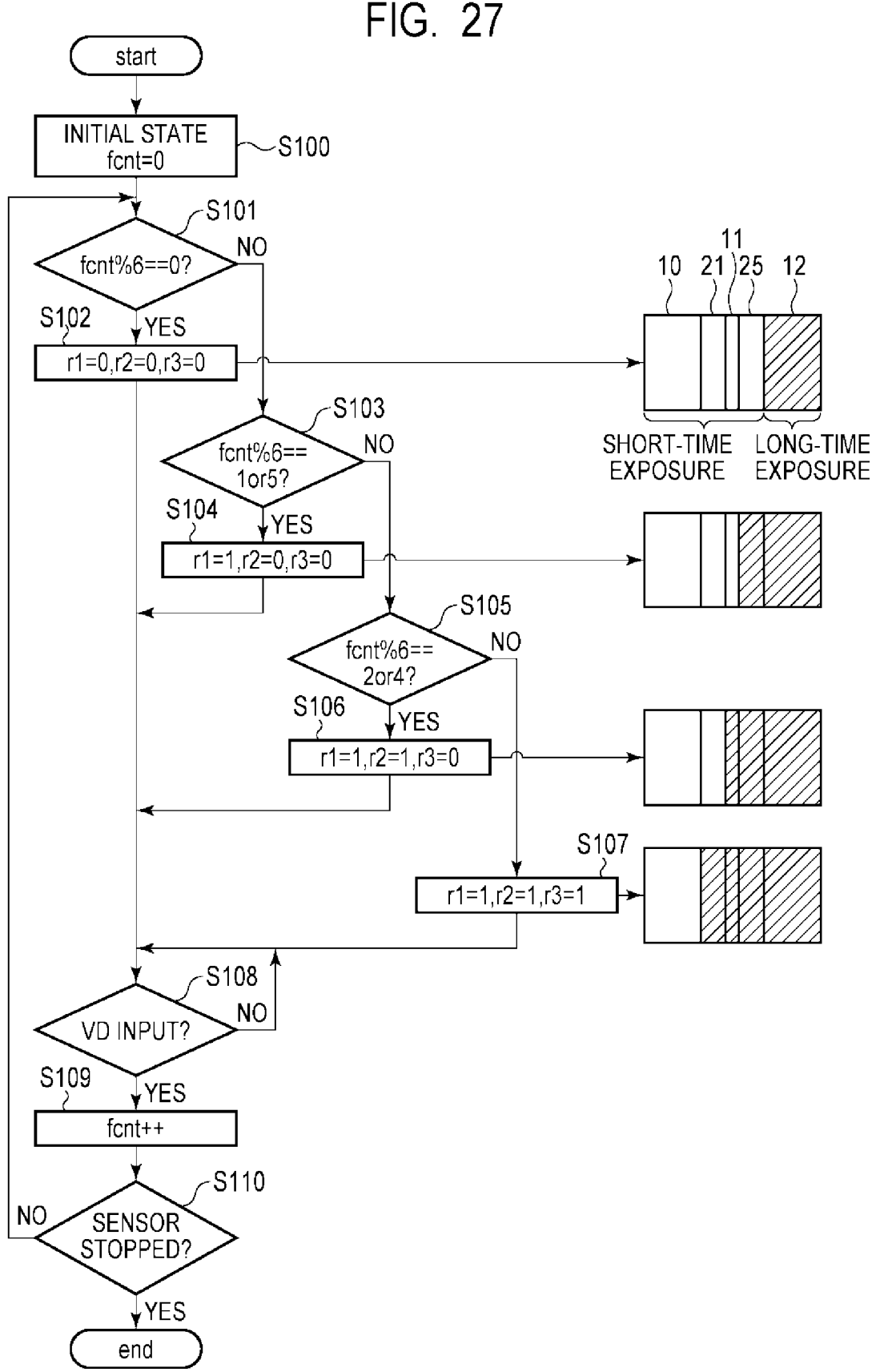
FIG. 27 is a flowchart illustrating a method of driving the imaging device according to the sixth embodiment of the present disclosure.

When the imaging device is driven in accordance with the flow illustrated in FIG. 27, first, the first driving to apply the same control as the control for the pixel block 12 to the pixel blocks 25, 11, and 21 sequentially one by one from the pixel block 12 side to the pixel block 10 side is performed. Next, the second driving to apply the same control as the control for the pixel block 10 to the pixel blocks 21, 11, and 25 sequentially one by one from the pixel block 10 side to the pixel block 12 side is performed. The first driving and the second driving are then performed alternately. That is, the exposure period for the three pixel blocks 11, 21, and 25 arranged between the pixel block 10 and the pixel block 12 changes periodically with six vertical periods being defined as one cycle.

In such a way, by predefining a flow of causing a control setting to be the same as that for an adjacent pixel block, it is possible to set the exposure period of each pixel block with simpler control even when the moving direction of an object is unknown. For example, by using the flow of the present embodiment for pre-circulation before the moving direction or the moving speed of an object is determined, it is possible to determine whether or not the right side region is relied on, whether or not the left side region is relied on, how many regions rely on such a region, or the like, and it is possible to find out the optimal setting.

Note that, although the exposure control when the three pixel blocks 11, 21, and 25 are arranged between the pixel block 10 and the pixel block 12 has been illustrated in the present embodiment, the number of pixel blocks arranged between the pixel block 10 and the pixel block 12 is not particularly limited. For example, when only the pixel block 11 is arranged between the pixel block 10 and the pixel block 12, this results in a periodical operation with two vertical periods being defined as one cycle.

Seventh Embodiment

Figure 28A:
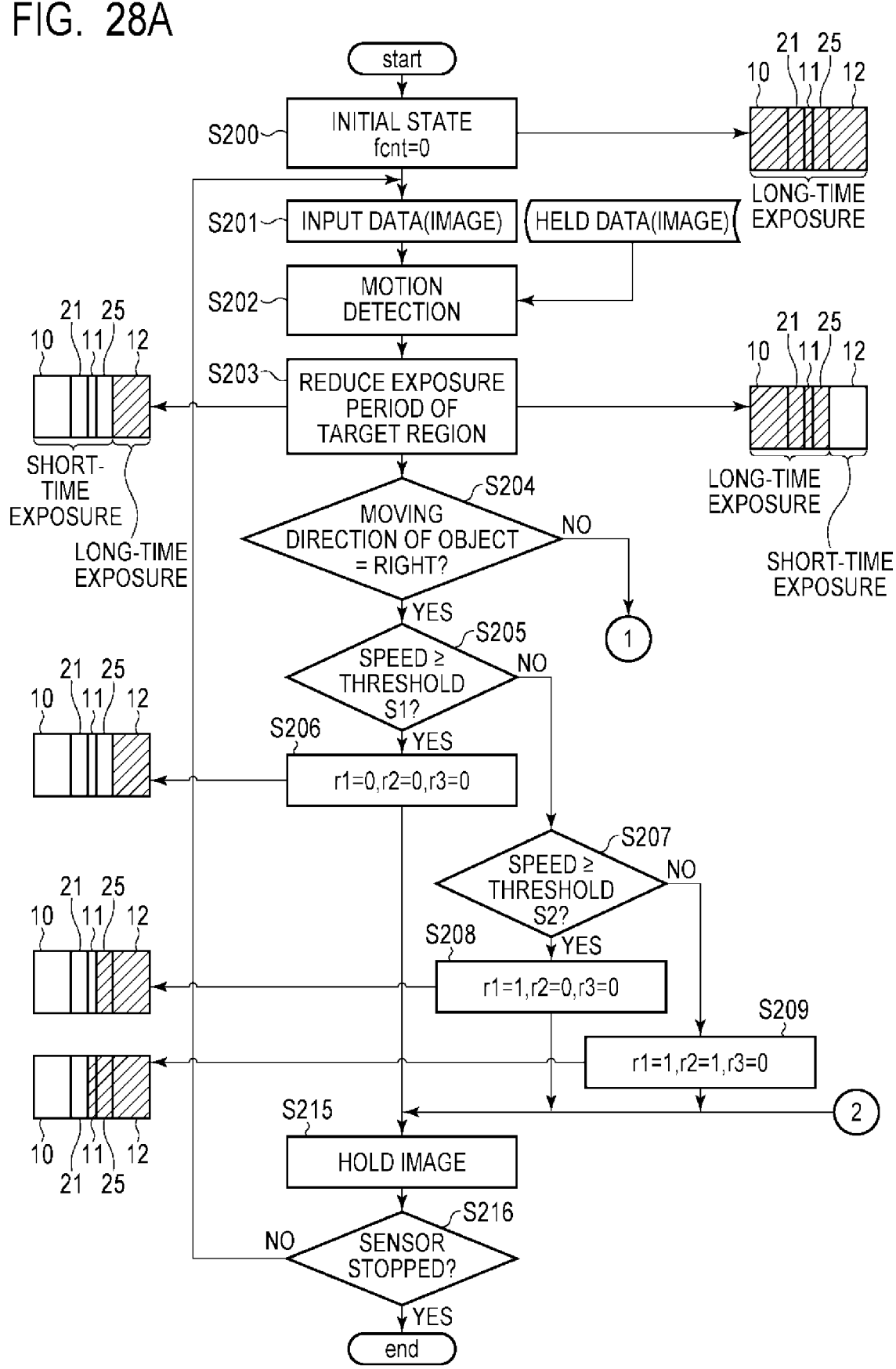
FIG. 28A and FIG. 28B are flowcharts illustrating a method of driving an imaging device according to a seventh embodiment of the present disclosure.
Figure 28B:
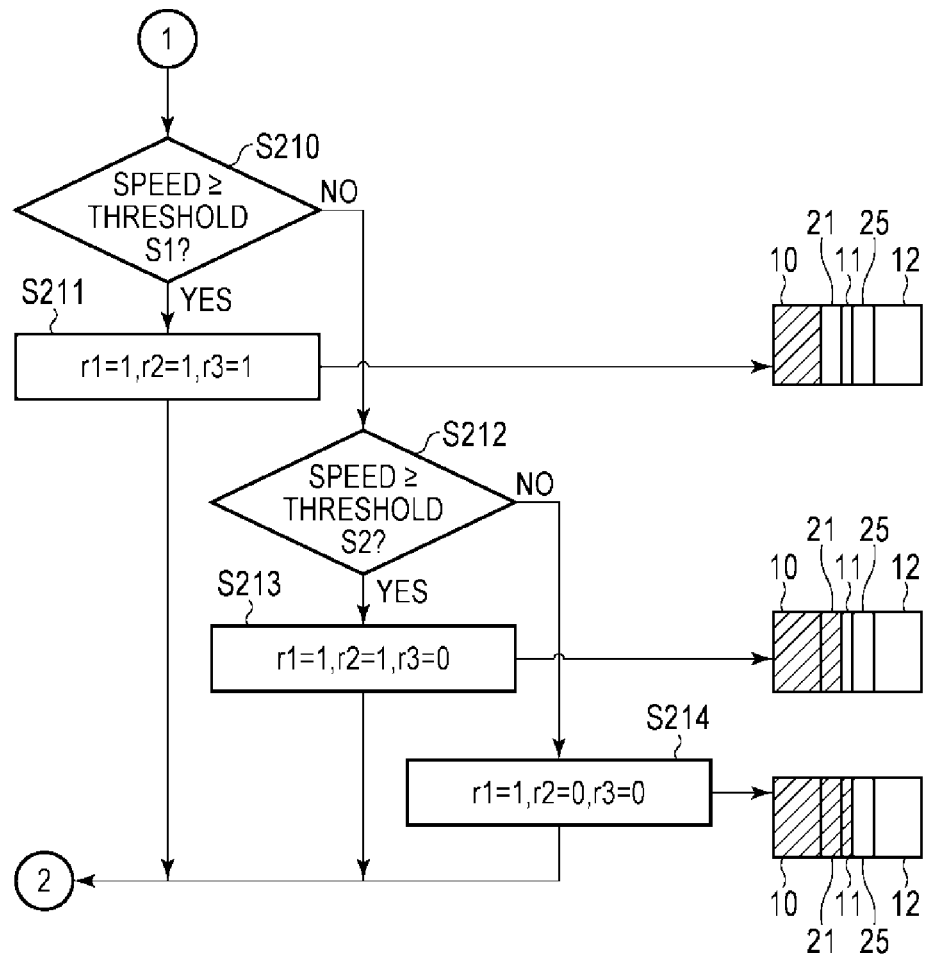

A method of driving an imaging device according to a seventh embodiment of the present disclosure will be described with reference to FIG. 28A and FIG. 28B. The same components as those of the imaging device according to the first to sixth embodiments are labeled with the same references, and the description thereof will be omitted or simplified. FIG. 28A and FIG. 28B are flowcharts illustrating the method of driving the imaging device according to the present embodiment.

In the present embodiment, another example of driving of the imaging device including the same pixel blocks 10, 21, 11, 25, and 12 as those of the sixth embodiment in the pixel unit 1 will be described. The process flow illustrated in FIG. 28A and FIG. 28B can be implemented in the timing generation unit 4, the signal output unit 7, the signal processing unit outside the imaging device 1000, or the like, for example.

First, in step S200, the control signals r1, r2, and r3 are set to 0 (Low level) as the set value (initial value) of the initial state. In the present embodiment, image capturing of a night view, image capturing during night traveling, or the like are assumed, and long-time exposure is set as the default. That is, in the initial state, the pixel blocks 10 and 12 are set to long-time exposure, and the pixel blocks 21, 11, and 25 are set in accordance with the setting of the pixel block 10. Note that the setting value of the initial state can be changed as appropriate in accordance with the situation at image capturing or the like.

Next, in step S201, image data is acquired. The acquisition of image data in step S201 is assumed to drive the timing generation unit 4, the vertical scanning unit 2, and the horizontal region control unit 3 and input image data acquired from the pixel unit 1 to the signal output unit 7.

Next, in step S202, for example, the signal output unit 7 compares the image data acquired in step S201 with held data and performs motion detection of an object included in the image acquired in step S201. In such a case, the signal output unit 7 functions as a moving object detection unit to detect motion of an object. The scheme of motion detection in step S202 is not particularly limited. For example, an optical flow method of comparing held image data, which has not yet scanned, with input image data and detecting motion of an object from a change of a luminance level can be applied. Alternatively, a block matching method of dividing an image into arbitrary rectangle blocks and determining whether or not there is a matching between the not-yet scanned image data and the input image data can be applied.

Next, in step S203, it is detected which pixel block the object whose motion has been detected in step S202 is located in, and the pixel block in which the object is located is set as a pixel block to be controlled in short-time exposure. For example, when a moving object is detected in the pixel block 10, the pixel block 10 is set for short-time exposure as illustrated on the left side of the step S203 in FIG. 28A. At this time, since the control signals r1, r2, and r3 are 0, the pixel blocks 21, 11, and 25 are also set for short-time exposure. Further, when a moving object is detected in the pixel block 12, the pixel block 12 is set for short-time exposure as illustrated on the right side of the step S203 in FIG. 28A. At this time, since the control signals r1, r2, and r3 are 0, the pixel blocks 21, 11, and 25 are maintained in the setting of long-time exposure.

Next, in step S204, it is determined whether or not the moving direction of the moving object is the right direction. As a result of the determination, if the moving direction of the moving object is the right direction (FIG. 28A, "YES"), the process proceeds to step S205. Herein, the operation from step S205 to step S209 will be described with an example of a case where an object detected in the pixel block 10 moves in the right direction.

In step S205, the moving speed of the moving object is calculated, and it is determined whether or not the calculated moving speed of the object is greater than or equal to a threshold S1. The threshold S is provided assuming that the moving speed of the object is the fastest. As a result of the determination, if the moving speed of the object is greater than or equal to the threshold S (FIG. 28A, "YES"), the process proceeds to step S206.

In step S206, the control signals r1, r2, and r3 are set to 0 (Low level). Thereby, the pixel blocks 10, 21, 11, and 25 are set for short-time exposure as illustrated on the left side of step S206 in FIG. 28A. The reason why such driving is employed is to set a wider range for short-time exposure as much as possible in accordance with the fast moving speed of the object. After the process of step S206, the process proceeds to step S215.

As a result of the determination in step S205, if the moving speed of the object is less than the threshold S1 (FIG. 28A, "NO"), the process proceeds to step S207.

In step S207, it is determined whether or not the moving speed of the moving object is greater than or equal to a threshold S2. The threshold S2 is a predetermined value that is less than the threshold S1. As a result of the determination, if the moving speed of the object is greater than or equal to the threshold S2 (FIG. 28A, "YES"), the process proceeds to step S208.

In step S208, the control signal r1 is set to 1 (High level), and the control signals r2 and r3 are set to 0 (Low level). Thereby, the pixel blocks 10, 21, and 11 are set for short-time exposure, and the pixel block 25 is set for long-time exposure, as illustrated on the left side of step S208 in FIG. 28A. After the process of step S208, the process proceeds to step S215.

As a result of the determination in step S207, if the moving speed of the object is less than the threshold S2 (FIG. 28A, "NO"), the process proceeds to step S209.

In step S209, the control signals r1 and r2 are set to 1 (High level), and the control signal r3 is set to 0 (Low level). Thereby, the pixel blocks 10 and 21 are set for short-time exposure, and the pixel blocks 11 and 25 are set for long-time exposure, as illustrated on the left side of step S209 in FIG. 28A. The reason why such driving is employed is to set a wide range for short-time exposure in accordance with the slow moving speed of the object. After the process of step S209, the process proceeds to step S215.

As a result of the determination in step S204, if the moving direction of the moving object is the left direction (FIG. 28A, "NO"), the process proceeds to step S210. Herein, the operation from step S210 to step S214 will be described with an example of a case where an object detected in the pixel block 12 moves in the left direction.

In step S210, the moving speed of the moving object is calculated, and it is determined whether or not the calculated moving speed of the object is greater than or equal to the threshold S1. As a result of the determination, if the moving speed of the object is greater than or equal to the threshold S (FIG. 28B, "YES"), the process proceeds to step S211.

In step S211, the control signals r1, r2, and r3 are set to 1 (High level). Thereby, the pixel blocks 21, 11, 25, and 12 are set for short-time exposure as illustrated on the right side of step S211 in FIG. 28B. The reason why such driving is employed is to set a wider range for short-time exposure as much as possible in accordance with the fast moving speed of the object. After the process of step S211, the process proceeds to step S215.

As a result of the determination in step S210, if the moving speed of the object is less than the threshold S (FIG. 28B, "NO"), the process proceeds to step S212.

In step S212, it is determined whether or not the moving speed of the moving object is greater than or equal to the threshold S2. As a result of the determination, if the moving speed of the object is greater than or equal to the threshold S2 (FIG. 28B, "YES"), the process proceeds to step S213.

In step S213, the control signals r1 and r2 are set to 1 (High level), and the control signal r3 is set to 0 (Low level). Thereby, the pixel block 21 is set for long-time exposure, and the pixel blocks 11 and 25 are set for short-time exposure, as illustrated on the right side of step S213 in FIG. 28B. After the process of step S213, the process proceeds to step S215.

As a result of the determination in step S212, if the moving speed of the object is less than the threshold S2 (FIG. 28B, "NO"), the process proceeds to step S214.

In step S214, the control signal r1 is set to 1 (High level), and the control signals r2 and r3 are set to 0 (Low level). Thereby, the pixel blocks 21 and 11 are set for long-time exposure, and the pixel block 25 is set for short-time exposure, as illustrated on the right side of step S214 in FIG. 28B. The reason why such driving is employed is to set a narrow range for short-time exposure in accordance with the slow moving speed of the object. After the process of step S214, the process proceeds to step S215.

Next, in step S215, image data is acquired based on the exposure setting determined in accordance with the procedure described above and stored in a scan memory.

Next, in step S216, it is determined whether or not a sensor is stopped. As a result of the determination in step S216, if the sensor is stopped (FIG. 28A, "YES"), the process ends, and if the sensor is not stopped (FIG. 28A, "NO"), the process returns to step S201 and is continued.

By driving the imaging device in accordance with the flow illustrated in FIG. 28A and FIG. 28B, it is possible to perform suitable image capturing in accordance with motion of an object. That is, when it is detected that an object is moving, the pixel blocks 21, 11, and 25 on which the same control as that for the pixel block 10 is performed can be set in accordance with the moving direction and the moving speed of the object. For example, when an object is moving from the pixel block 10 to the pixel block 12 side, out of the pixel blocks 21, 11, and 25, the number of pixel blocks on which the same control as that for the pixel block 10 is performed is increased from the pixel block 10 side as the moving speed of the object increases.

As described above, according to the present embodiment, since exposure conditions for respective pixel blocks are changed in accordance with motion of an object, it is possible to prevent a reduction in image quality and further suppress a reduction in accuracy of moving object detection.

Eighth Embodiment

An imaging device and a method of driving the same according to an eighth embodiment of the present disclosure will be described with reference to FIG. 29. The same components as those of the imaging device according to the first to seventh embodiments are labeled with the same references, and the description thereof will be omitted or simplified.

In step S202 in the method of driving the imaging device according to the seventh embodiment, it is possible to predict the moving direction or speed of an object and set exposure conditions on a pixel block basis by classifying a moving object and performing machine learning in advance.

Figure 29:
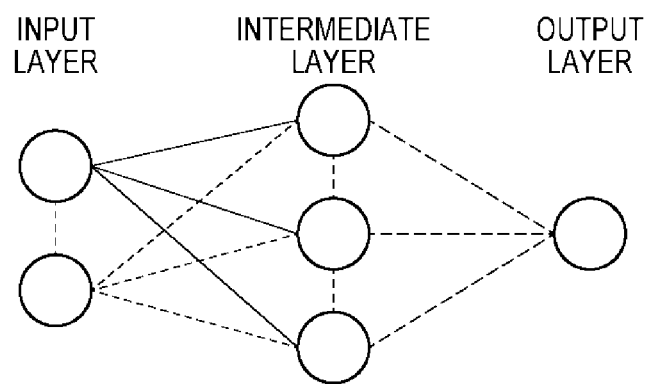
FIG. 29 is a schematic diagram of a neural network of a machine learning model.

FIG. 29 illustrates a schematic diagram of a neural network of a machine learning model. The machine learning model is trained by the signal output unit 7, for example, and stored in a memory unit (not illustrated). The neural network includes an input layer having a plurality of nodes, an intermediate layer having a plurality of nodes, and an output layer having a single node.

The image data captured under the initial state setting in step S201 is input to each node of the input layer. Each node of the intermediate layer is connected to each node of the input layer. Each element of input values input to the nodes of the intermediate layer is used for operation in each node of the intermediate layer. Each node of the intermediate layer calculates an operation value by using input values input from respective nodes of the input layer, a predetermined weighting coefficient, and a predetermined bias value, for example. Each node of the intermediate layer is connected to the output layer and outputs a calculated operation value to the node of the output layer. Operation values are input to the node of the output layer from respective nodes of the intermediate layer.

The machine learning model (intermediate layer) classifies a moving object included in an image. For example, for a moving object specified at any time of image capturing (such as night time), the machine learning model distinguishes a difference of a person, an animal, a vehicle, or the like and predicts the size or the moving speed or direction of the object. This enables re-setting of exposure conditions of the initial state in step S200. Further, it is possible to determine a pixel block set for short-time exposure in step S203. Information indicating that a moving object is detected may be added as input data to the machine learning model.

As described above, according to the present embodiment, it is possible to specify a region in which a moving object may be present in an image and improve accuracy in classifying the moving object. Accordingly, it is possible to prevent a reduction in image quality and further suppress a reduction in accuracy of moving object detection.

Ninth Embodiment

Figure 30:
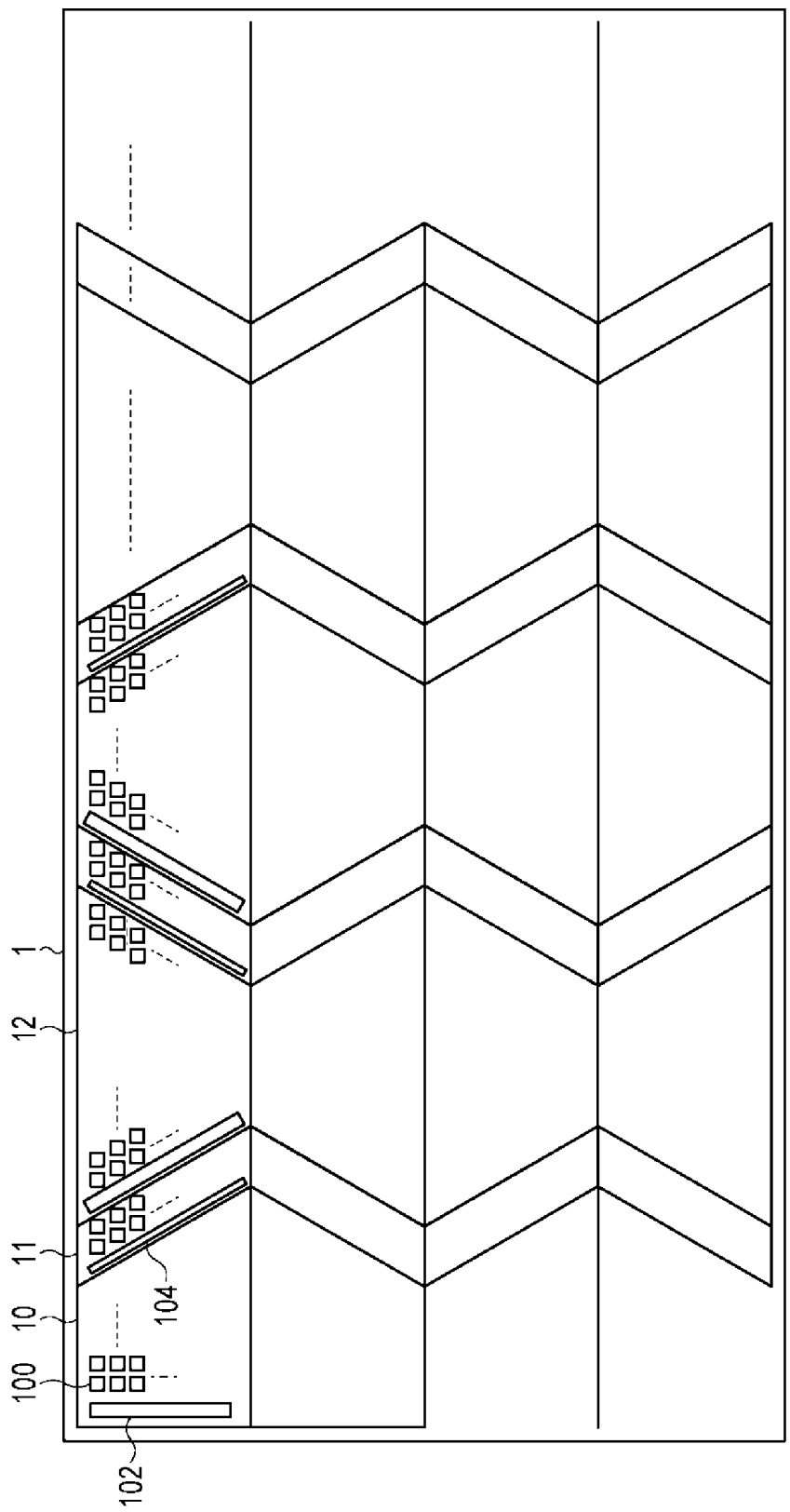
FIG. 30 is a block diagram illustrating an example of a configuration of a pixel unit in an imaging device according to a ninth embodiment of the present disclosure.

An imaging device and a method of driving the same according to a ninth embodiment of the present disclosure will be described with reference to FIG. 30. The same components as those of the imaging device according to the first to eighth embodiments are labeled with the same references, and the description thereof will be omitted or simplified. FIG. 30 is a block diagram illustrating an example of a configuration of a pixel unit in the imaging device according to the present embodiment.

Although a pixel block is defined on a pixel column basis in the above embodiments, a pixel block is not necessarily required to be defined on a pixel column basis. The boundary of adjacent pixel blocks arranged on the same pixel block row may be inclined with respect to the direction of a pixel column, as illustrated in FIG. 30, for example. Further, as illustrated in FIG. 30, pixel blocks may be arranged so that the boundary of pixel blocks is arranged in a zig-zag manner along the column direction. Such a configuration of pixel blocks enables not only movement detection in the lateral direction (row direction) but also movement detection in a diagonal direction.

As described above, according to the present embodiment, it is possible to address not only movement detection in a simple lateral direction but also movement detection in a more complex direction. Accordingly, it is possible to prevent a reduction in image quality and further suppress a reduction in accuracy of moving object detection.

Tenth Embodiment

Figure 31:
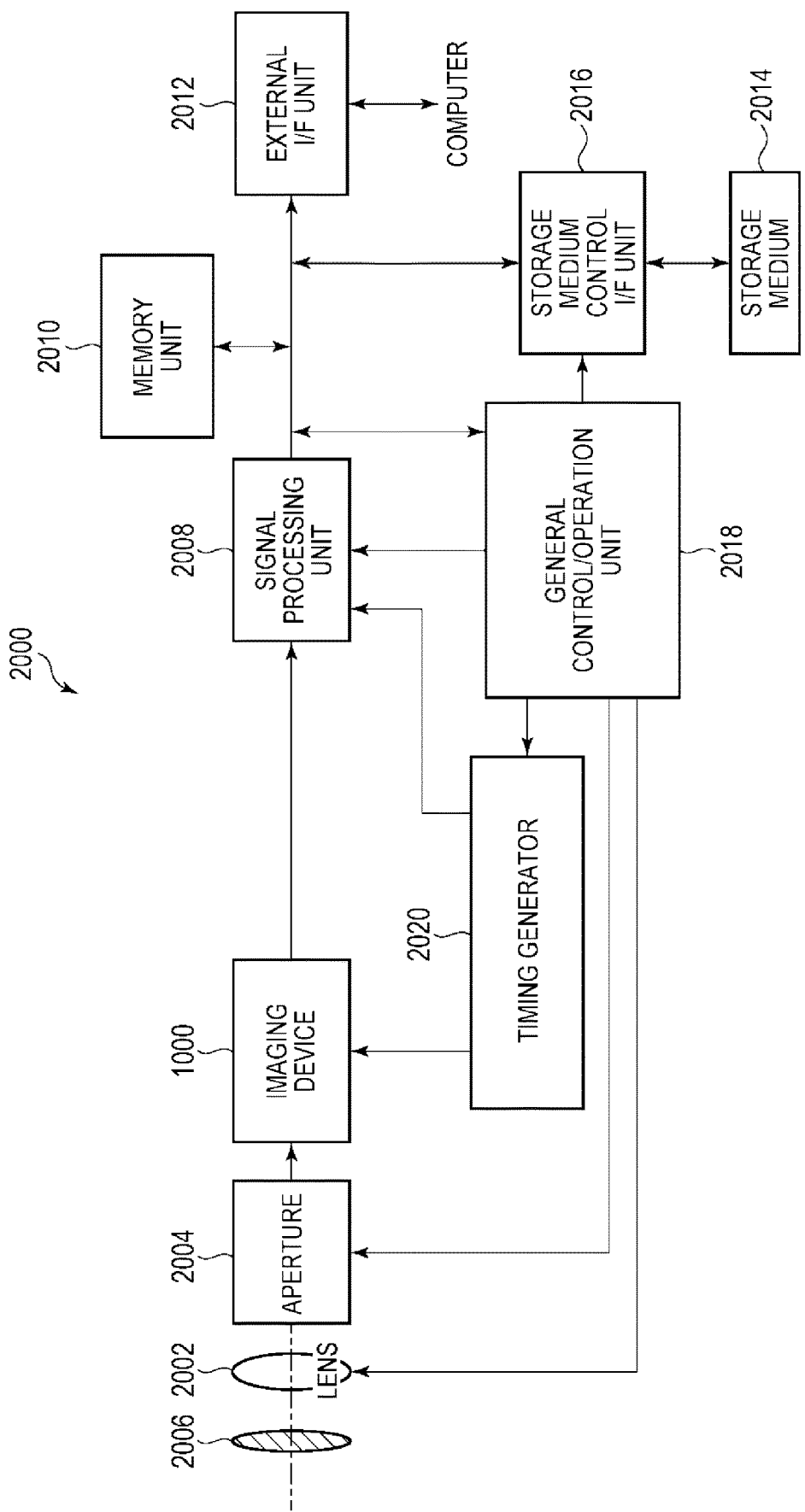
FIG. 31 is a block diagram illustrating a general configuration of an imaging system according to a tenth embodiment of the present disclosure.

An imaging system according to a tenth embodiment of the present disclosure will be described with reference to FIG. 31. FIG. 31 is a block diagram illustrating a general configuration of the imaging system according to the present embodiment.

The imaging device 1000 described in the above first to ninth embodiments can be applied to various imaging systems. Examples of applicable imaging systems may include a digital still camera, a digital camcorder, a surveillance camera, a copying machine, a fax machine, a mobile phone, an on-vehicle camera, an observation satellite, and the like. In addition, a camera module including an optical system such as a lens and an imaging device is also included in the imaging system. FIG. 31 illustrates a block diagram of a digital still camera as an example out of these examples.

An imaging system 2000 illustrated as an example in FIG. 31 includes the imaging device 1000, a lens 2002 that captures an optical image of a subject onto the imaging device 1000, an aperture 2004 for changing a light amount passing through the lens 2002, and a barrier 2006 for protecting the lens 2002. The lens 2002 and the aperture 2004 form an optical system that collects a light onto the imaging device 1000. The imaging device 1000 is the imaging device described in any of the first to ninth embodiments and converts an optical image captured by the lens 2002 into image data.

Further, the imaging system 2000 includes a signal processing unit 2008 that processes an output signal output from the imaging device 1000. The signal processing unit 2008 generates image data from digital signals output by the imaging device 1000. Further, the signal processing unit 2008 performs operations of performing various correction or compression to output image data, if necessary. The imaging device 1000 may include an AD conversion unit that generates a digital signal processed in the signal processing unit 2008. The AD conversion unit may be formed in a semiconductor layer (a semiconductor substrate) in which the photoelectric converter of the imaging device 1000 is formed or may be formed on a different semiconductor substrate from the semiconductor layer in which the photoelectric converter of the imaging device 1000 is formed. Further, the signal processing unit 2008 may be formed on the same semiconductor substrate as the imaging device 1000.

Furthermore, the imaging system 2000 includes a memory unit 2010 for temporarily storing image data therein and an external interface unit (external IF unit) 2012 for communicating with an external computer or the like. The imaging system 2000 further includes a storage medium 2014 such as a semiconductor memory for performing storage or readout of imaging data and a storage medium control interface unit (storage medium control I/F unit) 2016 for performing storage or readout on the storage medium 2014. Note that the storage medium 2014 may be embedded in the imaging system 2000 or may be removable.

Furthermore, the imaging system 2000 includes a general control/operation unit 2018 that performs various calculation and controls the entire digital still camera and a timing generator 2020 that outputs various timing signals to the imaging device 1000 and the signal processing unit 2008.

Here, the timing signal or the like may be input from the outside, and the imaging system 2000 may include at least the imaging device 1000 and the signal processing unit 2008 that processes an output signal output from the imaging device 1000.

The imaging device 1000 outputs an imaging signal to the signal processing unit 2008. The signal processing unit 2008 performs predetermined signal processing on an imaging signal output from the imaging device 1000 and outputs image data. The signal processing unit 2008 uses an imaging signal to generate an image.

As described above, according to the present embodiment, the imaging system to which the imaging device 1000 according to any of the first to ninth embodiments is applied can be realized.

Eleventh Embodiment

Figure 32A:
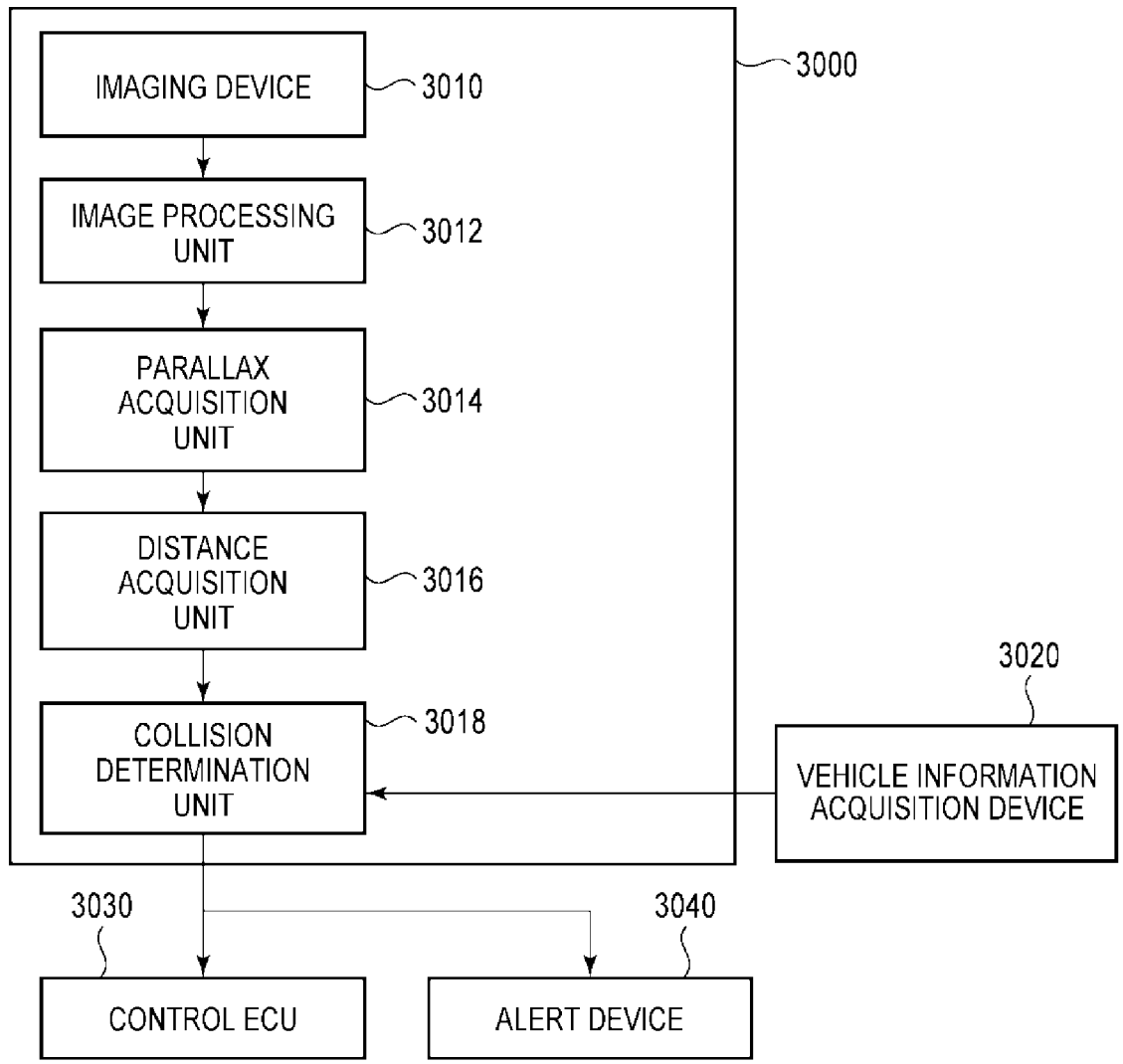
FIG. 32A is a diagram illustrating an example of a configuration of an imaging system according to an eleventh embodiment of the present disclosure.
Figure 32B:
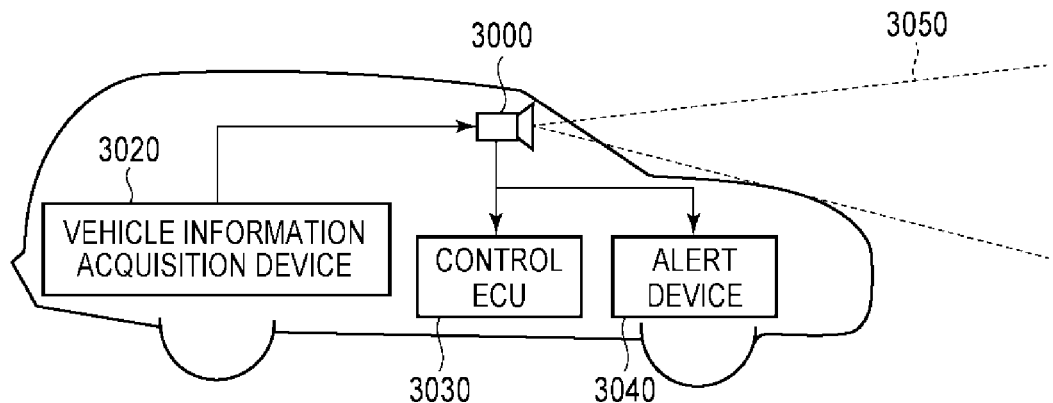
FIG. 32B is a diagram illustrating an example of a configuration of a moving object according to the eleventh embodiment of the present disclosure.

An imaging system and a moving object according to an eleventh embodiment of the present disclosure will be described with reference to FIG. 32A and FIG. 32B. FIG. 32A is a diagram illustrating a configuration of the imaging system according to the present embodiment. FIG. 32B is a diagram illustrating a configuration of the moving object according to the present embodiment.

FIG. 32A illustrates an example of an imaging system related to an on-vehicle camera. An imaging system 3000 includes an imaging device 3010. The imaging device 3010 is the imaging device 1000 described in any of the above first to ninth embodiments. The imaging system 3000 includes an image processing unit 3012 that performs image processing on a plurality of image data acquired by the imaging device 3010 and a parallax acquisition unit 3014 that calculates a parallax (a phase difference of parallax images) from the plurality of image data acquired by the imaging system 3000. Further, the imaging system 3000 includes a distance acquisition unit 3016 that calculates a distance to a target object based on the calculated parallax and a collision determination unit 3018 that determines whether or not there is a collision possibility based on the calculated distance. Here, the parallax acquisition unit 3014 and the distance acquisition unit 3016 are an example of a distance information acquisition unit that acquires distance information on the distance to the target object. That is, the distance information is information on a parallax, a defocus amount, a distance to a target object, or the like. The collision determination unit 3018 may use any of the distance information to determine the collision possibility. The distance information acquisition unit may be implemented by hardware such as a dedicatedly designed CPU or MPU or may be implemented by a software module. Further, the distance information acquisition unit may be implemented by a field programmable gate array (FPGA), an application specific integrated circuit (ASIC), or the like or may be implemented by a combination thereof.

The imaging system 3000 is connected to the vehicle information acquisition device 3020 and can acquire vehicle information such as a vehicle speed, a yaw rate, a steering angle, or the like. Further, the imaging system 3000 is connected to a control ECU 3030, which is a control device that outputs a control signal for causing a vehicle to generate braking force based on a determination result by the collision determination unit 3018. Further, the imaging system 3000 is also connected to an alert device 3040 that issues an alert to the driver based on a determination result by the collision determination unit 3018. For example, when the collision probability is high as the determination result of the collision determination unit 3018, the control ECU 3030 performs vehicle control to avoid a collision or reduce damage by applying a brake, pushing back an accelerator, suppressing engine power, or the like. The alert device 3040 alerts a user by sounding an alert such as a sound, displaying alert information on a display of a car navigation system or the like, providing vibration to a seat belt or a steering wheel, or the like. The imaging system 3000 functions as a controlling unit that performs control of the operation to control the vehicle as described above.

In the present embodiment, an area around a vehicle, for example, a front area or a rear area is captured by using the imaging system 3000. FIG. 32B illustrates the imaging system when a front area of a vehicle (a capturing area 3050) is captured. The vehicle information acquisition device 3020 transmits an instruction to the imaging system 3000 or the imaging device 3010. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a moving object (moving apparatus) such as a ship, an airplane, or an industrial robot, for example. In addition, the imaging system can be widely applied to a device which utilizes object recognition, such as an intelligent transportation system (ITS), without being limited to moving objects.

Modified Embodiments

The present disclosure is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is also one of the embodiments of the present disclosure.

Further, although devices intended to acquire an image, that is, imaging devices have been illustrated as examples in the above first to ninth embodiments, the application example of the present disclosure is not necessarily limited to the imaging devices. For example, when the present disclosure is applied to a device intended for ranging as described in the above eleventh embodiment, the device is not necessarily required to output an image. In such a case, it can be said that such a device is a photoelectric conversion device that converts optical information into a predetermined electrical signal. An imaging device is one of the photoelectric conversion devices.

Further, the imaging system illustrated in the above tenth and eleventh embodiments are provided as examples of an imaging system to which the photoelectric conversion device of the present disclosure may be applied, and the imaging system to which the photoelectric conversion device of the present disclosure is applicable is not limited to the configuration illustrated in FIG. 31 and FIG. 32A.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to improve image quality while suppressing an increase in complexity of the configuration and an increase in complicatedness of the control in an imaging device that can control imaging conditions on a pixel block basis.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-208571, filed Nov. 19, 2019, which is hereby incorporated by reference herein in its entirety.

What is claimed is:

1. An imaging device comprising:
a plurality of pixels arranged to form a plurality of pixel rows and a plurality of pixel columns, wherein each of the plurality of pixels includes a photoelectric converter; and
a control unit that controls an accumulation period for accumulation of charge in the plurality of pixels,
wherein the plurality of pixels is divided into a plurality of pixel blocks that are parts different from each other of the plurality of pixels, and each of the plurality of pixel blocks includes a pixel group arranged over at least two pixel rows or at least two pixel columns,
wherein the control unit is configured to control the accumulation period for each of the plurality of pixel blocks,
wherein the plurality of pixel blocks includes a first pixel block, a second pixel block, and a third pixel block arranged between the first pixel block and the second pixel block, and
wherein the control unit includes:
a first mode to control the accumulation period in the third pixel block commonly to the accumulation period in the first pixel block and, control the accumulation period in the second pixel block independently of the accumulation period in the first pixel block and the third pixel block, and
a second mode to control the accumulation period in the third pixel block commonly to the accumulation period in the second pixel block and, control the accumulation period in the first pixel block independently of the accumulation period in the second pixel block and the third pixel block.

2. The imaging device according to claim 1,
wherein at least one pixel row of the plurality of pixel rows extends over at least the first pixel block, the second pixel block, and the third pixel block, and
wherein the control unit includes:
a scanning unit that supplies a first control signal to the plurality of pixels on a pixel row basis,
a region control unit that supplies a second control signal to the plurality of pixel blocks so that at least the first pixel block and the second pixel block are controlled independently of each other, and
a signal generation unit that is provided in association with at least some of the plurality of pixel blocks and, based on the first control signal supplied from the scanning unit and the second control signal supplied from the region control unit, generates a third control signal used for controlling the accumulation period in a corresponding pixel block.

3. The imaging device according to claim 2, wherein the number of signal lines used for supplying control signals from the region control unit to the third pixel block is less than the number of signal lines used for supplying control signals from the region control unit to the first pixel block and the number of signal lines used for supplying control signals from the region control unit to the second pixel block.

4. The imaging device according to claim 2,
wherein the signal generation unit provided in association with the first pixel block supplies the third control signal to pixels arranged in the first pixel block,
wherein the signal generation unit provided in association with the second pixel block supplies the third control signal to pixels arranged in the second pixel block, and
wherein the control unit includes a selection unit that selects one of the third control signal generated by the signal generation unit provided in association with the first pixel block and the third control signal generated by the signal generation unit provided in association with the second pixel block and supplies the selected third control signal to pixels arranged in the third pixel block.

5. The imaging device according to claim 1 further comprising an amplifier unit that amplifies a signal based on charge generated by the photoelectric converter,
wherein the control unit is further configured to control a gain in the amplifier unit for each of the plurality of pixel blocks, and
wherein the control unit is configured to control the amplifier unit so that the gain to a signal based on charge generated by the photoelectric converter of a pixel arranged in the third pixel block is the same as one of the gain to a signal based on charge generated by the photoelectric converter of a pixel arranged in the first pixel block and the gain to a signal based on charge generated by the photoelectric converter of a pixel arranged in the second pixel block.

6. The imaging device according to claim 5,
wherein the amplifier unit includes a plurality of amplifiers each arranged in association with each of the plurality of columns, and
wherein the control unit controls the gain by switching gains of the amplifiers on a pixel block column basis.

7. The imaging device according to claim 5,
wherein each of the plurality of pixels further includes, as the amplifier unit, a charge holding portion with a variable capacitance value and an amplifier transistor that outputs a signal in accordance with the capacitance value of the charge holding portion and an amount of charge transferred from the photoelectric converter, and wherein the control unit controls the gain by switching the capacitance value of the charge holding portion of the pixel on a pixel block basis.

8. The imaging device according to claim 1, wherein the plurality of pixel blocks includes a plurality of third pixel blocks between the first pixel block and the second pixel block.

9. The imaging device according to claim 8, wherein the control unit performs first driving to perform the same control as control for the first pixel block on the third pixel blocks one by one from the first pixel block side to the second pixel block side, and second driving to perform the same control as control for the second pixel block on the third pixel blocks one by one from the second pixel block side to the first pixel block side, alternately.

10. The imaging device according to claim 8 further comprising a moving object detection unit that detects motion of an object based on a plurality of image data,
wherein when the moving object detection unit detects that the object is moving, the control unit sets the third pixel blocks on which the same control as control for the first pixel block is performed in accordance with a moving direction and a moving speed of the object.

11. The imaging device according to claim 10, wherein the control unit predicts motion of the object detected by the moving object detection unit based on a learning model that learned motion of an object in advance and sets an initial value of the accumulation period set for the plurality of pixel block.

12. The imaging device according to claim 1, wherein a region size of the third pixel block is different from a region size of the first pixel block and a region size of the second pixel block.

13. The imaging device according to claim 1, wherein the number of pixels included in the third pixel block is less than the number of pixels included in the first pixel block and less than the number of pixels included in the second pixel block.

14. The imaging device according to claim 1, wherein a boundary of the pixel blocks adjacent to each other arranged on the same pixel block row is inclined with respect to a direction of the plurality of columns.

15. The imaging device according to claim 1 further comprising:
a first substrate on which the plurality of pixels is provided; and
a second substrate which is stacked on the first substrate and on which at least a part of the control unit is provided.

16. An imaging system comprising:
the imaging device according to claim 1; and
a signal processing unit that processes signals output from the pixels of the imaging device.

17. A moving object comprising:
the imaging device according to claim 1;
a distance information acquisition unit that acquires distance information on a distance to a target object, from a parallax image based on signals from the imaging device; and
a controlling unit that controls the moving object based on the distance information.

18. An imaging device comprising:
a plurality of pixels arranged to form a plurality of pixel rows and a plurality of pixel columns, wherein each of the plurality of pixels includes a photoelectric converter; and
a control unit that controls an accumulation period for accumulation of charge in the plurality of pixels,
wherein the plurality of pixels is divided into a plurality of pixel blocks that are parts different from each other of the plurality of pixels, and each of the plurality of pixel blocks includes a pixel group arranged over at least two pixel rows or at least two pixel columns,
wherein the control unit is configured to control the accumulation period for each of the plurality of pixel blocks,
wherein the control unit is configured to perform a first period in which the plurality of pixels is divided into first and second groups, and a second period in which the plurality of pixels is divided into third and fourth groups different from the first and second groups,
wherein, in the first period, a length of the accumulation period for pixels belonging to the first group is different from a length of the accumulation period for pixels belonging to the second group, and the number of the pixels belonging to the first group is larger than the number of the pixels belonging to the second group,
wherein, in the second period, a length of the accumulation period for pixels belonging to the third group is different from a length of the accumulation period for pixels belonging to the fourth group, and the number of the pixels belonging to the third group is larger than the number of the pixels belonging to the fourth group, and
wherein a part of the pixels belonging to the first group in the first period belongs to the fourth group in the second period.

19. The imaging device according to claim 18,
wherein the first group includes a first pixel block, and a second pixel block arranged on a second group side of the first group, and
wherein the second pixel block belongs to the fourth group in the second period.

20. The imaging device according to claim 19,
wherein the second group includes a third pixel block,
wherein the second pixel block is arranged between the first pixel block and the third pixel block, and
wherein the third pixel block belongs to the fourth group in the second period.

21. The imaging device according to claim 19, wherein the first pixel block belongs to the third group in the second period.

22. An imaging device comprising:
a plurality of pixels arranged to form a plurality of rows and a plurality of columns, wherein each of the plurality of pixels includes a photoelectric converter;
an amplifier unit that amplifies a signal based on charge generated by the photoelectric converter; and
a control unit that controls a gain of the amplifier unit,
wherein the plurality of pixels is divided into a plurality of pixel blocks that are parts different from each other of the plurality of pixels, and each of the plurality of pixel blocks includes a pixel group arranged over at least two rows or at least two columns,
wherein the control unit is configured to control the gain for each of the plurality of pixel blocks,
wherein the plurality of pixel blocks includes a first pixel block, a second pixel block, and a third pixel block arranged between the first pixel block and the second pixel block on the same pixel block row, and wherein the control unit is configured to control the amplifier unit so that the gain to a signal based on charge generated by the photoelectric converter of a pixel arranged in the third pixel block is the same as one of the gain to a signal based on charge generated by the photoelectric converter of a pixel arranged in the first pixel block and the gain to a signal based on charge generated by the photoelectric converter of a pixel arranged in the second pixel block.

23. The imaging device according to claim 22, wherein the amplifier unit includes a plurality of amplifiers each arranged in association with each of the plurality of columns, and
wherein the control unit controls the gain by switching gains of the amplifiers on a pixel block column basis.

24. The imaging device according to claim 22, wherein each of the plurality of pixels further includes, as the amplifier unit, a holding portion with a variable capacitance value and an amplifier transistor that outputs a signal in accordance with the capacitance value of the holding portion and an amount of charge transferred from the photoelectric converter, and
wherein the control unit controls the gain by switching the capacitance value of the holding portion of the pixel on a pixel block column basis.

25. An imaging device comprising:
a plurality of pixels arranged to form a plurality of pixel rows and a plurality of pixel columns, wherein each of the plurality of pixels includes a photoelectric converter; and
a control unit that controls an accumulation period for accumulation of charge in the plurality of pixels,
wherein the plurality of pixels is divided into a plurality of pixel blocks that are parts different from each other of the plurality of pixels, and each of the plurality of pixel blocks includes a pixel group arranged over at least two pixel rows or at least two pixel columns,
wherein the control unit is configured to control the accumulation period for each of the plurality of pixel blocks,
wherein the control unit is configured to perform a first period in which the plurality of pixels is divided into first and second groups, and a second period in which the plurality of pixels is divided into third and fourth groups different from the first and second groups,
wherein, in the first period, a length of the accumulation period for pixels belonging to the first group is different from a length of the accumulation period for pixels belonging to the second group, and the number of the pixels belonging to the first group is larger than the number of the pixels belonging to the second group,
wherein, in the second period, a length of the accumulation period for pixels belonging to the third group is different from a length of the accumulation period for pixels belonging to the fourth group, and the number of the pixels belonging to the third group is larger than the number of the pixels belonging to the fourth group, and
wherein a part of the pixels belonging to the second group in the first period belongs to the third group in the second period.

26. The imaging device according to claim 25, wherein the second group includes a first pixel block, and a second pixel block arranged on a first group side of the second group, and
wherein the second pixel block belongs to the third group in the second period.

27. The imaging device according to claim 26, wherein the first group includes a third pixel block,
wherein the second pixel block is arranged between the first pixel block and the third pixel block, and
wherein the third pixel block belongs to the third group in the second period.

28. The imaging device according to claim 26, wherein the first pixel block belongs to the fourth group in the second period.

* * * * *